(12) United States Patent
Brown et al.

(10) Patent No.: US 12,105,395 B2
(45) Date of Patent: Oct. 1, 2024

(54) CONTROLLERS FOR OPTICALLY-SWITCHABLE DEVICES

(71) Applicant: View, Inc., Milpitas, CA (US)

(72) Inventors: Stephen Clark Brown, San Mateo, CA (US); Dhairya Shrivastava, Los Altos, CA (US)

(73) Assignee: View, Inc., San Jose, CA (US)

( * ) Notice: Subject to any disclaimer, the term of this patent is extended or adjusted under 35 U.S.C. 154(b) by 0 days.

(21) Appl. No.: 18/493,067

(22) Filed: Oct. 24, 2023

(65) Prior Publication Data

US 2024/0103333 A1 Mar. 28, 2024

Related U.S. Application Data

(63) Continuation of application No. 17/964,210, filed on Oct. 12, 2022, now abandoned, which is a
(Continued)

(51) Int. Cl.
*G02F 1/163* (2006.01)
*E06B 9/24* (2006.01)
(Continued)

(52) U.S. Cl.
CPC ............... *G02F 1/163* (2013.01); *E06B 9/24* (2013.01); *G05B 15/02* (2013.01); *H02M 3/158* (2013.01);
(Continued)

(58) Field of Classification Search
CPC ..... H04L 67/125; G02F 1/163; G02F 1/1523; G02F 1/15165; G02F 1/157; G02F 1/155;
(Continued)

(56) References Cited

U.S. PATENT DOCUMENTS

| 4,148,015 A | 4/1979 | Sekiya et al. |
| 4,491,727 A | 1/1985 | Appelbaum et al. |

(Continued)

FOREIGN PATENT DOCUMENTS

| CN | 2590732 Y | 12/2003 |
| CN | 101501757 A | 8/2009 |

(Continued)

OTHER PUBLICATIONS

"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.

(Continued)

*Primary Examiner* — Mouloucoulaye Inoussa
(74) *Attorney, Agent, or Firm* — Weaver Austin Villeneuve & Sampson LLP; Brian D. Griedel

(57) ABSTRACT

This disclosure relates generally to optically-switchable devices, and more particularly, to systems, apparatus, and methods for controlling optically-switchable devices. In some implementations, the apparatus includes an interface for communicating with window controllers, and the apparatus includes one or more processors. A processor can be configured to cause status information received from a window controller to be processed. The status information can indicate at least a tint status of one or more optically-switchable devices controlled by the window controller. In response to receiving the status information, one or more tint commands can be sent via the interface to the window controller.

16 Claims, 8 Drawing Sheets

Related U.S. Application Data continuation of application No. 17/538,660, filed on Nov. 30, 2021, now Pat. No. 11,740,529, which is a continuation of application No. 16/948,340, filed on Sep. 14, 2020, now Pat. No. 11,237,449, which is a continuation of application No. 15/334,832, filed on Oct. 26, 2016, now Pat. No. 10,809,587, which is a continuation-in-part of application No. 14/998,019, filed on Oct. 6, 2015, now Pat. No. 10,690,540.

(60) Provisional application No. 62/248,181, filed on Oct. 29, 2015.

(51) Int. Cl.
*G05B 15/02* (2006.01)
*H02M 3/158* (2006.01)

(52) U.S. Cl.
CPC ............... *E06B 2009/2417* (2013.01); *E06B 2009/2464* (2013.01); *E06B 2009/247* (2013.01)

(58) Field of Classification Search
CPC .. G02F 1/1503; G02F 1/13439; G02F 1/0147; G02F 1/1516; G02F 1/134309; G02F 1/153; G02F 2001/1502; G02F 2201/44; G02F 2001/15145; G02F 2202/36; G02F 2203/11; G02F 2202/10; G02F 2001/164; G02F 2001/1555; G05B 15/02; G05B 2219/2628; E06B 9/24; E06B 9/68; E06B 2009/2464; E06B 2009/247; E06B 2009/2417; E06B 2009/2476; E06B 2009/6818; H02M 3/158; H02M 3/157; Y04S 40/18; G01J 1/0474; G01J 1/4228; G01J 1/0271; G01J 5/10; G01J 2001/4266; G02B 6/0065; G02B 6/0088; G02B 6/005; G02B 6/0095; F21V 14/003; F21V 23/0464; F21S 8/06; G09G 3/19; H02J 7/0049; H02J 7/007182; B60R 1/088; H05B 47/11; H05B 45/22; H05B 47/115; H05B 47/16; Y02B 20/40; H01L 27/3232; B05D 3/06; F21Y 2103/10; F21Y 2115/10; F21Y 2105/00; F21Y 2113/17

See application file for complete search history.

(56) References Cited

U.S. PATENT DOCUMENTS

| | | | |
|---|---|---|---|
| 4,923,289 A | 5/1990 | Demiryont | |
| 5,124,833 A | 6/1992 | Barton et al. | |
| 5,170,108 A | 12/1992 | Peterson et al. | |
| 5,204,778 A | 4/1993 | Bechtel | |
| 5,217,296 A | 6/1993 | Tanner et al. | |
| 5,220,317 A | 6/1993 | Lynam et al. | |
| 5,290,986 A | 3/1994 | Colon et al. | |
| 5,353,148 A | 10/1994 | Eid et al. | |
| 5,365,365 A | 11/1994 | Ripoche et al. | |
| 5,379,146 A | 1/1995 | Defendini | |
| 5,384,578 A | 1/1995 | Lynam et al. | |
| 5,390,045 A | 2/1995 | Bernard, Jr. | |
| 5,402,144 A | 3/1995 | Ripoche | |
| 5,451,822 A | 9/1995 | Bechtel et al. | |
| 5,598,000 A | 1/1997 | Popat | |
| 5,606,393 A | 2/1997 | Schoenherr et al. | |
| 5,621,526 A | 4/1997 | Kuze | |
| 5,673,028 A | 9/1997 | Levy | |
| 5,694,144 A | 12/1997 | Lefrou et al. | |
| 5,764,402 A | 6/1998 | Thomas et al. | |
| 5,822,107 A | 10/1998 | Lefrou et al. | |
| 5,900,720 A | 5/1999 | Kallman et al. | |
| 5,956,012 A | 9/1999 | Turnbull et al. | |
| 5,973,818 A | 10/1999 | Sjursen et al. | |
| 5,973,819 A | 10/1999 | Pletcher et al. | |
| 5,978,126 A | 11/1999 | Sjursen | |
| 6,039,850 A | 3/2000 | Schulz | |
| 6,055,089 A | 4/2000 | Schulz et al. | |
| 6,084,700 A | 7/2000 | Knapp et al. | |
| 6,130,448 A | 10/2000 | Bauer et al. | |
| 6,130,772 A | 10/2000 | Cava | |
| 6,222,177 B1 | 4/2001 | Bechtel et al. | |
| 6,262,831 B1 | 7/2001 | Bauer et al. | |
| 6,362,806 B1 | 3/2002 | Reichmann et al. | |
| 6,386,713 B1 | 5/2002 | Turnbull et al. | |
| 6,407,468 B1 | 6/2002 | LeVesque et al. | |
| 6,407,847 B1 | 6/2002 | Poll et al. | |
| 6,417,500 B1 | 7/2002 | Wood | |
| 6,449,082 B1 | 9/2002 | Agrawal et al. | |
| 6,471,360 B2 | 10/2002 | Rukavina et al. | |
| 6,535,126 B2 | 3/2003 | Lin et al. | |
| 6,567,708 B1 | 5/2003 | Bechtel et al. | |
| 6,614,577 B1 | 9/2003 | Yu et al. | |
| 6,707,590 B1 | 3/2004 | Bartsch | |
| 6,795,226 B2 | 9/2004 | Agrawal et al. | |
| 6,829,511 B2 | 12/2004 | Bechtel et al. | |
| 6,856,444 B2 | 2/2005 | Ingalls et al. | |
| 6,897,936 B1 | 5/2005 | Li et al. | |
| 6,940,627 B2 | 9/2005 | Freeman et al. | |
| 6,954,299 B1 | 10/2005 | Huang et al. | |
| 7,085,609 B2 | 8/2006 | Bechtel et al. | |
| 7,133,181 B2 | 11/2006 | Greer | |
| 7,215,318 B2 | 5/2007 | Turnbull et al. | |
| 7,277,215 B2 | 10/2007 | Greer | |
| 7,304,787 B2 | 12/2007 | Whitesides et al. | |
| 7,417,397 B2 | 8/2008 | Berman et al. | |
| 7,542,809 B2 | 6/2009 | Bechtel et al. | |
| 7,548,833 B2 | 6/2009 | Ahmed | |
| 7,567,183 B2 | 7/2009 | Schwenke | |
| 7,610,910 B2 | 11/2009 | Ahmed | |
| 7,722,966 B1 | 5/2010 | Lee et al. | |
| 7,817,326 B1 | 10/2010 | Rennig et al. | |
| 7,822,490 B2 | 10/2010 | Bechtel et al. | |
| 7,873,490 B2 | 1/2011 | MacDonald | |
| 7,941,245 B1 | 5/2011 | Popat | |
| 7,972,021 B2 | 7/2011 | Scherer | |
| 7,990,603 B2 | 8/2011 | Ash et al. | |
| 8,004,739 B2 | 8/2011 | Letocart | |
| 8,018,644 B2 | 9/2011 | Gustavsson et al. | |
| 8,102,586 B2 | 1/2012 | Albahri | |
| 8,213,074 B1 | 7/2012 | Shrivastava et al. | |
| 8,254,013 B2 * | 8/2012 | Mehtani | E06B 9/24 359/275 |
| 8,292,228 B2 | 10/2012 | Mitchell et al. | |
| 8,296,287 B1 | 10/2012 | Cappiello et al. | |
| 8,383,994 B2 * | 2/2013 | Rashid | B32B 17/10174 219/203 |
| 8,456,729 B2 | 6/2013 | Brown et al. | |
| 8,547,624 B2 | 10/2013 | Ash et al. | |
| 8,705,162 B2 | 4/2014 | Brown et al. | |
| 8,723,467 B2 | 5/2014 | Berman et al. | |
| 8,836,263 B2 | 9/2014 | Berman et al. | |
| 8,864,321 B2 | 10/2014 | Mehtani et al. | |
| 8,902,486 B1 | 12/2014 | Chandrasekhar | |
| 8,976,440 B2 | 3/2015 | Berland et al. | |
| 9,016,630 B2 | 4/2015 | Mitchell et al. | |
| 9,030,725 B2 | 5/2015 | Pradhan et al. | |
| 9,081,247 B1 | 7/2015 | Pradhan et al. | |
| 9,938,765 B2 | 4/2018 | Berman et al. | |
| 9,939,703 B1 | 4/2018 | Nguyen | |
| 10,372,007 B1 | 8/2019 | Nagel et al. | |
| 10,495,939 B2 | 12/2019 | Brown et al. | |
| 10,768,503 B1 | 9/2020 | Nagel et al. | |
| 10,809,587 B2 | 10/2020 | Brown et al. | |
| 10,809,589 B2 | 10/2020 | Brown | |
| 11,175,178 B2 | 11/2021 | Brown et al. | |
| 11,237,449 B2 | 2/2022 | Brown et al. | |
| 11,300,848 B2 | 4/2022 | Brown et al. | |
| 11,422,580 B2 | 8/2022 | Liebl et al. | |
| 11,709,409 B2 | 7/2023 | Brown et al. | |
| 11,740,529 B2 | 8/2023 | Brown et al. | |

(56) References Cited

U.S. PATENT DOCUMENTS

| | | |
|---|---|---|
| 11,796,885 B2 | 10/2023 | Brown |
| 11,796,886 B2 | 10/2023 | Brown |
| 2002/0021481 A1 | 2/2002 | Lin et al. |
| 2002/0075472 A1 | 6/2002 | Holton |
| 2002/0152298 A1* | 10/2002 | Kikta .................. H04L 67/125 |
| | | 709/223 |
| 2003/0052854 A1 | 3/2003 | Juang |
| 2003/0210449 A1 | 11/2003 | Ingalls et al. |
| 2003/0210450 A1 | 11/2003 | Yu et al. |
| 2003/0227663 A1 | 12/2003 | Agrawal et al. |
| 2003/0227664 A1 | 12/2003 | Agrawal et al. |
| 2004/0001056 A1 | 1/2004 | Atherton et al. |
| 2004/0135989 A1 | 7/2004 | Klebe |
| 2004/0160322 A1 | 8/2004 | Stilp |
| 2005/0200934 A1 | 9/2005 | Callahan et al. |
| 2005/0225830 A1 | 10/2005 | Huang et al. |
| 2005/0268629 A1 | 12/2005 | Ahmed |
| 2005/0270620 A1 | 12/2005 | Bauer et al. |
| 2005/0278047 A1 | 12/2005 | Ahmed |
| 2006/0018000 A1 | 1/2006 | Greer |
| 2006/0107616 A1 | 5/2006 | Ratti et al. |
| 2006/0170376 A1 | 8/2006 | Piepgras et al. |
| 2006/0187608 A1 | 8/2006 | Stark |
| 2006/0207730 A1 | 9/2006 | Berman et al. |
| 2006/0209007 A1 | 9/2006 | Pyo et al. |
| 2006/0245024 A1 | 11/2006 | Greer |
| 2007/0002007 A1 | 1/2007 | Tam |
| 2007/0012349 A1 | 1/2007 | Gaudiana et al. |
| 2007/0067048 A1 | 3/2007 | Bechtel et al. |
| 2007/0097480 A1 | 5/2007 | Yang et al. |
| 2007/0162233 A1 | 7/2007 | Schwenke |
| 2007/0221338 A1 | 9/2007 | Meewis et al. |
| 2007/0285759 A1 | 12/2007 | Ash et al. |
| 2008/0018979 A1 | 1/2008 | Mahe et al. |
| 2008/0128586 A1 | 6/2008 | Johnson et al. |
| 2008/0230653 A1 | 9/2008 | Mitchell et al. |
| 2008/0234893 A1 | 9/2008 | Mitchell et al. |
| 2008/0239451 A1 | 10/2008 | Mitchell et al. |
| 2009/0013317 A1 | 1/2009 | Abfalter et al. |
| 2009/0020233 A1* | 1/2009 | Berman .................. E06B 9/56 |
| | | 318/446 |
| 2009/0027759 A1 | 1/2009 | Albahri |
| 2009/0066157 A1 | 3/2009 | Tarng et al. |
| 2009/0143141 A1 | 6/2009 | Wells et al. |
| 2009/0179923 A1 | 7/2009 | Amundson et al. |
| 2009/0243732 A1 | 10/2009 | Tarng et al. |
| 2009/0243802 A1 | 10/2009 | Wolf et al. |
| 2010/0039410 A1 | 2/2010 | Becker et al. |
| 2010/0066484 A1 | 3/2010 | Hanwright et al. |
| 2010/0082081 A1 | 4/2010 | Niessen et al. |
| 2010/0172009 A1 | 7/2010 | Matthews |
| 2010/0172010 A1 | 7/2010 | Gustavsson et al. |
| 2010/0188057 A1 | 7/2010 | Tarng |
| 2010/0235206 A1 | 9/2010 | Miller et al. |
| 2010/0237695 A1* | 9/2010 | Covaro .................. H02J 4/00 |
| | | 307/31 |
| 2010/0243427 A1 | 9/2010 | Kozlowski et al. |
| 2010/0245972 A1 | 9/2010 | Wright |
| 2010/0302624 A1 | 12/2010 | Moskowitz |
| 2010/0315693 A1 | 12/2010 | Lam et al. |
| 2011/0046810 A1 | 2/2011 | Bechtel et al. |
| 2011/0063708 A1 | 3/2011 | Letocart |
| 2011/0148218 A1 | 6/2011 | Rozbicki |
| 2011/0164304 A1 | 7/2011 | Brown et al. |
| 2011/0167617 A1 | 7/2011 | Letocart |
| 2011/0235152 A1 | 9/2011 | Letocart |
| 2011/0249313 A1 | 10/2011 | Letocart |
| 2011/0255142 A1 | 10/2011 | Ash et al. |
| 2011/0266419 A1 | 11/2011 | Jones et al. |
| 2011/0292488 A1 | 12/2011 | McCarthy et al. |
| 2011/0304898 A1 | 12/2011 | Letocart |
| 2011/0308318 A1 | 12/2011 | Magnussen |
| 2012/0007507 A1 | 1/2012 | Niemann et al. |
| 2012/0026573 A1 | 2/2012 | Collins et al. |
| 2012/0033287 A1 | 2/2012 | Friedman et al. |
| 2012/0062975 A1 | 3/2012 | Mehtani et al. |
| 2012/0133315 A1 | 5/2012 | Berman et al. |
| 2012/0147449 A1 | 6/2012 | Bhatnagar et al. |
| 2012/0182593 A1 | 7/2012 | Collins et al. |
| 2012/0190386 A1 | 7/2012 | Anderson |
| 2012/0194895 A1 | 8/2012 | Podbelski et al. |
| 2012/0200908 A1 | 8/2012 | Bergh et al. |
| 2012/0236386 A1 | 9/2012 | Mehtani et al. |
| 2012/0239209 A1 | 9/2012 | Brown et al. |
| 2012/0268803 A1 | 10/2012 | Greer et al. |
| 2012/0293855 A1 | 11/2012 | Shrivastava et al. |
| 2012/0300516 A1 | 11/2012 | Chen et al. |
| 2012/0323382 A1 | 12/2012 | Kamel et al. |
| 2013/0038218 A1 | 2/2013 | Xu et al. |
| 2013/0043347 A1 | 2/2013 | Mitchell et al. |
| 2013/0057937 A1 | 3/2013 | Berman et al. |
| 2013/0063065 A1* | 3/2013 | Berman .................. E06B 9/68 |
| | | 318/480 |
| 2013/0158790 A1 | 6/2013 | McIntyre, Jr. et al. |
| 2013/0242370 A1 | 9/2013 | Wang |
| 2013/0263510 A1 | 10/2013 | Gassion |
| 2013/0271812 A1 | 10/2013 | Brown et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0278988 A1 | 10/2013 | Jack et al. |
| 2014/0043669 A1 | 2/2014 | Bergh et al. |
| 2014/0067733 A1 | 3/2014 | Humann |
| 2014/0160550 A1 | 6/2014 | Brown et al. |
| 2014/0163742 A1* | 6/2014 | Element .................. E06B 9/322 |
| | | 700/275 |
| 2014/0177027 A1 | 6/2014 | Wang et al. |
| 2014/0177028 A1 | 6/2014 | Shrivastava et al. |
| 2014/0236323 A1* | 8/2014 | Brown .................. G05B 15/02 |
| | | 700/90 |
| 2014/0259931 A1 | 9/2014 | Plummer |
| 2014/0268287 A1 | 9/2014 | Brown et al. |
| 2014/0300945 A1 | 10/2014 | Parker |
| 2014/0330538 A1 | 11/2014 | Conklin et al. |
| 2014/0368899 A1* | 12/2014 | Greer .................. E06B 9/24 |
| | | 359/275 |
| 2014/0371931 A1 | 12/2014 | Lin et al. |
| 2015/0002919 A1 | 1/2015 | Jack et al. |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0092260 A1 | 4/2015 | Parker et al. |
| 2015/0109653 A1 | 4/2015 | Greer et al. |
| 2015/0110991 A1 | 4/2015 | Miwa et al. |
| 2015/0116808 A1 | 4/2015 | Branda et al. |
| 2015/0116811 A1 | 4/2015 | Shrivastava et al. |
| 2015/0122474 A1 | 5/2015 | Petersen |
| 2015/0185581 A1 | 7/2015 | Pradhan et al. |
| 2015/0219975 A1 | 8/2015 | Phillips et al. |
| 2015/0225999 A1 | 8/2015 | Berman et al. |
| 2015/0293422 A1 | 10/2015 | Pradhan et al. |
| 2015/0355520 A1 | 12/2015 | Chung et al. |
| 2015/0362728 A1 | 12/2015 | Tei |
| 2016/0079960 A1 | 3/2016 | Berscheid et al. |
| 2016/0090098 A1 | 3/2016 | Kim et al. |
| 2016/0154290 A1 | 6/2016 | Brown et al. |
| 2016/0203403 A1 | 7/2016 | Nagel et al. |
| 2016/0363799 A1 | 12/2016 | West et al. |
| 2017/0006694 A1 | 1/2017 | Davis et al. |
| 2017/0075183 A1 | 3/2017 | Brown |
| 2017/0075323 A1 | 3/2017 | Shrivastava et al. |
| 2017/0097259 A1 | 4/2017 | Brown et al. |
| 2017/0131610 A1 | 5/2017 | Brown et al. |
| 2017/0131611 A1 | 5/2017 | Brown et al. |
| 2017/0212400 A1 | 7/2017 | Shrivastava et al. |
| 2017/0285432 A1 | 10/2017 | Shrivastava et al. |
| 2017/0328121 A1 | 11/2017 | Purdy et al. |
| 2018/0088432 A1 | 3/2018 | Shrivastava et al. |
| 2018/0129172 A1 | 5/2018 | Shrivastava et al. |
| 2019/0011798 A9 | 1/2019 | Brown et al. |
| 2019/0025661 A9 | 1/2019 | Brown et al. |
| 2019/0049812 A1 | 2/2019 | Brown |
| 2019/0294018 A1 | 9/2019 | Shrivastava et al. |
| 2020/0004096 A1 | 1/2020 | Brown et al. |

(56) References Cited

U.S. PATENT DOCUMENTS

| | | | |
|---|---|---|---|
| 2020/0132276 A1 | 4/2020 | Hetrick et al. |
| 2020/0209057 A1 | 7/2020 | Brown et al. |
| 2020/0241379 A1 | 7/2020 | Barnum et al. |
| 2020/0278245 A1 | 9/2020 | Brown et al. |
| 2021/0055619 A1 | 2/2021 | Brown |
| 2021/0063834 A1 | 3/2021 | Brown et al. |
| 2021/0072611 A1 | 3/2021 | Brown |
| 2022/0026267 A1 | 1/2022 | Brown et al. |
| 2022/0091469 A1 | 3/2022 | Brown et al. |
| 2022/0187667 A1 | 6/2022 | Nagel |
| 2022/0244608 A1 | 8/2022 | Brown et al. |
| 2023/0011016 A1 | 1/2023 | Martinson et al. |
| 2023/0041779 A1 | 2/2023 | Brown et al. |
| 2023/0074720 A1 | 3/2023 | Brown et al. |
| 2023/0324757 A1 | 10/2023 | Brown et al. |

FOREIGN PATENT DOCUMENTS

| | | |
|---|---|---|
| CN | 101707892 A | 5/2010 |
| CN | 101969207 A | 2/2011 |
| CN | 102203370 A | 9/2011 |
| CN | 103547965 A | 1/2014 |
| CN | 103649826 A | 3/2014 |
| CN | 104603686 A | 5/2015 |
| CN | 104781493 A | 7/2015 |
| CN | 207652442 U | 7/2018 |
| DE | 10124673 A1 | 11/2002 |
| EP | 0445314 A1 | 9/1991 |
| EP | 0869032 A2 | 10/1998 |
| EP | 0920210 A1 | 6/1999 |
| EP | 1012633 B1 | 3/2002 |
| EP | 0835475 B1 | 9/2004 |
| EP | 1510854 A1 | 3/2005 |
| EP | 1417535 B1 | 11/2005 |
| EP | 1619546 A2 | 1/2006 |
| EP | 1626306 A2 | 2/2006 |
| EP | 2161615 A1 | 3/2010 |
| EP | 2357544 A2 | 8/2011 |
| EP | 2764998 A1 | 8/2014 |
| JP | S63208830 A | 8/1988 |
| JP | H02132420 A | 5/1990 |
| JP | H05178645 A | 7/1993 |
| JP | H1063216 A | 3/1998 |
| JP | 2004245985 A | 9/2004 |
| JP | 2008542578 A | 11/2008 |
| JP | 4351914 B2 | 10/2009 |
| JP | 2011008271 A | 1/2011 |
| JP | 4694816 B2 | 6/2011 |
| JP | 4799113 B2 | 10/2011 |
| JP | 2013057975 A | 3/2013 |
| JP | 2014515837 A | 7/2014 |
| JP | 2015045129 A | 3/2015 |
| KR | 200412640 Y1 | 3/2006 |
| KR | 100752041 B1 | 8/2007 |
| KR | 20080022319 A | 3/2008 |
| KR | 20090026181 A | 3/2009 |
| KR | 100904847 B1 | 6/2009 |
| KR | 100931183 B1 | 12/2009 |
| KR | 20100017542 A | 2/2010 |
| KR | 20100034361 A | 4/2010 |
| KR | 20110003698 A | 1/2011 |
| KR | 20110094672 A | 8/2011 |
| KR | 20180135741 A | 12/2018 |
| TW | 200532346 A | 10/2005 |
| TW | 1243239 B | 11/2005 |
| TW | 1286622 B | 9/2007 |
| TW | M419698 U | 1/2012 |
| TW | 201215981 A | 4/2012 |
| TW | 201217999 A | 5/2012 |
| TW | 1387734 B | 3/2013 |
| TW | 201403034 A | 1/2014 |
| TW | 1430251 B | 3/2014 |
| WO | WO-9816870 A1 | 4/1998 |
| WO | WO-9913359 A1 | 3/1999 |
| WO | WO-0213052 A2 | 2/2002 |
| WO | WO-0241740 A1 | 5/2002 |
| WO | WO-2004003649 A1 | 1/2004 |
| WO | WO-2005098811 A1 | 10/2005 |
| WO | WO-2005103807 A2 | 11/2005 |
| WO | WO-2007016546 A2 | 2/2007 |
| WO | WO-2007146862 A2 | 12/2007 |
| WO | WO-2008030018 A1 | 3/2008 |
| WO | WO-2008147322 A1 | 12/2008 |
| WO | WO-2009124647 A1 | 10/2009 |
| WO | WO-2010120771 A1 | 10/2010 |
| WO | WO-2011020478 A1 | 2/2011 |
| WO | WO-2011087684 A1 | 7/2011 |
| WO | WO-2011087687 A1 | 7/2011 |
| WO | WO-2011124720 A2 | 10/2011 |
| WO | WO-2011127015 A1 | 10/2011 |
| WO | WO-2012079159 A1 | 6/2012 |
| WO | WO-2012080618 A1 | 6/2012 |
| WO | WO-2012080656 A1 | 6/2012 |
| WO | WO-2012080657 A1 | 6/2012 |
| WO | WO-2012145155 A1 | 10/2012 |
| WO | WO-2013059674 A1 | 4/2013 |
| WO | WO-2013109881 A2 | 7/2013 |
| WO | WO-2013155467 A1 | 10/2013 |
| WO | WO-2013155612 A1 | 10/2013 |
| WO | WO-2014121863 A1 | 8/2014 |
| WO | WO-2014130471 A1 | 8/2014 |
| WO | WO-2014134451 A2 | 9/2014 |
| WO | WO-2014209812 A1 | 12/2014 |
| WO | WO-2015077097 A1 | 5/2015 |
| WO | WO-2015134789 A1 | 9/2015 |
| WO | WO-2017007841 A1 | 1/2017 |
| WO | WO-2018112241 A1 | 6/2018 |
| WO | WO-2020037055 A1 | 2/2020 |
| WO | WO-2021067505 A1 | 4/2021 |

OTHER PUBLICATIONS

APC by Schneider Electric, Smart-UPS 120V Product Brochure, 2013, 8 pp.
AU Examination report dated Feb. 22, 2022, in Application No. AU2016346328.
AU Examination report dated Oct. 7, 2021, in AU Application No. 2016346328.
AU Office Action dated Jan. 24, 2022, in Application No. AU2020273368.
AU Office Action dated Jul. 14, 2022, in Application No. AU2020273368.
AU Office Action dated Jul. 28, 2023, in application No. AU2022204730.
Australian Examination Report dated Apr. 4, 2016 in AU Application No. 2013249706.
Australian Examination Report dated Jul. 10, 2019 in AU Application No. 2018203436.
Australian Examination Report dated Nov. 21, 2019 in AU Application No. 2018260906.
Australian Examination Report No. 1 dated Nov. 9, 2017 in AU Application No. 2017200334.
Australian Examination Report No. 2 dated Apr. 5, 2018 in AU Application No. 2017200334.
Australian Examination Report No. 3 dated Nov. 6, 2018 in AU Application No. 2017200334.
Australian Office Action dated May 21, 2021 in AU Application No. 2016346328.
CA Office Action dated Jan. 13, 2023, in Application No. CA3003639.
CA Office Action dated May 5, 2023, in Application No. CA2870673.
CA Office action dated Nov. 10, 2021, in CA Application No. CA2870673.
Canadian Examination Report dated Feb. 13, 2020 in CA Application No. 2,870,673.
Canadian Examination Report dated Jan. 18, 2019 in CA Application No. 2,870,673.
Chinese Notice of Grant & Search Report dated May 8, 2017 in CN Application No. 201380030251.8.
Chinese Office Action dated Sep. 7, 2016 in CN Application No. 201380030251.8.

(56) References Cited

OTHER PUBLICATIONS

Chinese Office Action dated Dec. 23, 2020 in CN Application No. 201710564603.8.
Chinese Office Action dated Feb. 3, 2020 in CN Application No. 201710564603.8.
Chinese Office Action dated Jul. 2, 2021 in CN Application No. 201810573469.2.
Chinese Office Action dated Jul. 21, 2020 in CN Application No. 201710564603.8.
Chinese Office Action dated Mar. 26, 2015 in CN Application No. 201280060910.8.
Chinese Office Action dated Mar. 3, 2021 in CN Application No. 201810573469.2.
Chinese Office Action dated Mar. 5, 2019 in CN Application No. 201680068239.X.
Chinese Office Action dated May 7, 2020 in CN Application No. 201810573469.2.
Chinese Office Action dated Sep. 6, 2019 in CN Application No. 201680068239.X.
CN Office Action dated Dec. 23, 2022 in Application No. CN201710564603.8 with English translation.
CN Office Action dated Dec. 28, 2023 in CN Application No. 202110511706.4.
CN Office Action dated Mar. 24, 2023, in Application No. CN201710564603.8 with English translation.
CN Office Action dated May 6, 2022 in Application No. CN202010475742 With English Translation.
CN Office Action dated Nov. 3, 2022, in Application No. CN202010475742.5 with English translation.
CN Office Action dated Sep. 28, 2022 in CN Application No. 201710564603.8 with English translation.
CN Office Action dated Sep. 3, 2021, in CN Application No. CN202010475742.5 with English translation.
Communication re Third-Party Observation dated Dec. 4, 2014 and Third-Party Observation dated Dec. 3, 14 in PCT/US2014/016974.
Duchon, Claude E. et al., "Estimating Cloud Type from Pyranometer Observations," Journal of Applied Meteorology, vol. 38, Jan. 1999, pp. 132-141.
EP Office Action dated Sep. 30, 2021, in application No. EP19185576.6.
European Decision to Refuse dated Jun. 6, 2019 in EP Application No. 13777692.8.
European Extended Search Report dated Dec. 13, 2019 in EP Application No. 19185576.6.
European Extended Search Report dated Jan. 25, 2016 in EP Application No. 13777692.8.
European Extended Search Report dated May 31, 2019 in EP Application No. 16860691.1.
European Office Action dated Apr. 8, 2020 in EP Application No. 18186062.8.
European Office Action dated Mar. 11, 2021 in EP Application No. 16860691.1.
European Office Action dated Mar. 31, 2017 in EP Application No. 13777692.8.
European Office Action dated Sep. 26, 2022 in Application No. EP18186062.8.
European Partial Search Report dated Oct. 6, 2015 in EP Application No. 13777692.8.
European Search Report dated Aug. 11, 2014 in European Application No. 12757877.1.
European Search Report dated Jul. 23, 2014 in European Application No. 12756917.6.
European Search Report dated Jul. 29, 2014 in European Application No. 12758250.0.
European Search Report dated Mar. 5, 2015 in European Application No. 12841714.4.
European Summons to Oral Proceedings dated Jun. 27, 2018 in EP Application No. 13777692.8.
Examiner's Answer dated Jan. 27, 2017 in U.S. Appl. No. 13/449,248.
Examiner's Answer dated Nov. 28, 2016 in U.S. Appl. No. 13/449,251.
Extended European Search Report dated Nov. 30, 2018 in EP Application No. 18186062.8.
Extended European Search Report mailed on Nov. 29, 2021, in the application EP21185911.1.
Final Office Action dated Jun. 5, 2015 in U.S. Appl. No. 13/968,258.
Graham, Steve, "Clouds & Radiation," Mar. 1, 1999. [ http://earthobservatory.nasa.gov/Features/Clouds/].
Haby, Jeff, "Cloud Detection (IR v. VIS)," (known as of Sep. 3, 2014) [ http://theweatherprediction.com/habyhints2/512/].
"Halio Rooftop Sensor Kit (Model SR500)," Product Data Sheet, Kinestral Technologies, 2020, 4 pp.
Hoosier Energy, "How do they do that? Measuring Real-Time Cloud Activity" Hoosier Energy Current Connections, (known as of Sep. 3, 2014). ( http://members.questline.com/Article.aspx?articleID=18550&accountID=196000&nl=11774).
"How Cleantech wants to make a 2012 comeback" http://mountainview.patch.com/articles/how-cleantech-wants-to-make-a-2012-comeback, Jan. 23, 2012.
IN Office Action dated Jul. 25, 2022, in Application No. IN202038028121.
IN Office Action dated Mar. 8, 2022 in Application No. IN202138034709.
IN Office Action dated Mar. 25, 2022, in Application No. IN202038028121.
Indian Office Action dated Feb. 10, 2021 in IN Application No. 201837015533.
Indian Office Action dated Oct. 4, 2019 in IN Application No. 2514/KOLNP/2014.
International Preliminary Report on Patentability dated Feb. 19, 2015 issued in PCT/US2013/053625.
International Preliminary Report on Patentability dated May 1, 2014 in PCT/US2012/061137.
International Preliminary Report on Patentability dated May 11, 2018 in PCT/US2016/058872.
International Preliminary Report on Patentability dated Oct. 23, 2014 issued in PCT/US2013/036456.
International Preliminary Report on Patentability dated Oct. 30, 2014 issued in PCT/US2013/034998.
International Preliminary Report on Patentability dated Oct. 30, 2014 issued in PCT/US2013/036235.
International Preliminary Report on Patentability dated Sep. 26, 2013, issued in PCT/US2012/027742.
International Preliminary Report on Patentability dated Sep. 26, 2013, issued in PCT/US2012/027828.
International Preliminary Report on Patentability dated Sep. 26, 2013, issued in PCT/US2012/027909.
International Search Report and Written Opinion dated Dec. 26, 2013, issued in PCT/US2013/053625.
International Search Report and Written Opinion dated Jul. 11, 2013, issued in PCT/US2013/034998.
International Search Report and Written Opinion dated Jul. 23, 2013, issued in PCT/US2013/036235.
International Search Report and Written Opinion dated Jul. 26, 2013, issued in PCT/US2013/036456.
International Search Report and Written Opinion dated Mar. 28, 2013 in PCT/US2012/061137.
International Search Report and Written Opinion dated May 26, 2014 in PCT/US2014/016974.
International Search Report and Written Opinion dated Nov. 18, 2022 in PCT Application No. PCT/US2022/074066.
International Search Report and Written Opinion dated Oct. 16, 2014, issued in PCT/US2014/043514.
International Search Report and Written Opinion dated Sep. 24, 2012, issued in PCT/US2012/027742.
International Search Report and Written Opinion dated Sep. 24, 2012, issued in PCT/US2012/027909.
International Search Report and Written Opinion dated Sep. 26, 2012, issued in PCT/US2012/027828.
International Search Report and Written Opinion (ISA/KR) dated Feb. 3, 2017 in PCT/US2016/058872.
Japanese Office Action dated Nov. 10, 2020 in JP Application No. 2018-521413.

(56) References Cited

OTHER PUBLICATIONS

JP Decision of Rejection dated Sep. 21, 2021, in application No. JP2018-521413.
JP Office Action dated Nov. 15, 2022 in Application No. JP2021-207119.
Kipp & Zonen, "Solar Radiation" (known as of Sep. 3, 2014) [ http://www.kippzonen.com/Knowledge-Center/Theoretical-info/Solar-Radiation].
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Korean Office Action dated Apr. 18, 2019 in KR Application No. 10-2014-7032108.
Korean Office Action dated Apr. 27, 2021 in KR Application No. 10-2021-7003065.
Korean Office Action dated May 25, 2020 in KR Application No. 10-2020-7005628.
KR Office Action dated May 28, 2022, in Application No. KR10-2022-7004024.
Letter dated Dec. 1, 2014 re Prior Art re U.S. Appl. No. 13/772,969 from Ryan D. Ricks representing MechoShade Systems, Inc.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
Martel. S.J, et al., "Scientific Programming Lab Notes Lecture Notes", Department of Geology and Geophysics School of Ocean and Earth Science and Technology University of Hawaii at Manoa, Sep. 2004, pp. 3.
National Aeronautics & Space Administration, "Cloud Radar System (CRS)," (known as of Sep. 3, 2014), published date of Jun. 16, 2014, [ http://har.gsfc.nasa.gov/index.php?section=12].
National Aeronautics & Space Administration, "Cloud Remote Sensing and Modeling," (known as of Sep. 3, 2014), published date of Sep. 15, 2014, [ http://atmospheres.gsfc.nasa.gov/climate/index.php?section=134 ].
"New from Pella: Windows with Smartphone-run blinds", Pella Corp., http://www.desmoinesregister.com/article/20120114/BUSINESS/301140031/0/biggame/?odyssey=nav%7Chead, Jan. 13, 2012.
Notice of Allowance dated Nov. 16, 2021 in U.S. Appl. No. 16/948,340.
Notice of Allowance dated Oct. 14, 2021 in U.S. Appl. No. 16/871,976.
Office Action dated Oct. 6, 2014 in U.S. Appl. No. 13/968,258.
"SPN1 Sunshine Pyranometer," Product Overview, Specification, Accessories and Product Resources, Delta-T Devices, May 5, 2016, 9 pp. https://www.delta-t.co.uk/product/spn1/ (downloaded Apr. 28, 2020).
Preliminary Amendment filed Jun. 12, 2019 for U.S. Appl. No. 15/882,719.
Preliminary Amendment filed Nov. 12, 2020 for U.S. Appl. No. 16/948,341.
"Remote Sensing: Clouds," Department of Atmospheric and Ocean Science, University of Maryland, (known as of Sep. 3, 2014) [ http://www.atmos.umd.edu/~pinker/remote_sensing_clouds.htm].
Russian Office Action dated Nov. 15, 2017 in RU Application No. 2014145822.
Russian Office Action dated Jun. 27, 2017 in RU Application No. 2014145822.
Science and Technology Facilities Council. "Cloud Radar: Predicting The Weather More Accurately." ScienceDaily, Oct. 1, 2008. [www.sciencedaily.com/releases/2008/09/080924085200.htm].
Singapore Notice of Eligibility for Grant & Search/Examination Report dated Sep. 15, 2015 in SG Application No. 11201406722V.
Taiwanese Office Action dated Aug. 24, 2020 in TW Application No. 105134929.
Taiwanese Office Action dated Dec. 30, 2020 in TW Application No. 108114019.
Taiwanese Office Action dated Jul. 2, 2020 in TW Application No. 107119905.
Taiwanese Office Action dated Jul. 30, 2018 in TW Application No. 106137770.
Taiwanese Office Action dated Jun. 29, 2021 in TW Application No. 110115755.
Taiwanese Office Action dated Mar. 30, 2017 in TW Application No. 102113541.
Third-Party Submission dated Feb. 2, 2015 and Feb. 18, 2015 PTO Notice re Third-Party Submission for U.S. Appl. No. 13/772,969.
TW Office Action dated Dec. 30, 2022 in Application No. TW110112565 with English translation.
TW Office Action dated Jan. 31, 2023 in Application No. TW110141329 with English translation.
U.S Advisory Action dated Mar. 9, 2023 in U.S. Appl. No. 16/948,341.
US Corrected Notice of Allowability dated Nov. 1, 2019 in U.S. Appl. No. 15/334,835.
US Corrected Notice of Allowance dated Aug. 19, 2021 in U.S. Appl. No. 16/871,976.
U.S. Final Office Action dated Apr. 5, 2023 in U.S. Appl. No. 17/964,210.
US Final Office Action dated Apr. 30, 2012 in U.S. Appl. No. 13/049,750.
U.S. Final Office Action dated Aug. 19, 2013 in U.S. Appl. No. 13/049,756.
U.S. Final Office Action dated Dec. 15, 2022 in U.S. Appl. No. 16/948,341.
US Final Office Action dated Feb. 26, 2015 in U.S. Appl. No. 13/479,137.
US Final Office Action dated Jan. 11, 2019 in U.S. Appl. No. 15/334,835.
US Final Office Action dated Jan. 27, 2014 in U.S. Appl. No. 13/479,137.
US Final Office Action dated Jul. 1, 2019 in U.S. Appl. No. 15/334,832.
U.S. Final Office Action dated Jul. 2, 2015 in U.S. Appl. No. 13/049,756.
US Final Office Action dated May 15, 2014 in U.S. Appl. No. 13/449,251.
US Final Office Action dated May 16, 2014 in U.S. Appl. No. 13/449,248.
U.S. Non-Final Office Action dated Apr. 12, 2023 in U.S. Appl. No. 17/450,091.
U.S. Non-Final Office Action dated Aug. 16, 2021 in U.S. Appl. No. 16/568,639.
U.S. Non-Final office Action dated Aug. 31, 2022 in U.S. Appl. No. 16/948,341.
U.S. Non-Final Office Action dated Dec. 21, 2022 in U.S. Appl. No. 17/964,210.
U.S. Non-Final office Action dated Dec. 22, 2022 in U.S. Appl. No. 17/538,660.
U.S. Non-Final Office Action dated Jul. 26, 2023, in U.S. Appl. No. 17/964,210.
U.S. Non-Final Office Action dated Nov. 16, 2022, in U.S. Appl. No. 16/949,855.
U.S. Notice of Allowance dated Apr. 7, 2023 in U.S. Appl. No. 17/654,458.
US Notice of Allowance dated Apr. 13, 2015 in U.S. Appl. No. 14/657,380.
U.S. Notice of Allowance dated Apr. 17, 2023 in U.S. Appl. No. 17/538,660.
U.S. Notice of Allowance dated Apr. 26, 2023 in U.S. Appl. No. 17/538,660.
U.S. Notice of Allowance dated Dec. 27, 2021, in U.S. Appl. No. 16/568,639.
US Notice of Allowance dated Jan. 10, 2014 in U.S. Appl. No. 13/449,235.
US Notice of Allowance dated Jan. 22, 2015 in U.S. Appl. No. 13/682,618.
US Notice of Allowance dated Jul. 1, 2020 in U.S. Appl. No. 15/334,832.
US Notice of Allowance dated Jul. 15, 2020 in U.S. Appl. No. 15/882,719.

(56) References Cited

OTHER PUBLICATIONS

US Notice of Allowance dated Jul. 15, 2021 in U.S. Appl. No. 16/871,976.
US Notice of Allowance dated Jul. 20, 2012 in U.S. Appl. No. 13/049,623.
U.S. Notice of Allowance dated Jun. 9, 2023 in U.S. Appl. No. 16/949,855.
U.S. Notice of Allowance dated Jun. 14, 2023, in U.S. Appl. No. 16/948,341.
US Notice of Allowance dated Jun. 17, 2014 in U.S. Appl. No. 13/309,990.
US Notice of Allowance dated Jun. 26, 2019 in U.S. Appl. No. 15/334,835.
U.S. Notice of Allowance dated Mar. 2, 2023 in U.S. Appl. No. 17/654,458.
US Notice of Allowance dated May 14, 2015 in U.S. Appl. No. 13/479,137.
US Notice of Allowance dated May 8, 2012 in U.S. Appl. No. 13/049,750.
U.S. Notice of Allowance dated Sep. 7, 2021 in U.S. Appl. No. 16/948,340.
U.S. Notice of Allowance dated Sep. 16, 2021 in U.S. Appl. No. 16/948,340.
US Notice of Allowance (supplemental) dated Jun. 12, 2015 in U.S. Appl. No. 13/479,137.
US Office Action dated Dec. 10, 2020 in U.S. Appl. No. 16/871,976.
US Office Action dated Dec. 24, 2013 in U.S. Appl. No. 13/309,990.
US Office Action dated Dec. 31, 2018 in U.S. Appl. No. 15/334,832.
US Office Action dated Feb. 21, 2020 in U.S. Appl. No. 15/334,832.
US Office Action dated Feb. 23, 2016 in U.S. Appl. No. 13/449,248.
US Office Action dated Feb. 24, 2015 in U.S. Appl. No. 14/163,026.
US Office Action dated Feb. 3, 2012 in U.S. Appl. No. 13/049,750.
US Office Action dated Jan. 16, 2015 in U.S. Appl. No. 14/468,778.
U.S. Office Action dated Jan. 18, 2013 in U.S. Appl. No. 13/049,756.
US Office Action dated Jul. 3, 2014 in U.S. Appl. No. 13/479,137.
US Office Action dated Jun. 3, 2015 in U.S. Appl. No. 13/449,251.
US Office Action dated Mar. 12, 2020 in U.S. Appl. No. 15/882,719.
US Office Action dated Mar. 15, 2019 in U.S. Appl. No. 15/334,835.
US Office Action dated Mar. 27, 2012 in U.S. Appl. No. 13/049,623.
US Office Action dated Mar. 27, 2018 in U.S. Appl. No. 15/334,835.
US Office Action dated Nov. 12, 2019 in U.S. Appl. No. 15/882,719.
US Office Action dated Nov. 29, 2013 in U.S. Appl. No. 13/449,248.
US Office Action dated Nov. 29, 2013 in U.S. Appl. No. 13/449,251.
US Office Action dated Oct. 11, 2013 in U.S. Appl. No. 13/449,235.
US Office Action dated Oct. 28, 2014 in U.S. Appl. No. 13/449,251.
U.S. Office Action dated Oct. 6, 2014 in U.S. Appl. No. 13/049,756.
US Office Action dated Sep. 15, 2014 in U.S. Appl. No. 13/682,618.
US Office Action dated Sep. 23, 2013 in U.S. Appl. No. 13/479,137.
US Office Action dated Sep. 29, 2014 in U.S. Appl. No. 13/449,248.
U.S. Appl. No. 16/696,887, inventors Brown et al., filed Nov. 26, 2019.
U.S. Appl. No. 63/146,365, inventors Brown et al., filed Feb. 5, 2021.
U.S. Pat. Appl. No. PCT/US2021/017946, filed on Feb. 12, 2021.
U.S. Appl. No. 17/964,210, inventors Brown et al., filed Oct. 12, 2022.
U.S. Appl. No. 18/367,607, inventor Brown., filed Sep. 13, 2023.
US PTAB Decision on Appeal dated Feb. 25, 2019 in U.S. Appl. No. 13/449,248.
US PTAB Decision on Appeal dated Feb. 25, 2019 in U.S. Appl. No. 13/449,251.
US Supplemental Notice of Allowability dated Aug. 6, 2020 in U.S. Appl. No. 15/334,832.
U.S Supplementary Notice of Allowability dated Dec. 30, 2021, in U.S. Appl. No. 16/948,340.

\* cited by examiner

CONTROLLERS FOR OPTICALLY-SWITCHABLE DEVICES

PRIORITY DATA

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

This disclosure relates generally to optically-switchable devices, and more particularly, to controllers for optically-switchable devices.

BACKGROUND

The development and deployment of optically-switchable windows have increased as considerations of energy efficiency and system integration gain momentum. Electrochromic windows are a promising class of optically-switchable windows. Electrochromism is a phenomenon in which a material exhibits a reversible electrochemically-mediated change in one or more optical properties when stimulated to a different electronic state. Electrochromic materials and the devices made from them may be incorporated into, for example, windows for home, commercial, or other use. The color, tint, transmittance, absorbance, or reflectance of electrochromic windows can be changed by inducing a change in the electrochromic material, for example, by applying a voltage across the electrochromic material. Such capabilities can allow for control over the intensities of various wavelengths of light that may pass through the window. One area of relatively recent interest is in intelligent control systems and algorithms for driving optical transitions in optically-switchable windows to provide desirable lighting conditions while reducing the power consumption of such devices and improving the efficiency of systems with which they are integrated.

BRIEF DESCRIPTION OF THE DRAWINGS

Like reference numbers and designations in the various drawings indicate like elements.

DETAILED DESCRIPTION

The following detailed description is directed to specific example implementations for purposes of disclosing the subject matter. Although the disclosed implementations are described in sufficient detail to enable those of ordinary skill in the art to practice the disclosed subject matter, this disclosure is not limited to particular features of the specific example implementations described herein. On the contrary, the concepts and teachings disclosed herein can be implemented and applied in a multitude of different forms and ways without departing from their spirit and scope. For example, while the disclosed implementations focus on electrochromic windows (also referred to as smart windows), some of the systems, devices and methods disclosed herein can be made, applied or used without undue experimentation to incorporate, or while incorporating, other types of optically-switchable devices. Some other types of optically-switchable devices include liquid crystal devices, suspended particle devices, and even micro-blinds, among others. For example, some or all of such other optically-switchable devices can be powered, driven or otherwise controlled or integrated with one or more of the disclosed implementations of controllers described herein. Additionally, in the following description, the phrases "operable to," "adapted to," "configured to," "designed to," "programmed to," or "capable of" may be used interchangeably where appropriate.

Example Electrochromic Window Architecture

Figure 1:
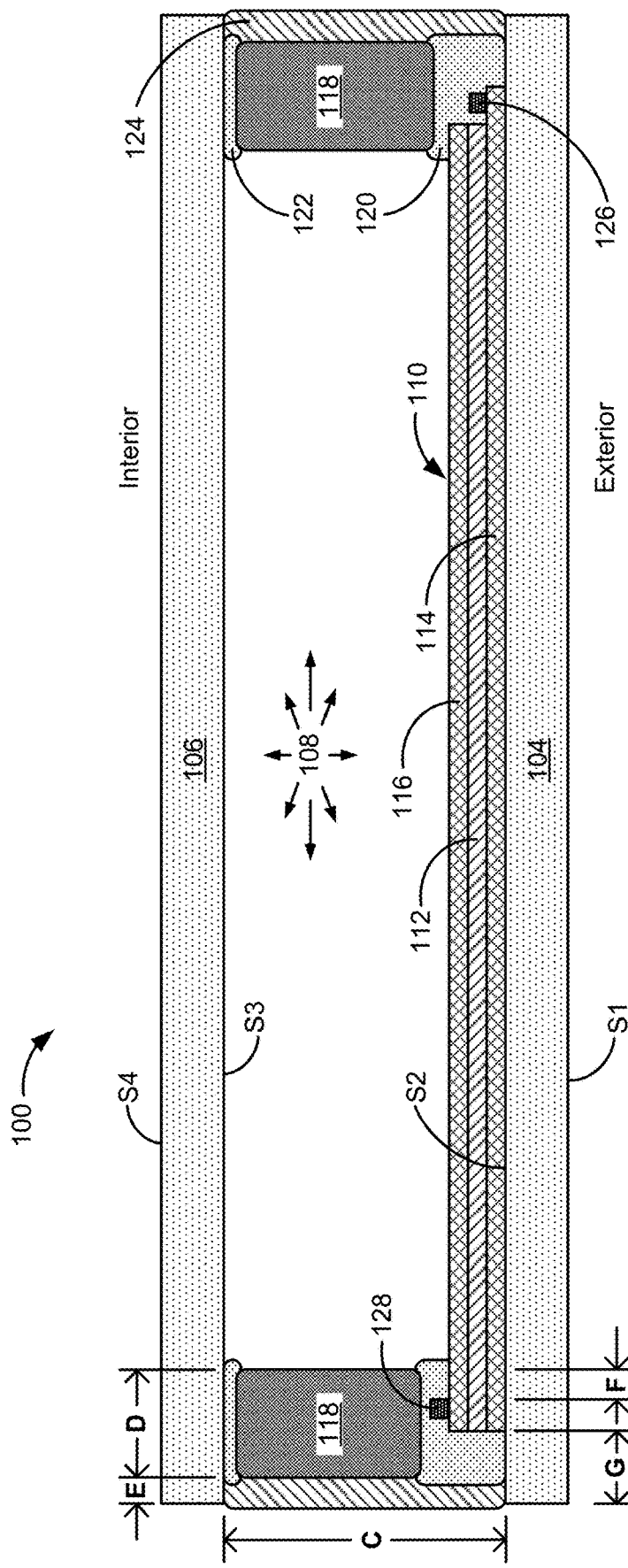
FIG. 1 shows a cross-sectional side view of an example electrochromic window 100 in accordance with some implementations.

FIG. 1 shows a cross-sectional side view of an example electrochromic window 100 in accordance with some implementations. An electrochromic window is one type of optically-switchable window that includes an electrochromic device (ECD) used to provide tinting or coloring. The example electrochromic window 100 can be manufactured, configured or otherwise provided as an insulated glass unit (IGU) and will hereinafter also be referred to as IGU 100. This convention is generally used, for example, because it is common and because it can be desirable to have IGUs serve as the fundamental constructs for holding electrochromic panes (also referred to as "lites") when provided for installation in a building. An IGU lite or pane may be a single substrate or a multi-substrate construct, such as a laminate of two substrates. IGUs, especially those having double- or triple-pane configurations, can provide a number of advantages over single pane configurations; for example, multi-pane configurations can provide enhanced thermal insulation, noise insulation, environmental protection and/or durability when compared with single-pane configurations. A multi-pane configuration also can provide increased protection for an ECD, for example, because the electrochromic films, as well as associated layers and conductive interconnects, can be formed on an interior surface of the multi-pane IGU and be protected by an inert gas fill in the interior volume, 108, of the IGU.

FIG. 1 more particularly shows an example implementation of an IGU 100 that includes a first pane 104 having a first surface S1 and a second surface S2. In some implementations, the first surface S1 of the first pane 104 faces an exterior environment, such as an outdoors or outside environment. The IGU 100 also includes a second pane 106 having a first surface S3 and a second surface S4. In some implementations, the second surface S4 of the second pane 106 faces an interior environment, such as an inside environment of a home, building or vehicle, or a room or compartment within a home, building or vehicle.

In some implementations, each of the first and the second panes 104 and 106 are transparent or translucent—at least to light in the visible spectrum. For example, each of the panes 104 and 106 can be formed of a glass material and especially an architectural glass or other shatter-resistant glass material such as, for example, a silicon oxide ($SO_x$)-based glass material. As a more specific example, each of the first and the second panes 104 and 106 can be a soda-lime glass substrate or float glass substrate. Such glass substrates can be composed of, for example, approximately 75% silica ($SiO_2$) as well as $Na_2O$, CaO, and several minor additives. However, each of the first and the second panes 104 and 106 can be formed of any material having suitable optical, electrical, thermal, and mechanical properties. For example, other suitable substrates that can be used as one or both of the first and the second panes 104 and 106 can include other glass materials as well as plastic, semi-plastic and thermo-plastic materials (for example, poly(methyl methacrylate), polystyrene, polycarbonate, allyl diglycol carbonate, SAN (styrene acrylonitrile copolymer), poly(4-methyl-1-pentene), polyester, polyamide), or mirror materials. In some implementations, each of the first and the second panes 104 and 106 can be strengthened, for example, by tempering, heating, or chemically strengthening.

Generally, each of the first and the second panes 104 and 106, as well as the IGU 100 as a whole, is a rectangular solid. However, in some other implementations other shapes are possible and may be desired (for example, circular, elliptical, triangular, curvilinear, convex or concave shapes). In some specific implementations, a length "L" of each of the first and the second panes 104 and 106 can be in the range of approximately 20 inches (in.) to approximately 10 feet (ft.), a width "W" of each of the first and the second panes 104 and 106 can be in the range of approximately 20 in. to approximately 10 ft., and a thickness "T" of each of the first and the second panes 104 and 106 can be in the range of approximately 0.3 millimeter (mm) to approximately 10 mm (although other lengths, widths or thicknesses, both smaller and larger, are possible and may be desirable based on the needs of a particular user, manager, administrator, builder, architect or owner). In examples where thickness T of substrate 104 is less than 3 mm, typically the substrate is laminated to an additional substrate which is thicker and thus protects the thin substrate 104. Additionally, while the IGU 100 includes two panes (104 and 106), in some other implementations, an IGU can include three or more panes. Furthermore, in some implementations, one or more of the panes can itself be a laminate structure of two, three, or more layers or sub-panes.

The first and second panes 104 and 106 are spaced apart from one another by a spacer 118, which is typically a frame structure, to form an interior volume 108. In some implementations, the interior volume is filled with Argon (Ar), although in some other implementations, the interior volume 108 can be filled with another gas, such as another noble gas (for example, krypton (Kr) or xenon (Xn)), another (non-noble) gas, or a mixture of gases (for example, air). Filling the interior volume 108 with a gas such as Ar, Kr, or Xn can reduce conductive heat transfer through the IGU 100 because of the low thermal conductivity of these gases as well as improve acoustic insulation due to their increased atomic weights. In some other implementations, the interior volume 108 can be evacuated of air or other gas. Spacer 118 generally determines the height "C" of the interior volume 108; that is, the spacing between the first and the second panes 104 and 106. In FIG. 1, the thickness of the ECD, sealant 120/122 and bus bars 126/128 is not to scale; these components are generally very thin but are exaggerated here for ease of illustration only. In some implementations, the spacing "C" between the first and the second panes 104 and 106 is in the range of approximately 6 mm to approximately 30 mm. The width "D" of spacer 118 can be in the range of approximately 5 mm to approximately 15 mm (although other widths are possible and may be desirable).

Although not shown in the cross-sectional view, spacer 118 is generally a frame structure formed around all sides of the IGU 100 (for example, top, bottom, left and right sides of the IGU 100). For example, spacer 118 can be formed of a foam or plastic material. However, in some other implementations, spacers can be formed of metal or other conductive material, for example, a metal tube or channel structure having at least 3 sides, two sides for sealing to each of the substrates and one side to support and separate the lites and as a surface on which to apply a sealant, 124. A first primary seal 120 adheres and hermetically seals spacer 118 and the second surface S2 of the first pane 104. A second primary seal 122 adheres and hermetically seals spacer 118 and the first surface S3 of the second pane 106. In some implementations, each of the primary seals 120 and 122 can be formed of an adhesive sealant such as, for example, polyisobutylene (PIB). In some implementations, IGU 100 further includes secondary seal 124 that hermetically seals a border around the entire IGU 100 outside of spacer 118. To this end, spacer 118 can be inset from the edges of the first and the second panes 104 and 106 by a distance "E." The distance "E" can be in the range of approximately 4 mm to approximately 8 mm (although other distances are possible and may be desirable). In some implementations, secondary seal 124 can be formed of an adhesive sealant such as, for example, a polymeric material that resists water and that adds structural support to the assembly, such as silicone, polyurethane and similar structural sealants that form a water tight seal.

In the particular configuration and form factor depicted in FIG. 1, the ECD coating on surface S2 of substrate 104 extends about its entire perimeter to and under spacer 118. This configuration is functionally desirable as it protects the edge of the ECD within the primary sealant 120 and aesthetically desirable because within the inner perimeter of spacer 118 there is a monolithic ECD without any bus bars or scribe lines. Such configurations are described in more detail in U.S. Pat. No. 8,164,818, issued Apr. 24, 2012 and titled ELECTROCHROMIC WINDOW FABRICATION METHODS, U.S. patent application Ser. No. 13/456,056 filed Apr. 25, 2012 and titled ELECTROCHROMIC WINDOW FABRICATION METHODS, PCT Patent Application No. PCT/US2012/068817 filed Dec. 10, 2012 and titled THIN-FILM DEVICES AND FABRICATION, U.S. patent application Ser. No. 14/362,863 filed Jun. 4, 2014 and titled THIN-FILM DEVICES AND FABRICATION, and PCT Patent Application No. PCT/US2014/073081, filed Dec. 13, 2014 and titled THIN-FILM DEVICES AND FABRICATION, all of which are hereby incorporated by reference in their entireties and for all purposes.

In the implementation shown in FIG. 1, an ECD 110 is formed on the second surface S2 of the first pane 104. In some other implementations, ECD 110 can be formed on another suitable surface, for example, the first surface S1 of the first pane 104, the first surface S3 of the second pane 106 or the second surface S4 of the second pane 106. The ECD 110 includes an electrochromic ("EC") stack 112, which itself may include one or more layers. For example, the EC stack 112 can include an electrochromic layer, an ion-conducting layer, and a counter electrode layer. In some implementations, the electrochromic layer is formed of one or more inorganic solid materials. The electrochromic layer can include or be formed of one or more of a number of electrochromic materials, including electrochemically-cathodic or electrochemically-anodic materials. For example, metal oxides suitable for use as the electrochromic layer can include tungsten oxide ($WO_3$) and doped formulations thereof. In some implementations, the electrochromic layer can have a thickness in the range of approximately 0.05 µm to approximately 1 µm.

In some implementations, the counter electrode layer is formed of an inorganic solid material. The counter electrode layer can generally include one or more of a number of materials or material layers that can serve as a reservoir of ions when the EC device 110 is in, for example, the transparent state. In certain implementations, the counter electrode not only serves as an ion storage layer but also colors anodically. For example, suitable materials for the counter electrode layer include nickel oxide (NiO) and nickel tungsten oxide (NiWO), as well as doped forms thereof, such as nickel tungsten tantalum oxide, nickel tungsten tin oxide, nickel vanadium oxide, nickel chromium oxide, nickel aluminum oxide, nickel manganese oxide, nickel magnesium oxide, nickel tantalum oxide, nickel tin oxide as non-limiting examples. In some implementations, the counter electrode layer can have a thickness in the range of approximately 0.05 µm to approximately 1 µm.

The ion-conducting layer serves as a medium through which ions are transported (for example, in the manner of an electrolyte) when the EC stack 112 transitions between optical states. In some implementations, the ion-conducting layer is highly conductive to the relevant ions for the electrochromic and the counter electrode layers, but also has sufficiently low electron conductivity such that negligible electron transfer (electrical shorting) occurs during normal operation. A thin ion-conducting layer with high ionic conductivity enables fast ion conduction and consequently fast switching for high performance EC devices 110. In some implementations, the ion-conducting layer can have a thickness in the range of approximately 1 nm to approximately 500 nm, more generally in the range of about 5 nm to about 100 nm thick. In some implementations, the ion-conducting layer also is an inorganic solid. For example, the ion-conducting layer can be formed from one or more silicates, silicon oxides (including silicon-aluminum-oxide), tungsten oxides (including lithium tungstate), tantalum oxides, niobium oxides, lithium oxide and borates. These materials also can be doped with different dopants, including lithium; for example, lithium-doped silicon oxides include lithium silicon-aluminum-oxide, lithium phosphorous oxynitride (LiPON) and the like.

In some other implementations, the electrochromic layer and the counter electrode layer are formed immediately adjacent one another, sometimes in direct contact, without an ion-conducting layer in between and then an ion conductor material formed in situ between the electrochromic and counter electrode layers. A further description of suitable devices is found in U.S. Pat. No. 8,764,950, titled ELECTROCHROMIC DEVICES, by Wang et al., issued Jul. 1, 2014 and U.S. Pat. No. 9,261,751, titled ELECTROCHROMIC DEVICES, by Pradhan et al., issued Feb. 16, 2016, each of which is hereby incorporated by reference in its entirety and for all purposes. In some implementations, the EC stack 112 also can include one or more additional layers such as one or more passive layers. For example, passive layers can be used to improve certain optical properties, to provide moisture or to provide scratch resistance. These or other passive layers also can serve to hermetically seal the EC stack 112. Additionally, various layers, including conducting layers (such as the first and the second TCO layers 114 and 116 described below), can be treated with anti-reflective or protective oxide or nitride layers.

The selection or design of the electrochromic and counter electrode materials generally governs the possible optical transitions. During operation, in response to a voltage generated across the thickness of the EC stack 112 (for example, between the first and the second TCO layers 114 and 116), the electrochromic layer transfers or exchanges ions to or from the counter electrode layer to drive the electrochromic layer to the desired optical state. In some implementations, to cause the EC stack 112 to transition to a transparent state, a positive voltage is applied across the EC stack 112 (for example, such that the electrochromic layer is more positive than the counter electrode layer). In some such implementations, in response to the application of the positive voltage, the available ions in the stack reside primarily in the counter electrode layer. When the magnitude of the potential across the EC stack 112 is reduced or when the polarity of the potential is reversed, ions are transported back across the ion conducting layer to the electrochromic layer causing the electrochromic material to transition to an opaque state (or to a "more tinted," "darker" or "less transparent" state). Conversely, in some other implementations using electrochromic layers having different properties, to cause the EC stack 112 to transition to an opaque state, a negative voltage can be applied to the electrochromic layer relative to the counter electrode layer. In such implementations, when the magnitude of the potential across the EC stack 112 is reduced or its polarity reversed, the ions are transported back across the ion conducting layer to the electrochromic layer causing the electrochromic material to transition to a clear or "bleached" state (or to a "less tinted", "lighter" or "more transparent" state).

In some implementations, the transfer or exchange of ions to or from the counter electrode layer also results in an optical transition in the counter electrode layer. For example, in some implementations the electrochromic and counter electrode layers are complementary coloring layers. More specifically, in some such implementations, when or after ions are transferred into the counter electrode layer, the counter electrode layer becomes more transparent, and similarly, when or after the ions are transferred out of the electrochromic layer, the electrochromic layer becomes more transparent. Conversely, when the polarity is switched, or the potential is reduced, and the ions are transferred from the counter electrode layer into the electrochromic layer, both the counter electrode layer and the electrochromic layer become less transparent.

In one more specific example, responsive to the application of an appropriate electric potential across a thickness of EC stack 112, the counter electrode layer transfers all or a portion of the ions it holds to the electrochromic layer causing the optical transition in the electrochromic layer. In some such implementations, for example, when the counter electrode layer is formed from NiWO, the counter electrode layer also optically transitions with the loss of ions it has transferred to the electrochromic layer. When charge is removed from a counter electrode layer made of NiWO (that is, ions are transported from the counter electrode layer to the electrochromic layer), the counter electrode layer will transition in the opposite direction.

Generally, the transition of the electrochromic layer from one optical state to another optical state can be caused by reversible ion insertion into the electrochromic material (for example, by way of intercalation) and a corresponding injection of charge-balancing electrons. In some instances, some fraction of the ions responsible for the optical transition is irreversibly bound up in the electrochromic material. Some or all of the irreversibly bound ions can be used to compensate for "blind charge" in the material. In some implementations, suitable ions include lithium ions (Li+) and hydrogen ions (H+) (i.e., protons). In some other implementations, other ions can be suitable. Intercalation of lithium ions, for example, into tungsten oxide ($WO_{3-y}$ ($0<y\leq\sim0.3$)) causes the tungsten oxide to change from a transparent state to a blue state.

The description below generally focuses on tinting transitions. One example of a tinting transition is a transition from a transparent (or "translucent," "bleached" or "least tinted") state to an opaque (or "fully darkened" or "fully tinted") state. Another example of a tinting transition is the reverse—a transition from an opaque state to a transparent state. Other examples of tinting transitions includes transitions to and from various intermediate tint states, for example, a transition from a less tinted, lighter or more transparent state to a more tinted, darker or less transparent state, and vice versa. Each of such tint states, and the tinting transitions between them, may be characterized or described in terms of percent transmission. For example, a tinting transition can be described as being from a current percent transmission (% T) to a target % T. Conversely, in some other instances, each of the tint states and the tinting transitions between them may be characterized or described in terms of percent tinting; for example, a transition from a current percent tinting to a target percent tinting.

However, although the following description generally focuses on tint states and tinting transitions between tint states, other optical states and optical transitions also are achievable in various implementations. As such, where appropriate and unless otherwise indicated, references to tint states or tinting transitions also are intended to encompass other optical states and optical transitions. In other words, optical states and optical state transitions also will be referred to herein as tint states and tint state transitions, respectively, but this is not intended to limit the optical states and state transitions achievable by the IGUs 302. For example, such other optical states and state transitions can include states and state transitions associated with various colors, intensities of color (for example, from lighter blue to darker blue and vice versa), reflectivity (for example, from less reflective to more reflective and vice versa), polarization (for example, from less polarization to more polarization and vice versa), and scattering density (for example, from less scattering to more scattering and vice versa), among others. Similarly, references to devices, control algorithms or processes for controlling tint states, including causing tinting transitions and maintaining tint states, also are intended to encompass such other optical transitions and optical states. Additionally, controlling the voltage, current or other electrical characteristics provided to an optically-switchable device, and the functions or operations associated with such controlling, also may be described hereinafter as "driving" the device or the respective IGU, whether or not the driving involves a tint state transition or the maintaining of a current tint state.

The ECD 110 generally includes first and second conducting (or "conductive") layers. For example, the ECD 110 can includes a first transparent conductive oxide (TCO) layer 114 adjacent a first surface of the EC stack 112 and a second TCO layer 116 adjacent a second surface of the EC stack 112. In some implementations, the first TCO layer 114 can be formed on the second surface S2, the EC stack 112 can be formed on the first TCO layer 114, and the second TCO layer 116 can be formed on the EC stack 112. In some implementations, the first and the second TCO layers 114 and 116 can each be formed of one or more metal oxides including metal oxides doped with one or more metals. For example, some suitable metal oxides and doped metal oxides can include indium oxide, indium tin oxide (ITO), doped indium oxide, tin oxide, doped tin oxide, fluorinated tin oxide, zinc oxide, aluminum zinc oxide, doped zinc oxide, ruthenium oxide and doped ruthenium oxide, among others. While such materials are referred to as TCOs in this document, the term encompasses non-oxides as well as oxides that are transparent and electrically conductive such as certain thin film metals and certain non-metallic materials such as conductive metal nitrides and composite conductors, among other suitable materials. In some implementations, the first and the second TCO layers 114 and 116 are substantially transparent at least in the range of wavelengths where electrochromism is exhibited by the EC stack 112. In some implementations, the first and the second TCO layers 114 and 116 can each be deposited by physical vapor deposition (PVD) processes including, for example, sputtering. In some implementations, the first and the second TCO layers 114 and 116 can each have a thickness in the range of approximately 0.01 microns ($\mu m$) to approximately 1 $\mu m$. A transparent conductive material typically has an electronic conductivity significantly greater than that of the electrochromic material or the counter electrode material.

The first and the second TCO layers 114 and 116 serve to distribute electrical charge across respective first and second surfaces of the EC stack 112 to apply an electrical potential (voltage) across the thickness of the EC stack 112. For example, a first applied voltage can be applied to a first one of the TCO layers and a second applied voltage can be applied to a second one of the TCO layers. In some implementations, a first busbar 126 distributes the first applied voltage to the first TCO layer 114 and a second busbar 128 distributes the second applied voltage to the second TCO layer 116. In some other implementations, one of the first and the second busbars 126 and 128 can ground the respective one of the first and the second TCO layers 114 and 116. In other implementations the load can be floated with respect to the two TCOs. In various implementations, to modify one or more optical properties of the EC stack 112, and thus cause an optical transition, a controller can alter one or both of the first and second applied voltages to bring about a change in one or both of the magnitude and the polarity of the effective voltage applied across the EC stack 112. Desirably, the first and the second TCO layers 114 and 116 serve to uniformly distribute electrical charge over respective surfaces of the EC stack 112 with relatively little Ohmic potential drop from the outer regions of the respective surfaces to the inner regions of the surfaces. As such, it is generally desirable to minimize the sheet resistance of the first and the second TCO layers 114 and 116. In other words, it is generally desirable that each of the first and the second TCO layers 114 and 116 behaves as a substantially equipotential layer across all portions of the respective layer. In this way, the first and the second TCO layers 114 and 116 can uniformly apply an electric potential across a thickness of the EC stack 112 to effect a uniform optical transition of the EC stack 112.

In some implementations, each of the first and the second busbars 126 and 128 is printed, patterned, or otherwise formed such that it is oriented along a length of the first pane 104 along at least one border of the EC stack 112. For example, each of the first and the second busbars 126 and 128 can be formed by depositing a conductive ink, such as a silver ink, in the form of a line. In some implementations, each of the first and the second busbars 126 and 128 extends along the entire length (or nearly the entire length) of the first pane 104, and in some implementations, along more than one edge of the EC stack 112.

In some implementations, the first TCO layer 114, the EC stack 112 and the second TCO layer 116 do not extend to the edges of the first pane 104. For example, a laser edge delete (LED) or other operation can be used to remove portions of the first TCO layer 114, the EC stack 112 and the second TCO layer 116 such that these layers are separated or inset from the respective edges of the first pane 104 by a distance "G," which can be in the range of approximately 8 mm to approximately 10 mm (although other distances are possible and may be desirable). Additionally, in some implementations, an edge portion of the EC stack 112 and the second TCO layer 116 along one side of the first pane 104 is removed to enable the first busbar 126 to be formed on the first TCO layer 114 to enable conductive coupling between the first busbar 126 and the first TCO layer 114. The second busbar 128 is formed on the second TCO layer 116 to enable conductive coupling between the second busbar 128 and the second TCO layer 116. In some implementations, the first and the second busbars 126 and 128 are formed in a region between spacer 118 and the first pane 104 as shown in FIG. 1. For example, each of the first and the second busbars 126 and 128 can be inset from an inner edge of spacer 118 by at least a distance "F," which can be in the range of approximately 2 mm to approximately 3 mm (although other distances are possible and may be desirable). This arrangement can be advantageous for a number of reasons including, for example, to hide the busbars from view.

As noted above, the usage of the IGU convention is for convenience only. Indeed, in some implementations the basic unit of an electrochromic window can be defined as a pane or substrate of transparent material, upon which an ECD is formed or otherwise arranged, and to which associated electrical connections are coupled (to drive the ECD). As such, references to an IGU in the following description do not necessarily include all of the components described with reference to the IGU 100 of FIG. 1.

Example Control Profile for Driving Optical Transitions

Figure 2:
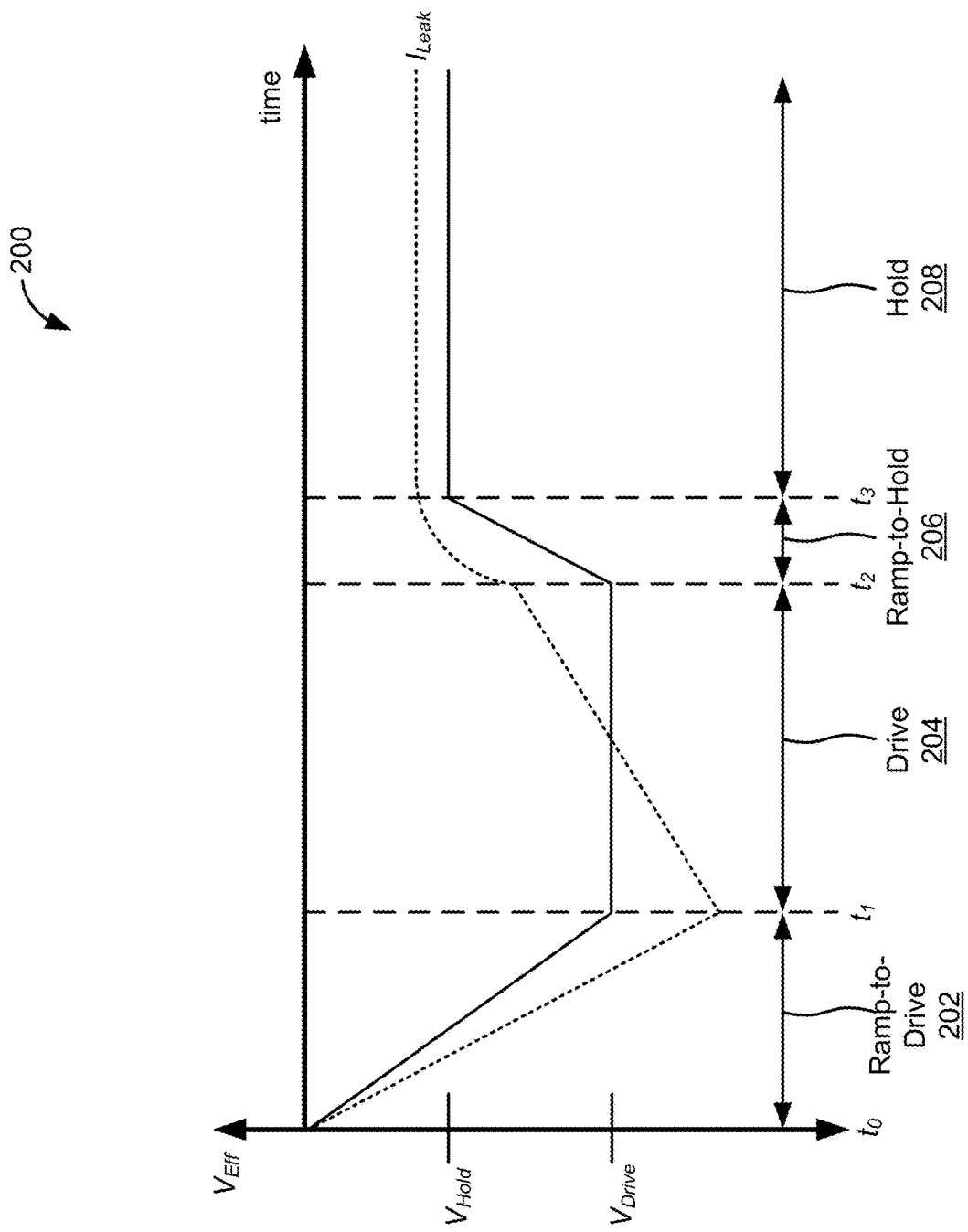
FIG. 2 illustrates an example control profile in accordance with some implementations.

FIG. 2 illustrates an example control profile 200 in accordance with some implementations. The control profile 200 can be used to drive a transition in an optically-switchable device, such as the ECD 110 described above. In some implementations, a window controller can be used to generate and apply the control profile 200 to drive an ECD from a first optical state (for example, a transparent state or a first intermediate state) to a second optical state (for example, a fully tinted state or a more tinted intermediate state). To drive the ECD in the reverse direction—from a more tinted state to a less tinted state—the window controller can apply a similar but inverted profile. For example, the control profile for driving the ECD from the second optical state to the first optical state can be a mirror image of the voltage control profile depicted in FIG. 2. In some other implementations, the control profiles for tinting and lightening can be asymmetric. For example, transitioning from a first more tinted state to a second less tinted state can in some instances require more time than the reverse; that is, transitioning from the second less tinted state to the first more tinted state. In some other instances, the reverse may be true; that is, transitioning from the second less tinted state to the first more tinted state can require more time. In other words, by virtue of the device architecture and materials, bleaching or lightening is not necessarily simply the reverse of coloring or tinting. Indeed, ECDs often behave differently for each transition due to differences in driving forces for ion intercalation and deintercalation to and from the electrochromic materials.

In some implementations, the control profile 200 is a voltage control profile implemented by varying a voltage provided to the ECD. For example, the solid line in FIG. 2 represents an effective voltage $V_{Eff}$ applied across the ECD over the course of a tinting transition and a subsequent maintenance period. In other words, the solid line can represent the relative difference in the electrical voltages $V_{App1}$ and $V_{App2}$ applied to the two conducting layers of the ECD (for example, the first and the second TCO layers 114 and 116 of the ECD 110). The dotted line in FIG. 2 represents a corresponding current (I) through the device. In the illustrated example, the voltage control profile 200 includes four stages: a ramp-to-drive stage 202 that initiates the transition, a drive stage that continues to drive the transition, a ramp-to-hold stage, and subsequent hold stage.

The ramp-to-drive stage 202 is characterized by the application of a voltage ramp that increases in magnitude from an initial value at time $t_0$ to a maximum driving value of $V_{Drive}$ at time $t_1$. In some implementations, the ramp-to-drive stage 202 can be defined by three drive parameters known or set by the window controller: the initial voltage at $t_0$ (the current voltage across the ECD at the start of the transition), the magnitude of $V_{Drive}$ (governing the ending optical state), and the time duration during which the ramp is applied (dictating the speed of the transition). Additionally or alternatively, the window controller also can set a target ramp rate, a maximum ramp rate or a type of ramp (for example, a linear ramp, a second degree ramp or an $n^{th}$-degree ramp). In some applications, the ramp rate can be limited to avoid damaging the ECD.

The drive stage 204 is characterized by the application of a constant voltage $V_{Drive}$ starting at time $t_1$ and ending at time $t_2$, at which point the ending optical state is reached (or approximately reached). The ramp-to-hold stage 206 is characterized by the application of a voltage ramp that decreases in magnitude from the drive value $V_{Drive}$ at time $t_2$ to a minimum holding value of $V_{Hold}$ at time $t_3$. In some implementations, the ramp-to-hold stage 206 can be defined by three drive parameters known or set by the window controller: the drive voltage $V_{Drive}$, the holding voltage $V_{Hold}$, and the time duration during which the ramp is applied. Additionally or alternatively, the window controller also can set a ramp rate or a type of ramp (for example, a linear ramp, a second degree ramp or an $n^{th}$-degree ramp).

The hold stage 208 is characterized by the application of a constant voltage $V_{Hold}$ starting at time $t_3$. The holding voltage $V_{Hold}$ is used to maintain the ECD at the ending optical state. As such, the duration of the application of the holding voltage $V_{hold}$ may be concomitant with the duration of time that the ECD is to be held in the ending optical state. For example, because of non-idealities associated with the ECD, a leakage current $I_{Leak}$ can result in the slow drainage of electrical charge from the ECD. Such a drainage of electrical charge can result in a corresponding reversal of ions across the ECD, and consequently, a slow reversal of the optical transition. In such applications, the holding voltage $V_{Hold}$ can be continuously applied to counter or prevent the leakage current. In some other implementations, the holding voltage $V_{Hold}$ can be applied periodically to "refresh" the desired optical state, or in other words, to bring the ECD back to the desired optical state.

The voltage control profile 200 illustrated and described with reference to FIG. 2 is only one example of a voltage control profile suitable for some implementations. However, many other profiles may be desirable or suitable in such implementations or in various other implementations or applications. These other profiles also can readily be achieved using the controllers and optically-switchable devices disclosed herein. For example, in some implementations, a current profile can be applied instead of a voltage profile. In some such instances, a current control profile similar to that of the current density shown in FIG. 2 can be applied. In some other implementations, a control profile can have more than four stages. For example, a voltage control profile can include one or more overdrive stages. In one example implementation, the voltage ramp applied during the first stage 202 can increase in magnitude beyond the drive voltage $V_{Drive}$ to an overdrive voltage $V_{OD}$. In some such implementations, the first stage 202 can be followed by a ramp stage 203 during which the applied voltage decreases from the overdrive voltage $V_{OD}$ to the drive voltage $V_{Drive}$. In some other such implementations, the overdrive voltage $V_{OD}$ can be applied for a relatively short time duration before the ramp back down to the drive voltage $V_{Drive}$.

Additionally, in some implementations, the applied voltage or current profiles can be interrupted for relatively short durations of time to provide open circuit conditions across the device. While such open circuit conditions are in effect, an actual voltage or other electrical characteristics can be measured, detected or otherwise determined to monitor how far along an optical transition has progressed, and in some instances, to determine whether changes in the profile are desirable. Such open circuit conditions also can be provided during a hold stage to determine whether a holding voltage $V_{Hold}$ should be applied or whether a magnitude of the holding voltage $V_{Hold}$ should be changed. Additional information related to driving and monitoring an optical transition is provided in PCT Patent Application No. PCT/US14/43514 filed Jun. 20, 2014 and titled CONTROLLING TRANSITIONS IN OPTICALLY SWITCHABLE DEVICES, which is hereby incorporated by reference in its entirety and for all purposes.

Example Controller Network Architecture

Figure 3:
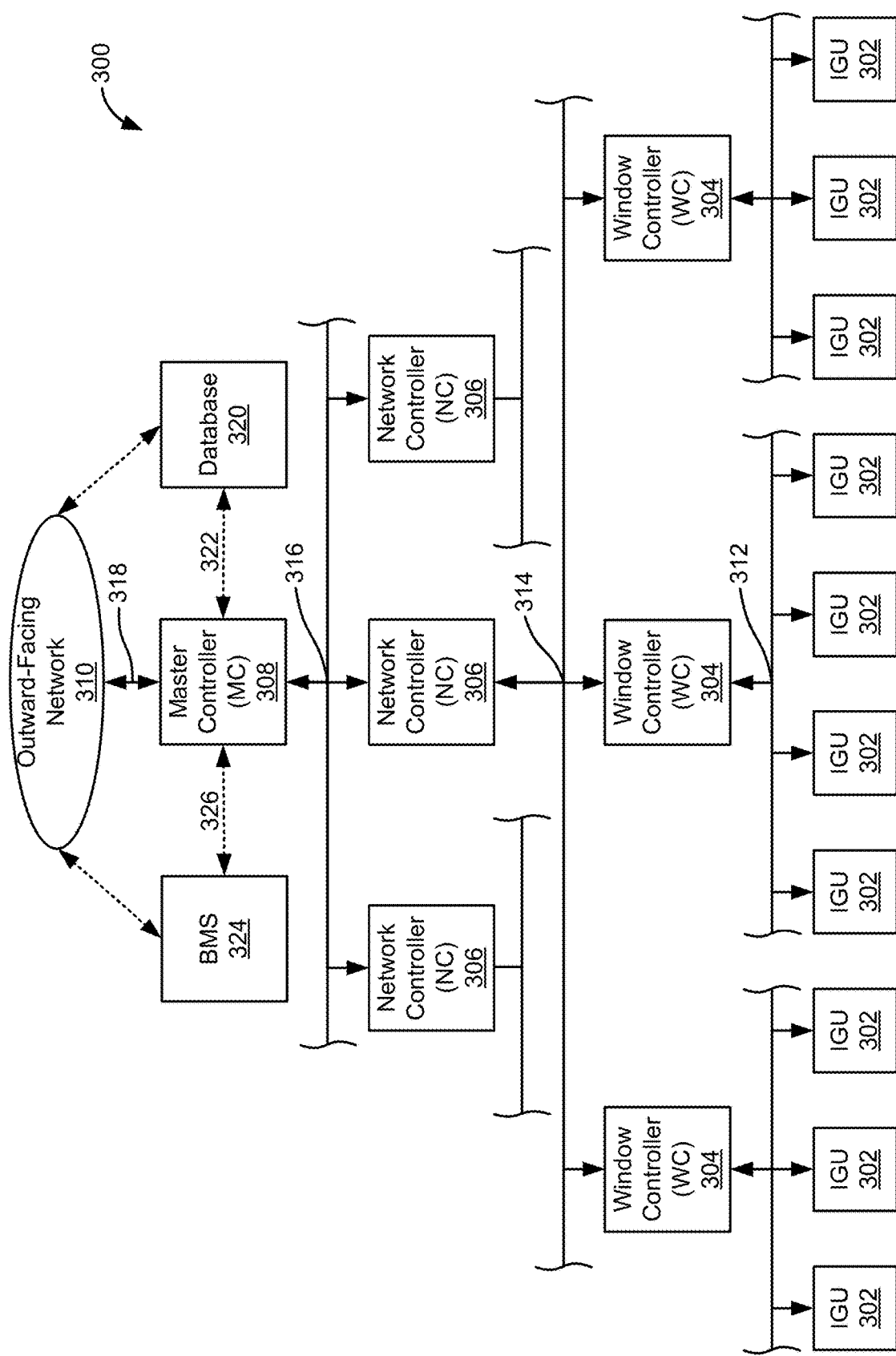
FIG. 3 shows a block diagram of an example network system operable to control a plurality of IGUs in accordance with some implementations.

In many instances, optically-switchable windows can form or occupy substantial portions of a building envelope. For example, the optically-switchable windows can form substantial portions of the walls, facades and even roofs of a corporate office building, other commercial building or a residential building. In various implementations, a distributed network of controllers can be used to control the optically-switchable windows. FIG. 3 shows a block diagram of an example network system, 300, operable to control a plurality of IGUs 302 in accordance with some implementations. For example, each of the IGUs 302 can be the same or similar to the IGU 100 described above with reference to FIG. 1. One primary function of the network system 300 is controlling the optical states of the ECDs (or other optically-switchable devices) within the IGUs 302. In some implementations, one or more of the windows 302 can be multi-zoned windows, for example, where each window includes two or more independently controllable ECDs or zones. In various implementations, the network system 300 is operable to control the electrical characteristics of the power signals provided to the IGUs 302. For example, the network system 300 can generate and communicate tinting instructions (also referred to herein as "tint commands") to control voltages applied to the ECDs within the IGUs 302.

In some implementations, another function of the network system 300 is to acquire status information from the IGUs 302 (hereinafter "information" is used interchangeably with "data"). For example, the status information for a given IGU can include an identification of, or information about, a current tint state of the ECD(s) within the IGU. The network system 300 also can be operable to acquire data from various sensors, such as temperature sensors, photosensors (also referred to herein as light sensors), humidity sensors, air flow sensors, or occupancy sensors, whether integrated on or within the IGUs 302 or located at various other positions in, on or around the building.

The network system 300 can include any suitable number of distributed controllers having various capabilities or functions. In some implementations, the functions and arrangements of the various controllers are defined hierarchically. For example, the network system 300 includes a plurality of distributed window controllers (WCs) 304, a plurality of network controllers (NCs) 306, and a master controller (MC) 308. In some implementations, the MC 308 can communicate with and control tens or hundreds of NCs 306. In various implementations, the MC 308 issues high level instructions to the NCs 306 over one or more wired or wireless links 316 (hereinafter collectively referred to as "link 316"). The instructions can include, for example, tint commands for causing transitions in the optical states of the IGUs 302 controlled by the respective NCs 306. Each NC 306 can, in turn, communicate with and control a number of WCs 304 over one or more wired or wireless links 314 (hereinafter collectively referred to as "link 314"). For example, each NC 306 can control tens or hundreds of the WCs 304. Each WC 304 can, in turn, communicate with, drive or otherwise control one or more respective IGUs 302 over one or more wired or wireless links 312 (hereinafter collectively referred to as "link 312").

The MC 308 can issue communications including tint commands, status request commands, data (for example, sensor data) request commands or other instructions. In some implementations, the MC 308 can issue such communications periodically, at certain predefined times of day (which may change based on the day of week or year), or based on the detection of particular events, conditions or combinations of events or conditions (for example, as determined by acquired sensor data or based on the receipt of a request initiated by a user or by an application or a combination of such sensor data and such a request). In some implementations, when the MC 308 determines to cause a tint state change in a set of one or more IGUs 302, the MC 308 generates or selects a tint value corresponding to the desired tint state. In some implementations, the set of IGUs 302 is associated with a first protocol identifier (ID) (for example, a BACnet ID). The MC 308 then generates and transmits a communication—referred to herein as a "primary tint command"—including the tint value and the first protocol ID over the link 316 via a first communication protocol (for example, a BACnet compatible protocol). In some implementations, the MC 308 addresses the primary tint command to the particular NC 306 that controls the particular one or more WCs 304 that, in turn, control the set of IGUs 302 to be transitioned.

The NC 306 receives the primary tint command including the tint value and the first protocol ID and maps the first protocol ID to one or more second protocol IDs. In some implementations, each of the second protocol IDs identifies a corresponding one of the WCs 304. The NC 306 subsequently transmits a secondary tint command including the tint value to each of the identified WCs 304 over the link 314 via a second communication protocol. In some implementations, each of the WCs 304 that receives the secondary tint command then selects a voltage or current profile from an internal memory based on the tint value to drive its respectively connected IGUs 302 to a tint state consistent with the tint value. Each of the WCs 304 then generates and provides voltage or current signals over the link 312 to its respectively connected IGUs 302 to apply the voltage or current profile.

In some implementations, the various IGUs 302 can be advantageously grouped into zones of EC windows, each of which zones includes a subset of the IGUs 302. In some implementations, each zone of IGUs 302 is controlled by one or more respective NCs 306 and one or more respective WCs 304 controlled by these NCs 306. In some more specific implementations, each zone can be controlled by a single NC 306 and two or more WCs 304 controlled by the single NC 306. Said another way, a zone can represent a logical grouping of the IGUs 302. For example, each zone may correspond to a set of IGUs 302 in a specific location or area of the building that are driven together based on their location. As a more specific example, consider a building having four faces or sides: a North face, a South face, an East Face and a West Face. Consider also that the building has ten floors. In such a didactic example, each zone can correspond to the set of electrochromic windows 100 on a particular floor and on a particular one of the four faces. Additionally or alternatively, each zone may correspond to a set of IGUs 302 that share one or more physical characteristics (for example, device parameters such as size or age). In some other implementations, a zone of IGUs 302 can be grouped based on one or more non-physical characteristics such as, for example, a security designation or a business hierarchy (for example, IGUs 302 bounding managers' offices can be grouped in one or more zones while IGUs 302 bounding non-managers' offices can be grouped in one or more different zones).

In some such implementations, each NC 306 can address all of the IGUs 302 in each of one or more respective zones. For example, the MC 308 can issue a primary tint command to the NC 306 that controls a target zone. The primary tint command can include an abstract identification of the target zone (hereinafter also referred to as a "zone ID"). In some such implementations, the zone ID can be a first protocol ID such as that just described in the example above. In such cases, the NC 306 receives the primary tint command including the tint value and the zone ID and maps the zone ID to the second protocol IDs associated with the WCs 304 within the zone. In some other implementations, the zone ID can be a higher level abstraction than the first protocol IDs. In such cases, the NC 306 can first map the zone ID to one or more first protocol IDs, and subsequently map the first protocol IDs to the second protocol IDs.

User or Third Party Interaction with Network

In some implementations, the MC 308 is coupled to one or more outward-facing networks, 310, (hereinafter collectively referred to as "the outward-facing network 310") via one or more wired or wireless links 318 (hereinafter "link 318"). In some such implementations, the MC 308 can communicate acquired status information or sensor data to remote computers, mobile devices, servers, databases in or accessible by the outward-facing network 310. In some implementations, various applications, including third party applications or cloud-based applications, executing within such remote devices can access data from or provide data to the MC 308. In some implementations, authorized users or applications can communicate requests to modify the tint states of various IGUs 302 to the MC 308 via the network 310. In some implementations, the MC 308 can first determine whether to grant the request (for example, based on power considerations or based on whether the user has the appropriate authorization) prior to issuing a tint command. The MC 308 can then calculate, determine, select or otherwise generate a tint value and transmit the tint value in a primary tint command to cause the tint state transitions in the associated IGUs 302.

For example, a user can submit such a request from a computing device, such as a desktop computer, laptop computer, tablet computer or mobile device (for example, a smartphone). In some such implementations, the user's computing device can execute a client-side application that is capable of communicating with the MC 308, and in some instances, with a master controller application executing within the MC 308. In some other implementations, the client-side application can communicate with a separate application, in the same or a different physical device or system as the MC 308, which then communicates with the master controller application to effect the desired tint state modifications. In some implementations, the master controller application or other separate application can be used to authenticate the user to authorize requests submitted by the user. In some implementations, the user can select the IGUs 302 to be tinted, and inform the MC 308 of the selections, by entering a room number via the client-side application.

Additionally or alternatively, in some implementations, a user's mobile device or other computing device can communicate wirelessly with various WCs 304. For example, a client-side application executing within a user's mobile device can transmit wireless communications including tint state control signals to a WC 304 to control the tint states of the respective IGUs 302 connected to the WC 304. For example, the user can use the client-side application to maintain or modify the tint states of the IGUs 302 adjoining a room occupied by the user (or to be occupied by the user or others at a future time). Such wireless communications can be generated, formatted or transmitted using various wireless network topologies and protocols (described in more detail below with reference to the WC 600 of FIG. 6).

In some such implementations, the control signals sent to the respective WC 304 from the user's mobile device (or other computing device) can override a tint value previously received by the WC 304 from the respective NC 306. In other words, the WC 304 can provide the applied voltages to the IGUs 302 based on the control signals from the user's computing device rather than based on the tint value. For example, a control algorithm or rule set stored in and executed by the WC 304 can dictate that one or more control signals from an authorized user's computing device take precedence over a tint value received from the NC 306. In some other instances, such as in high demand cases, control signals such as a tint value from the NC 306 may take precedence over any control signals received by the WC 304 from a user's computing device. In some other instances, a control algorithm or rule set may dictate that tint overrides from only certain users or groups or classes of users may take precedence based on permissions granted to such users, as well as in some instances, other factors including time of day or the location of the IGUs 302.

In some implementations, based on the receipt of a control signal from an authorized user's computing device, the MC 308 can use information about a combination of known parameters to calculate, determine, select or otherwise generate a tint value that provides lighting conditions desirable for a typical user, while in some instances also using power efficiently. In some other implementations, the MC 308 can determine the tint value based on preset preferences defined by or for the particular user that requested the tint state change via the computing device. For example, the user may be required to enter a password or otherwise login or obtain authorization to request a tint state change. In such instances, the MC 308 can determine the identity of the user based on a password, a security token or based on an identifier of the particular mobile device or other computing device. After determining the user's identity, the MC 308 can then retrieve preset preferences for the user, and use the preset preferences alone or in combination with other parameters (such as power considerations or information from various sensors) to generate and transmit a tint value for use in tinting the respective IGUs 302.

Wall Devices

In some implementations, the network system 300 also can include wall switches, dimmers or other tint-state-controlling devices. A wall switch generally refers to an electromechanical interface connected to a WC. The wall switch can convey a tint command to the WC, which can then convey the tint command to the NC. Such devices also are hereinafter collectively referred to as "wall devices," although such devices need not be limited to wall-mounted implementations (for example, such devices also can be located on a ceiling or floor, or integrated on or within a desk or a conference table). For example, some or all of the offices, conference rooms or other rooms of the building can include such a wall device for use in controlling the tint states of the adjoining IGUs 302. For example, the IGUs 302 adjoining a particular room can be grouped into a zone. Each of the wall devices can be operated by an end user (for example, an occupant of the respective room) to control the tint state or other functions or parameters of the IGUs 302 that adjoin the room. For example, at certain times of the day, the adjoining IGUs 302 may be tinted to a dark state to reduce the amount of light energy entering the room from the outside (for example, to reduce AC cooling requirements). Now suppose that a user desires to use the room. In various implementations, the user can operate the wall device to communicate control signals to cause a tint state transition from the dark state to a lighter tint state.

In some implementations, each wall device can include one or more switches, buttons, dimmers, dials or other physical user interface controls enabling the user to select a particular tint state or to increase or decrease a current tinting level of the IGUs 302 adjoining the room. Additionally or alternatively, the wall device can include a display having a touchscreen interface enabling the user to select a particular tint state (for example, by selecting a virtual button, selecting from a dropdown menu or by entering a tint level or tinting percentage) or to modify the tint state (for example, by selecting a "darken" virtual button, a "lighten" virtual button, or by turning a virtual dial or sliding a virtual bar). In some other implementations, the wall device can include a docking interface enabling a user to physically and communicatively dock a portable device such as a smartphone, multimedia device, tablet computer or other portable computing device (for example, an IPHONE, IPOD or IPAD produced by Apple, Inc. of Cupertino, CA). In such implementations, the user can control the tinting levels via input to the portable device, which is then received by the wall device through the docking interface and subsequently communicated to the MC 308, NC 306 or WC 304. In such implementations, the portable device may include an application for communicating with an API presented by the wall device.

For example, the wall device can transmit a request for a tint state change to the MC 308. In some implementations, the MC 308 can first determine whether to grant the request (for example, based on power considerations or based on whether the user has the appropriate authorizations/permissions). The MC 308 can then calculate, determine, select or otherwise generate a tint value and transmit the tint value in a primary tint command to cause the tint state transitions in the adjoining IGUs 302. In some such implementations, each wall device can be connected with the MC 308 via one or more wired links (for example, over communication lines such as CAN or Ethernet compliant lines or over power lines using power line communication techniques). In some other implementations, each wall device can be connected with the MC 308 via one or more wireless links. In some other implementations, the wall device can be connected (via one or more wired or wireless connections) with an outward-facing network 310 such as a customer-facing network, which then communicates with the MC 308 via link 318.

In some implementations, the MC 308 can identify the IGUs 302 associated with the wall device based on previously programmed or discovered information associating the wall device with the IGUs 302. In some implementations, a control algorithm or rule set stored in and executed by the MC 308 can dictate that one or more control signals from a wall device take precedence over a tint value previously generated by the MC 308. In some other instances, such as in times of high demand (for example, high power demand), a control algorithm or rule set stored in and executed by the MC 308 can dictate that the tint value previously generated by the MC 308 takes precedence over any control signals received from a wall device.

In some other implementations or instances, based on the receipt of a tint-state-change request or control signal from a wall device, the MC 308 can use information about a combination of known parameters to generate a tint value that provides lighting conditions desirable for a typical user, while in some instances also using power efficiently. In some other implementations, the MC 308 can generate the tint value based on preset preferences defined by or for the particular user that requested the tint state change via the wall device. For example, the user may be required to enter a password into the wall device or to use a security token or security fob such as the IBUTTON or other 1-Wire device to gain access to the wall device. In such instances, the MC 308 can determine the identity of the user, based on the password, security token or security fob, retrieve preset preferences for the user, and use the preset preferences alone or in combination with other parameters (such as power considerations or information from various sensors) to calculate, determine, select or otherwise generate a tint value for the respective IGUs 302.

In some other implementations, the wall device can transmit a tint state change request to the appropriate NC 306, which then communicates the request, or a communication based on the request, to the MC 308. For example, each wall device can be connected with a corresponding NC 306 via one or more wired links such as those just described for the MC 308 or via a wireless link (such as those described below). In some other implementations, the wall device can transmit a request to the appropriate NC 306, which then itself determines whether to override a primary tint command previously received from the MC 308 or a primary or secondary tint command previously generated by the NC 306 (as described below, the NC 306 can in some implementations generate tint commands without first receiving a tint command from an MC 308). In some other implementations, the wall device can communicate requests or control signals directly to the WC 304 that controls the adjoining IGUs 302. For example, each wall device can be connected with a corresponding WC 304 via one or more wired links such as those just described for the MC 308 or via a wireless link (such as those described below with reference to the WC 600 of FIG. 6).

In some specific implementations, the NC 306 or the MC 308 determines whether the control signals from the wall device should take priority over a tint value previously generated by the NC 306 or the MC 308. As described above, in some implementations, the wall device can communicate directly with the NC 306. However, in some other implementations, the wall device can communicate requests directly to the MC 308 or directly to a WC 304, which then communicates the request to the NC 306. In still other implementations, the wall device can communicate requests to a customer-facing network (such as a network managed by the owners or operators of the building), which then passes the requests (or requests based therefrom) to the NC 306 either directly or indirectly by way of the MC 308. In some implementations, a control algorithm or rule set stored in and executed by the NC 306 or the MC 308 can dictate that one or more control signals from a wall device take precedence over a tint value previously generated by the NC 306 or the MC 308. In some other instances, such as in times of high demand (for example, high power demand), a control algorithm or rule set stored in and executed by the NC 306 or the MC 308 can dictate that the tint value previously generated by the NC 306 or the MC 308 takes precedence over any control signals received from a wall device.

As described above with reference to the MC 308, in some other implementations, based on the receipt of a tint-state-change request or control signal from a wall device, the NC 306 can use information about a combination of known parameters to generate a tint value that provides lighting conditions desirable for a typical user, while in some instances also using power efficiently. In some other implementations, the NC 306 or the MC 308 can generate the tint value based on preset preferences defined by or for the particular user that requested the tint state change via the wall device. As described above with reference to the MC 308, the user may be required to enter a password into the wall device or to use a security token or security fob such as the IBUTTON or other 1-Wire device to gain access to the wall device. In such instances, the NC 306 can communicate with the MC 308 to determine the identity of the user, or the MC 308 can alone determine the identity of the user, based on the password, security token or security fob, retrieve preset preferences for the user, and use the preset preferences alone or in combination with other parameters (such as power considerations or information from various sensors) to calculate, determine, select or otherwise generate a tint value for the respective IGUs 302.

In some implementations, the MC 308 is coupled to an external database (or "data store" or "data warehouse") 320. In some implementations, the database 320 can be a local database coupled with the MC 308 via a wired hardware link 322. In some other implementations, the database 320 can be a remote database or a cloud-based database accessible by the MC 308 via an internal private network or over the outward-facing network 310. In some implementations, other computing devices, systems or servers also can have access to read the data stored in the database 320, for example, over the outward-facing network 310. Additionally, in some implementations, one or more control applications or third party applications also can have access to read the data stored in the database via the outward-facing network 310. In some cases, the MC 308 stores in the database 320 a record of all tint commands including the corresponding tint values issued by the MC 308. The MC 308 also can collect status and sensor data and store it in the database 320. In such instances, the WCs 304 can collect the sensor data and status data from the IGUs 302 and communicate the sensor data and status data to the respective NCs 306 over link 314 for communication to the MC 308 over link 316. Additionally or alternatively, the NCs 306 or the MC 308 themselves also can be connected to various sensors such as light, temperature or occupancy sensors within the building as well as light or temperature sensors positioned on, around or otherwise external to the building (for example, on a roof of the building). In some implementations the NCs 306 or the WCs 304 also can transmit status or sensor data directly to the database 320 for storage.

Integration with Other Systems or Services

In some implementations, the network system 300 also can be designed to function in conjunction with modern heating, ventilation, and air conditioning (HVAC) systems, interior lighting systems, security systems or power systems as an integrated and efficient energy control system for an entire building or a campus of buildings. Some implementations of the network system 300 are suited for integration with a building management system (BMS), 324. A BMS is broadly a computer-based control system that can be installed in a building to monitor and control the building's mechanical and electrical equipment such as HVAC systems (including furnaces or other heaters, air conditioners, blowers and vents), lighting systems, power systems, elevators, fire systems, and security systems. The BMS can include hardware and associated firmware and software for maintaining conditions in the building according to preferences set by the occupants or by a building manager or other administrator. The software can be based on, for example, internet protocols or open standards. A BMS can typically be used in large buildings where it functions to control the environment within the building. For example, the BMS can control lighting, temperature, carbon dioxide levels, and humidity within the building. To control the building environment, the BMS can turn on and off various mechanical and electrical devices according to rules or in response to conditions. Such rules and conditions can be selected or specified by a building manager or administrator, for example. One function of a BMS can be to maintain a comfortable environment for the occupants of a building while minimizing heating and cooling energy losses and costs. In some implementations, the BMS can be configured not only to monitor and control, but also to optimize the synergy between various systems, for example, to conserve energy and lower building operation costs.

Additionally or alternatively, some implementations of the network system 300 are suited for integration with a smart thermostat service, alert service (for example, fire detection), security service or other appliance automation service. On example of a home automation service is NEST®, made by Nest Labs of Palo Alto, California, (NEST® is a registered trademark of Google, Inc. of Mountain View, California). As used herein, references to a BMS can in some implementations also encompass, or be replaced with, such other automation services.

In some implementations, the MC 308 and a separate automation service, such as a BMS 324, can communicate via an application programming interface (API). For example, the API can execute in conjunction with a master controller application (or platform) within the MC 308, or in conjunction with a building management application (or platform) within the BMS 324. The MC 308 and the BMS 324 can communicate over one or more wired links 326 or via the outward-facing network 310. In some instances, the BMS 324 can communicate instructions for controlling the IGUs 302 to the MC 308, which then generates and transmits primary tint commands to the appropriate NCs 306. In some implementations, the NCs 306 or the WCs 304 also can communicate directly with the BMS 324 (whether through a wired/hardware link or wirelessly through a wireless data link). In some implementations, the BMS 324 also can receive data, such as sensor data, status data and associated timestamp data, collected by one or more of the MC 308, the NCs 306 and the WCs 304. For example, the MC 308 can publish such data over the network 310. In some other implementations in which such data is stored in a database 320, the BMS 324 can have access to some or all of the data stored in the database 320.

Example Master Controller

Figure 4:
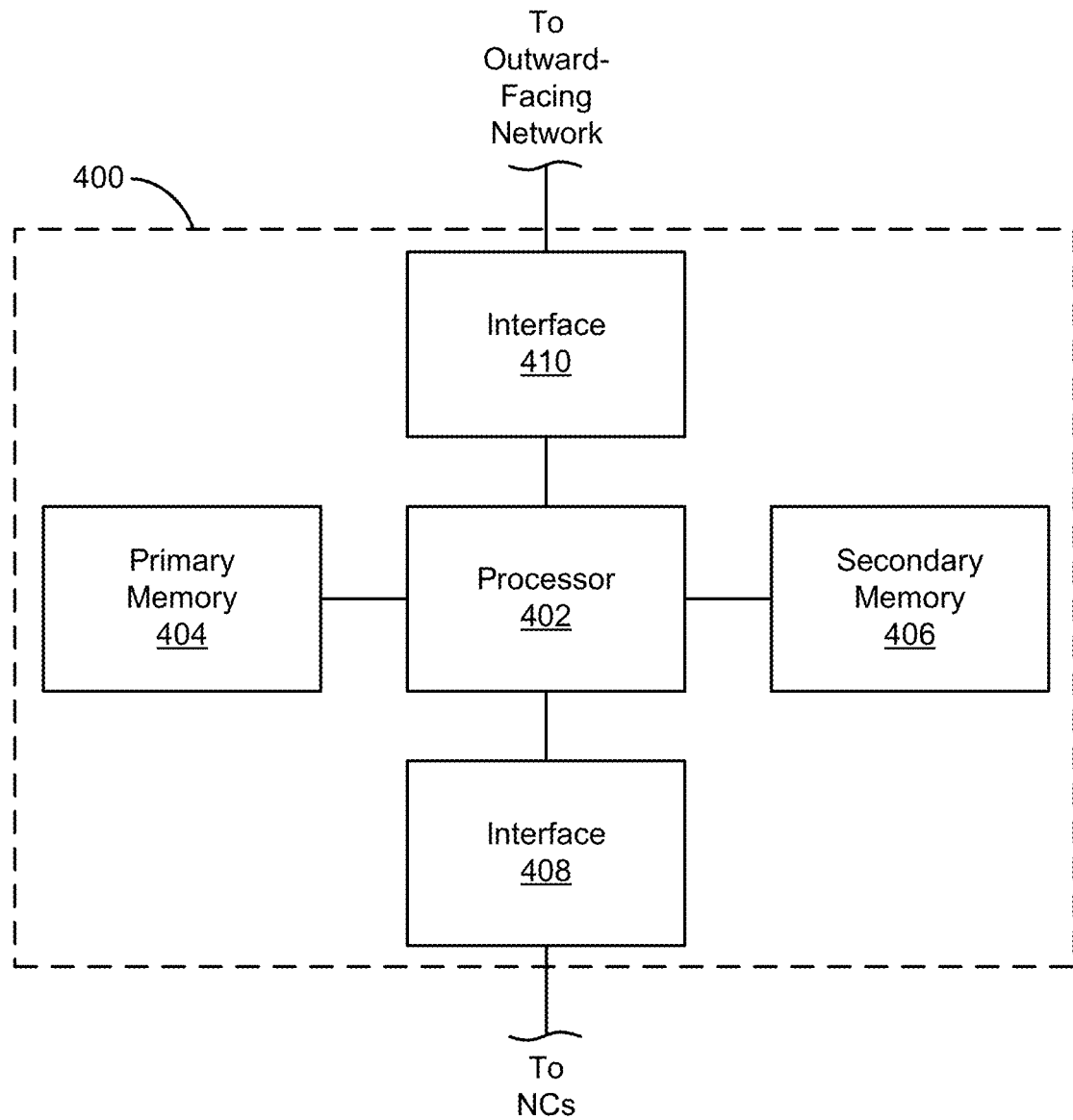
FIG. 4 shows a block diagram of an example master controller (MC) in accordance with some implementations.

FIG. 4 shows a block diagram of an example master controller (MC) 400 in accordance with some implementations. For example, the MC 400 of FIG. 4 can be used to implement the MC 308 described above with reference to the network system 300 of FIG. 3. As used herein, references to "the MC 400" also encompass the MC 308, and vice versa; in other words, the two references may be used interchangeably. The MC 400 can be implemented in or as one or more computers, computing devices or computer systems (herein used interchangeably where appropriate unless otherwise indicated). Additionally, reference to "the MC 400" collectively refers to any suitable combination of hardware, firmware and software for implementing the functions, operations, processes or capabilities described. For example, the MC 400 can refer to a computer that implements a master controller application (also referred to herein as a "program" or a "task").

As shown in FIG. 4, the MC 400 generally includes one or more processors 402 (also collectively referred to hereinafter as "the processor 402"). Processor 402 can be or can include a central processing unit (CPU), such as a single core or a multi-core processor. The processor 402 can additionally include a digital signal processor (DSP) or a network processor in some implementations. In some implementations, the processor 402 also can include one or more application-specific integrated circuits (ASICs). The processor 402 is coupled with a primary memory 404, a secondary memory 406, an inward-facing network interface 408 and an outward-facing network interface 410. The primary memory 404 can include one or more high-speed memory devices such as, for example, one or more random-access memory (RAM) devices including dynamic-RAM (DRAM) devices. Such DRAM devices can include, for example, synchronous DRAM (SDRAM) devices and double data rate SDRAM (DDR SDRAM) devices (including DDR2 SDRAM, DDR3 SDRAM, and DDR4 SDRAM), thyristor RAM (T-RAM), and zero-capacitor (Z-RAM®), among other suitable memory devices.

The secondary memory 406 can include one or more hard disk drives (HDDs) or one or more solid-state drives (SSDs). In some implementations, the memory 406 can store processor-executable code (or "programming instructions") for implementing a multi-tasking operating system such as, for example, an operating system based on a Linux® kernel. In some other implementations, the operating system can be a UNIX®- or Unix-like-based operating system, a Microsoft Windows®-based operating system, or another suitable operating system. The memory 406 also can store code executable by the processor 402 to implement the master controller application described above, as well as code for implementing other applications or programs. The memory 406 also can store status information, sensor data or other data collected from network controllers, window controllers and various sensors.

In some implementations, the MC 400 is a "headless" system; that is, a computer that does not include a display monitor or other user input device. In some such implementations, an administrator or other authorized user can log in to or otherwise access the MC 400 from a remote computer or mobile computing device over a network (for example, the network 310) to access and retrieve information stored in the MC 400, to write or otherwise store data in the MC 400, and to control various functions, operations, processes or parameters implemented or used by the MC 400. In some other implementations, the MC 400 also can include a display monitor and a direct user input device (for example, one or more of a mouse, a keyboard and a touchscreen).

In various implementations, the inward-facing network interface 408 enables the MC 400 to communicate with various distributed controllers, and in some implementations, also with various sensors. The inward-facing network interface 408 can collectively refer to one or more wired network interfaces or one or more wireless network interfaces (including one or more radio transceivers). In the context of the network system 300 of FIG. 3, the MC 400 can implement the MC 308 and the inward-facing network interface 408 can enable communication with the downstream NCs 306 over the link 316.

The outward-facing network interface 410 enables the MC 400 to communicate with various computers, mobile devices, servers, databases or cloud-based database systems over one or more networks. The outward-facing network interface 410 also can collectively refer to one or more wired network interfaces or one or more wireless network interfaces (including one or more radio transceivers). In the context of the network system 300 of FIG. 3, the outward-facing network interface 410 can enable communication with various computers, mobile devices, servers, databases or cloud-based database systems accessible via the outward-facing network 310 over the link 318. As described above, in some implementations, the various applications, including third party applications or cloud-based applications, executing within such remote devices can access data from or provide data to the MC 400 or to the database 320 via the MC 400. In some implementations, the MC 400 includes one or more APIs for facilitating communication between the MC 400 and various third party applications. Some example implementations of APIs that the MC 400 can enable are described in PCT Patent Application No. PCT/US15/64555 filed Dec. 8, 2015 and titled MULTIPLE INTERACTING SYSTEMS AT A SITE, which is hereby incorporated by reference in its entirety and for all purposes. For example, such third party applications can include various monitoring services including thermostat services, alert services (for example, fire detection), security services or other appliance automation services. Additional examples of monitoring services and systems can be found in PCT Patent Application No. PCT/US2015/019031 filed Mar. 5, 2015 and titled MONITORING SITES CONTAINING SWITCHABLE OPTICAL DEVICES AND CONTROLLERS, which is hereby incorporated by reference in its entirety and for all purposes.

In some implementations, one or both of the inward-facing network interface 408 and the outward-facing network interface 410 can include a BACnet compatible interface. BACnet is a communications protocol typically used in building automation and control networks and defined by the ASHRAE/ANSI 135 and ISO 16484-5 standards. The BACnet protocol broadly provides mechanisms for computerized building automation systems and devices to exchange information, regardless of the particular services they perform. For example, BACnet has traditionally been used to enable communication among heating, ventilating, and air-conditioning control (HVAC) systems, lighting control systems, access or security control systems, and fire detection systems as well as their associated equipment. In some other implementations, one or both of the inward-facing network interface 408 and the outward-facing network interface 410 can include an oBIX (Open Building Information Exchange) compatible interface or another RESTful Web Services-based interface. As such, while the following description is sometimes focused on BACnet implementations, in other implementations, other protocols compatible with oBIX or other RESTful Web Services can be used.

The BACnet protocol is generally based on a server-client architecture. In some implementations, as viewed from the outward-facing network 310, the MC 400 functions as a BACnet server. For example, the MC 400 can publish various information through the outward-facing network interface 410 over the network 310 to various authorized computers, mobile devices, servers or databases, or to various authorized applications executing on such devices. When viewed from the rest of the network system 300, the MC 400 can function as a client. In some such implementations, the NCs 306 function as BACnet servers collecting and storing status data, sensor data or other data acquired from the WCs 304, and publishing this acquired data such that it is accessible to the MC 400.

The MC 400 can communicate as a client to each of the NCs 306 using BACnet standard data types. Such BACnet data types can include analog values (AVs). In some such implementations, each NC 306 stores an array of AVs. The array of AVs can be organized by BACnet IDs. For example, each BACnet ID can be associated with at least two AVs; a first one of the AVs can be associated with a tint value set by the MC 400 and a second one of the AVs can be associated with a status indication value set (or received) from a respective WC 304. In some implementations, each BACnet ID can be associated with one or more WCs 304. For example, each of the WCs 304 can be identified by a second protocol ID such as a Controller Area Network (CAN) vehicle bus standard ID (referred to hereinafter as a "CAN ID"). In such implementations, each BACnet ID can be associated with one or more CAN IDs in the NC 306.

In some implementations, when the MC 400 determines to tint one or more IGUs 302, the MC 400 writes a specific tint value to the AV in the NC 306 associated with the one or more respective WCs 304 that control the target IGUs 302. In some more specific implementations, the MC 400 generates a primary tint command including a BACnet ID associated with the WCs 304 that control the target IGUs 302. The primary tint command also can include a tint value for the target IGUs 302. The MC 400 can direct the transmission of the primary tint command through the inward-facing interface 408 and to the particular NC 306 using a network address of the NC 306. For example, the network address of the NC 306 can include an Internet Protocol (IP) address (for example, an IPv4 or IPv6 address) or a Media Access Control (MAC) address (for example, when communicating over an Ethernet link 316).

The MC 400 can calculate, determine, select or otherwise generate a tint value for one or more IGUs 302 based on a combination of parameters. For example, the combination of parameters can include time or calendar information such as the time of day, day of year or time of season. Additionally or alternatively, the combination of parameters can include solar calendar information such as, for example, the direction of the sun relative to the IGUs 302. In some instances, the direction of the sun relative to the IGUs 302 can be determined by the MC 400 based on time and calendar information together with information known about the geographical location of the building on the Earth and the direction that the IGUs face (for example, in a North-East-Down coordinate system). The combination of parameters also can include the outside temperature (external to the building), the inside temperature (within a room adjoining the target IGUs 302), or the temperature within the interior volume of the IGUs 302. The combination of parameters also can include information about the weather (for example, whether it is clear, sunny, overcast, cloudy, raining or snowing). Parameters such as the time of day, day of year, or direction of the sun can be programmed into and tracked by the MC 308. Parameters such as the outside temperature, inside temperature or IGU temperature can be obtained from sensors in, on or around the building or sensors integrated on or within the IGUs 302. Some information about the weather also can be obtained from such sensors. Additionally or alternatively, parameters such as the time of day, time of year, direction of the sun, or weather can be provided by, or determined based on information provided by, various applications including third party applications over the network 310. Additional examples of algorithms, routines, modules, or other means for generating tint values are described in U.S. patent application Ser. No. 13/722,969 filed Feb. 21, 2013 and titled CONTROL METHOD FOR TINTABLE WINDOWS, and in PCT Patent Application No. PCT/2015/029675 filed May 7, 2015 and titled CONTROL METHOD FOR TINTABLE WINDOWS, both of which are hereby incorporated by reference in their entireties and for all purposes.

Generally, each ECD within each IGU 302 is capable of being tinted, responsive to a suitable driving voltage applied across the EC stack, to virtually any tint state within a continuous tint spectrum defined by the material properties of the EC stack. However, in some implementations, the MC 400 is programmed to select a tint value from a finite number of discrete tint values. For example, the tint values can be specified as integer values. In some such implementations, the number of available discrete tint values can be 4, 8, 16, 32, 64, 128 or 256 or more. For example, a 2-bit binary number can be used to specify any one of four possible integer tint values, a 3-bit binary number can be used to specify any one of eight possible integer tint values, a 4-bit binary number can be used to specify any one of sixteen possible integer tint values, a 5-bit binary number can be used to specify any one of thirty-two possible integer tint values, and so on. Each tint value can be associated with a target tint level (for example, expressed as a percentage of maximum tint, maximum safe tint, or maximum desired or available tint). For didactic purposes, consider an example in which the MC 400 selects from among four available tint values: 0, 5, 10 and 15 (using a 4-bit or higher binary number). The tint values 0, 5, 10 and 15 can be respectively associated with target tint levels of 60%, 40%, 20% and 4%, or 60%, 30%, 10% and 1%, or another desired, advantageous, or suitable set of target tint levels.

Example Network Controller

Figure 5:
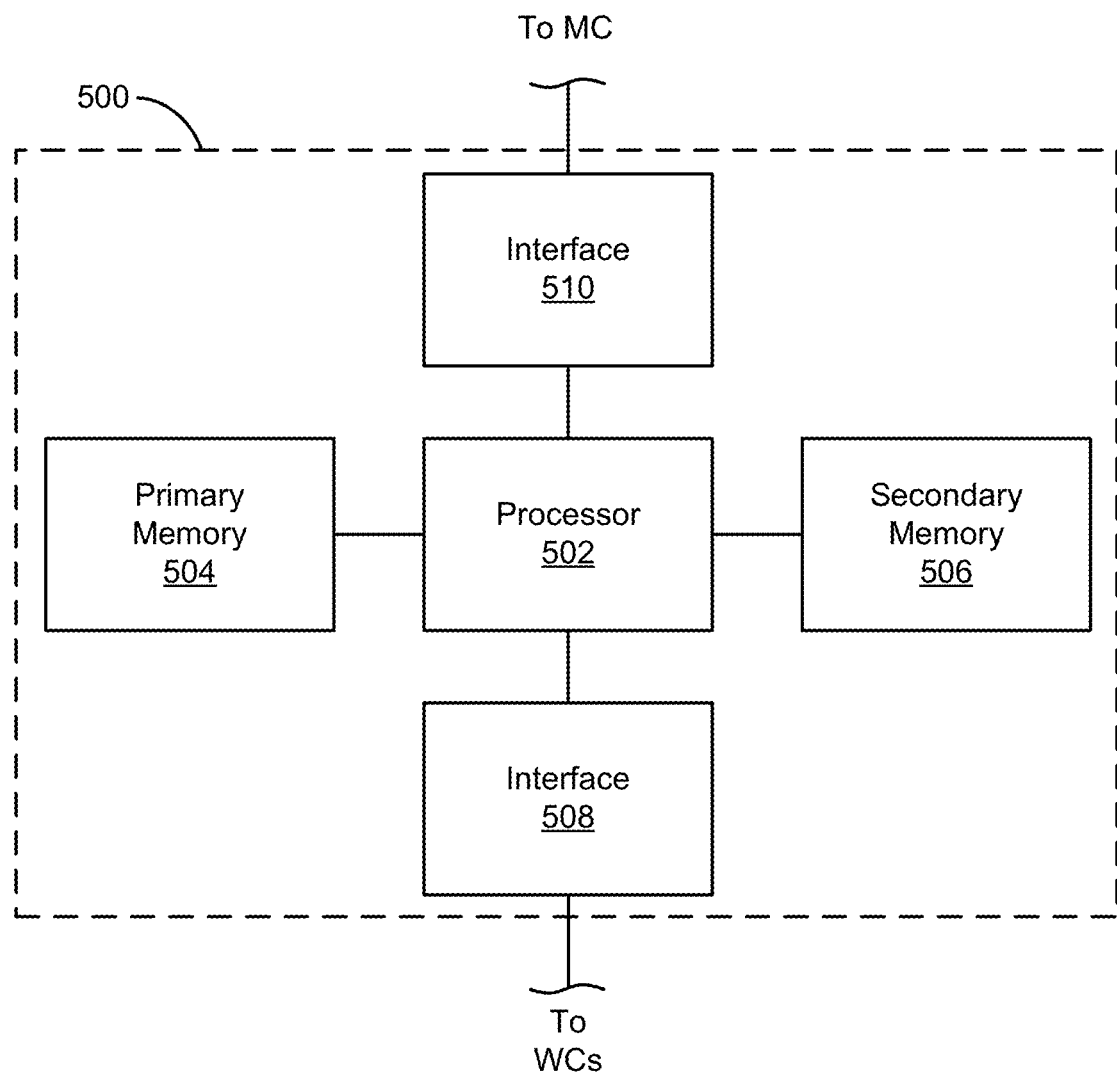
FIG. 5 shows a block diagram of an example network controller (NC) in accordance with some implementations.

FIG. 5 shows a block diagram of an example network controller (NC) 500 in accordance with some implementations. For example, the NC 500 of FIG. 5 can be used to implement the NC 306 described above with reference to the network system 300 of FIG. 3. As used herein, references to "the NC 500" also encompass the NC 306, and vice versa; in other words, the two references may be used interchangeably. The NC 500 can be implemented in or as one or more network components, networking devices, computers, computing devices or computer systems (herein used interchangeably where appropriate unless otherwise indicated). Additionally, reference to "the NC 500" collectively refers to any suitable combination of hardware, firmware and software for implementing the functions, operations, processes or capabilities described. For example, the NC 500 can refer to a computer that implements a network controller application (also referred to herein as a "program" or a "task").

As shown in FIG. 5, the NC 500 generally includes one or more processors 502 (also collectively referred to hereinafter as "the processor 502"). In some implementations, the processor 502 can be implemented as a microcontroller or as one or more logic devices including one or more application-specific integrated circuits (ASICs) or programmable logic devices (PLDs), such as field-programmable gate arrays (FPGAs) or complex programmable logic devices (CPLDs). If implemented in a PLD, the processor can be programmed into the PLD as an intellectual property (IP) block or permanently formed in the PLD as an embedded processor core. In some other implementations, the processor 502 can be or can include a central processing unit (CPU), such as a single core or a multi-core processor. The processor 502 is coupled with a primary memory 504, a secondary memory 506, a downstream network interface 508 and an upstream network interface 510. In some implementations, the primary memory 504 can be integrated with the processor 502, for example, as a system-on-chip (SOC) package, or in an embedded memory within a PLD itself. In some other implementations, the NC 500 alternatively or additionally can include one or more high-speed memory devices such as, for example, one or more RAM devices.

The secondary memory 506 can include one or more solid-state drives (SSDs) storing one or more lookup tables or arrays of values. In some implementations, the secondary memory 506 can store a lookup table that maps first protocol IDs (for example, BACnet IDs) received from the MC 400 to second protocol IDs (for example, CAN IDs) each identifying a respective one of the WCs 304, and vice versa. In some implementations, the secondary memory 506 can additionally or alternatively store one or more arrays or tables. In some implementations, such arrays or tables can be stored as comma-separated values (CSV) files or via another table-structured file format. For example, each row of the file can be identified by a timestamp corresponding to a transaction with a WC 304. Each row can include a tint value (C) for the IGUs 302 controlled by the WC 304 (for example, as set by the MC 400 in the primary tint command); a status value (S) for the IGUs 302 controlled by the WC 304; a set point voltage (for example, the effective applied voltage $V_{Eff}$) an actual voltage level $V_{Act}$ measured, detected or otherwise determined across the ECDs within the IGUs 302; an actual current level $I_{Act}$ measured, detected or otherwise determined through the ECDs within the IGUs 302; and various sensor data. In some implementations, each row of the CSV file can include such status information for each and all of the WCs 304 controlled by the NC 500. In some such implementations, each row also includes the CAN IDs or other IDs associated with each of the respective WC 304.

In some implementations in which the NC 500 is implemented in a computer that executes a network controller application, the secondary memory 506 also can store processor-executable code (or "programming instructions") for implementing a multi-tasking operating system such as, for example, an operating system based on a Linux® kernel. In some other implementations, the operating system can be a UNIX®- or Unix-like-based operating system, a Microsoft Windows®-based operating system, or another suitable operating system. The memory 506 also can store code executable by the processor 502 to implement the network controller application described above, as well as code for implementing other applications or programs.

In various implementations, the downstream network interface 508 enables the NC 500 to communicate with distributed WCs 304, and in some implementations, also with various sensors. In the context of the network system 300 of FIG. 3, the NC 500 can implement the NC 306 and the downstream network interface 508 can enable communication with the WCs 304 over the link 314. The downstream network interface 508 can collectively refer to one or more wired network interfaces or one or more wireless network interfaces (including one or more radio transceivers). In some implementations, the downstream interface 508 can include a CANbus interface enabling the NC 500 to distribute commands, requests or other instructions to various WCs 304, and to receive responses including status information from the WCs 304, according to a CANBus protocol (for example, via the CANopen communication protocol). In some implementations, a single CANbus interface can enable communication between the NC 500 and tens, hundreds or thousands of WCs 304. Additionally or alternatively, the downstream interface 508 can include one or more Universal Serial Bus (USB) interfaces (or "ports"). In some such implementations, to enable communication via a CANbus communication protocol, a USB-to-CAN adapter can be used to couple the USB port of the downstream interface 508 with CANbus-compatible cables. In some such implementations, to enable the NC 500 to control even more WCs 304, a USB hub (for example, having 2, 3, 4, 5 10 or more hub ports) can be plugged into the USB port of the downstream interface 508. A USB-to-CAN adapter can then be plugged into each hub port of the USB hub.

The upstream network interface 510 enables the NC 500 to communicate with the MC 400, and in some implementations, also with various other computers, servers or databases (including the database 320). The upstream network interface 510 also can collectively refer to one or more wired network interfaces or one or more wireless network interfaces (including one or more radio transceivers). In the context of the network system 300 of FIG. 3, the upstream network interface 510 can enable communication with the MC 308 over the link 318. In some implementations, the upstream network interface 510 also can be coupled to communicate with applications, including third party applications and cloud-based applications, over the outward-facing network 310. For example, in implementations in which the NC 500 is implemented as a network controller application executing as a task within a computer, the network controller application can communicate directly with the outward-facing network 310 via the operating system and the upstream network interface 510. In some other implementations, the NC 500 may be implemented as a task running on the MC 308 and managing the CANbus devices via the CANbus interface. In such implementations, in addition or as an alternative to TCP/IP or UDP/IP communications to the MC, the communications could be via UNIX Domain Sockets (UDS) or other communication methods like shared memory, or other non-IP communication methods.

In some implementations, the upstream interface 510 can include BACnet compatible interface, an oBIX compatible interface or another RESTful Web Services-based interface. As described above with reference to FIG. 4, in some implementations the NC 500 functions as a BACnet server collecting and storing status data, sensor data or other data acquired from the WCs 304, and publishing this acquired data such that it is accessible to the MC 400. In some implementations, the NC 500 also can publish this acquired data over the network 310 directly; that is, without first passing the data to the MC 400. The NC 500 also functions in some respects similar to a router. For example, the NC 500 can function as a BACnet to CANBus gateway, receiving communications transmitted from the MC 400 according to the BACnet protocol, converting commands or messages from the BACnet protocol to a CANBus protocol (for example, the CANopen communication protocol), and distributing commands or other instructions to various WCs 304 according to the CANBus protocol.

BACnet is built over the user datagram protocol (UDP). In some other implementations, a non-broadcast-based communication protocol can be used for communication between the MC 400 and the NCs 500. For example, the transmission control protocol (TCP) can serve as the transport layer as opposed to UDP. In some such implementations, the MC 400 can communicate with the NCs 500 via an oBIX-compatible communication protocol. In some other implementations, the MC 400 can communicate with the NCs 500 via a Web Socket-compatible communication protocol. Such TCP protocols also can allow the NCs 500 to communicate directly with one another.

In various implementations, the NC 500 can be configured to perform protocol translation (or "conversion") between one or more upstream protocols and one or more downstream protocols. As described above, the NC 500 can perform translation from BACnet to CANopen, and vice versa. As another example, the NC 500 can receive upstream communications from the MC 400 via an oBIX protocol and translate the communications into CANopen or other CAN-compatible protocols for transmission to the downstream WCs 304, and vice versa. In some wireless implementations, the NC 500 or the MC 400 also can translate various wireless protocols including, for example, protocols based on the IEEE 802.11 standard (for example, WiFi), protocols based on the IEEE 802.15.4 standard (for example, ZigBee, 6LoWPAN, ISA100.11a, WirelessHART or MiWi), protocols based on the Bluetooth standard (including the Classic Bluetooth, Bluetooth high speed and Bluetooth low energy protocols and including the Bluetooth v 4.0, v 4.1 and v 4.2 versions), or protocols based on the EnOcean standard (ISO/IEC 14543-3-10). For example, the NC 500 can receive upstream communications from the MC 400 via an oBIX protocol and translate the communications into WiFi or 6LowPAN for transmission to the downstream WCs 304, and vice versa. As another example, the NC 500 can receive upstream communications from the MC 400 via WiFi or 6LowPAN and translate the communications into CANopen for transmission to the downstream WCs 304, and vice versa. In some other examples, the MC 400 rather than the NC 500 handles such translations for transmission to downstream WCs 304.

As described above with reference to FIG. 4, when the MC 400 determines to tint one or more IGUs 302, the MC 400 can write a specific tint value to the AV in the NC 500 associated with the one or more respective WCs 304 that control the target IGUs 302. In some implementations, to do so, the MC 400 generates a primary tint command communication including a BACnet ID associated with the WCs 304 that control the target IGUs 302. The primary tint command also can include a tint value for the target IGUs 302. The MC 400 can direct the transmission of the primary tint command to the NC 500 using a network address such as, for example, an IP address or a MAC address. Responsive to receiving such a primary tint command from the MC 400 through the upstream interface 510, the NC 500 can unpackage the communication, map the BACnet ID (or other first protocol ID) in the primary tint command to one or more CAN IDs (or other second protocol IDs), and write the tint value from the primary tint command to a first one of the respective AVs associated with each of the CAN IDs.

In some implementations, the NC 500 then generates a secondary tint command for each of the WCs 304 identified by the CAN IDs. Each secondary tint command can be addressed to a respective one of the WCs 304 by way of the respective CAN ID. Each secondary tint command also can include the tint value extracted from the primary tint command. The NC 500 transmits the secondary tint commands to the target WCs 304 through the downstream interface 508 via a second communication protocol (for example, via the CANOpen protocol). In some implementations, when a WC 304 receives such a secondary tint command, the WC 304 transmits a status value back to the NC 500 indicating a status of the WC 304. For example, the tint status value can represent a "tinting status" or "transition status" indicating that the WC is in the process of tinting the target IGUs 302, an "active" or "completed" status indicating that the target IGUs 302 are at the target tint state or that the transition has been finished, or an "error status" indicating an error. After the status value has been stored in the NC 500, the NC 500 can publish the status information or otherwise make the status information accessible to the MC 400 or to various other authorized computers or applications. In some other implementations, the MC 400 can request status information for a particular WC 304 from the NC 500 based on intelligence, a scheduling policy, or a user override. For example, the intelligence can be within the MC 400 or within a BMS. A scheduling policy can be stored in the MC 400, another storage location within the network system 300, or within a cloud-based system.

Integrated Master Controller and Network Controller

As described above, in some implementations the MC 400 and the NC 500 can be implemented as a master controller application and a network controller application, respectively, executing within respective physical computers or other hardware devices. In some alternative implementations, each of the master controller application and the network controller application can be implemented within the same physical hardware. For example, each of the master controller application and the network controller application can be implemented as a separate task executing within a single computer device that includes a multi-tasking operating system such as, for example, an operating system based on a Linux® kernel or another suitable operating system.

In some such integrated implementations, the master controller application and the network controller application can communicate via an application programming interface (API). In some particular implementations, the master controller and network controller applications can communicate over a loopback interface. By way of reference, a loopback interface is a virtual network interface, implemented through an operating system, which enables communication between applications executing within the same device. A loopback interface is typically identified by an IP address (often in the 127.0.0.0/8 address block in IPv4, or the 0:0:0:0:0:0:0:1 address (also expressed as ::1) in IPv6). For example, the master controller application and the network controller application can each be programmed to send communications targeted to one another to the IP address of the loopback interface. In this way, when the master controller application sends a communication to the network controller application, or vice versa, the communication does not need to leave the computer.

In implementations in which the MC 400 and the NC 500 are implemented as master controller and network controller applications, respectively, there are generally no restrictions limiting the available protocols suitable for use in communication between the two applications. This generally holds true regardless of whether the master controller application and the network controller application are executing as tasks within the same or different physical computers. For example, there is no need to use a broadcast communication protocol, such as BACnet, which limits communication to one network segment as defined by a switch or router boundary. For example, the oBIX communication protocol can be used in some implementations for communication between the MC 400 and the NCs 500.

In the context of the network system 300, each of the NCs 500 can be implemented as an instance of a network controller application executing as a task within a respective physical computer. In some implementations, at least one of the computers executing an instance of the network controller application also executes an instance of a master controller application to implement the MC 400. For example, while only one instance of the master controller application may be actively executing in the network system 300 at any given time, two or more of the computers that execute instances of network controller application can have an instance of the master controller application installed. In this way, redundancy is added such that the computer currently executing the master controller application is no longer a single point of failure of the entire system 300. For example, if the computer executing the master controller application fails or if that particular instance of the master controller application otherwise stops functioning, another one of the computers having an instance of the master network application installed can begin executing the master controller application to take over for the other failed instance. In some other applications, more than one instance of the master controller application may be executing concurrently. For example, the functions, processes or operations of the master controller application can be distributed to two (or more) instances of the master controller application.

Example Window Controller

Figure 6:
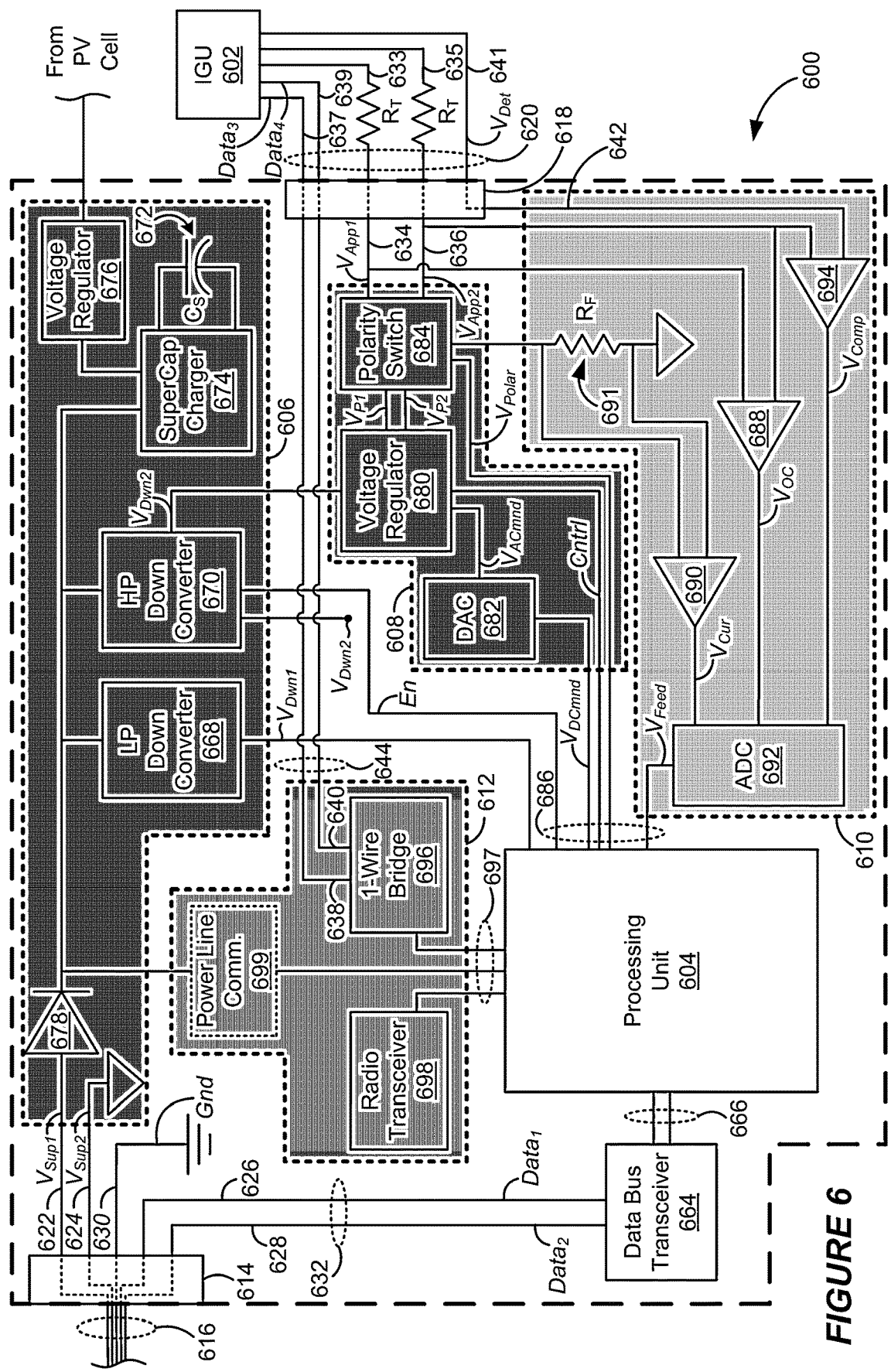
FIG. 6 shows a circuit schematic diagram of an example window controller (WC) in accordance with some implementations.

FIG. 6 shows a circuit schematic diagram of an example window controller (WC) 600 in accordance with some implementations. For example, the WC 600 of FIG. 6 can be used to implement each one of the WCs 304 described above with reference to the network system 300 of FIG. 3. As used herein, references to "the WC 600" also encompass the WC 304, and vice versa; in other words, the two references may be used interchangeably. As described above, the WC 600 is generally operable and adapted to drive optical state transitions in, or to maintain the optical states of, one or more coupled optically-switchable devices such as the ECDs 110 described above with reference to FIG. 1. In some implementations, the one or more ECDs coupled with the WC 600 are configured within respective IGUs 602 (such as the IGU 100 described above with reference to FIG. 1). The WC 600 also is operable to communicate with the coupled IGUs 602, for example, to read data from or to transfer data to the IGUs 602.

The WC 600 broadly includes a processing unit 604. The WC 600 also broadly includes a power circuit 606, a drive circuit 608 and a feedback circuit 610 (each of which is delineated with a heavy dashed line and gray shading). In the illustrated implementation, the WC 600 additionally includes a communications circuit 612. Each of the drive circuit 608, the power circuit 606, the feedback circuit 610 and the communications circuit 612 can include a number of individual circuit components including integrated circuits (ICs). Each of the various components described in more detail below may be described as being "a part of" a respective one of the aforementioned circuits 606, 608, 610 and 612. However, the groupings of components into respective ones of the circuits 606, 608, 610 and 612 are in name only and for purposes of convenience in facilitating the disclosure of the described implementations. As such, the functions, capabilities and limitations of the various described components are not intended to be defined by the respective grouping; rather, the functions, abilities and limitations of each of the individual components are defined only by those of the components themselves, and by their integration with other components to which they are electrically connected or coupled.

The WC 600 includes a first upstream interface (or set of interfaces) 614 for coupling to an upstream set of cables 616. For example, the upstream set of cables 616 can implement the link 314 described above with reference to the network system 300 FIG. 3. In some implementations, the upstream set of cables 616 includes at least four lines: two power distribution lines and two communication lines. In some five-line implementations, the upstream set of cables 616 additionally includes a system ground line, such as a building ground or Earth ground (for practical purposes an absolute ground from which all other voltages in the building can be measured). The upstream interface 614 can include a corresponding number of pins (not shown)—one pin to couple each of the lines in the upstream set of cables 616 into the WC 600. For example, a first one of the pins can couple a first one of the power distribution lines from the upstream set of cables 616 to a first power supply line 622 within the WC 600. A second one of the pins can couple a second one of the power distribution lines (for example, a power supply return) from the upstream set of cables 616 to a second power supply line 624 within the WC 600. A third one of the pins can couple a first one of the communication lines from the upstream set of cables 616 to a first communication line 626 within the WC 600. A fourth one of the pins can couple a second one of the communication lines from the upstream set of cables 616 to a second communication line 628 within the WC 600. In implementations that include a system ground line, a fifth one of the pins can couple the system ground line from the upstream set of cables 616 to a system ground line 630 within the WC 600.

The two power distribution lines in the upstream set of cables 616 can be implemented as two separate cables or configured together as, for example, a twisted pair cable.

The first power line 622 carries a first supply voltage $V_{Sup1}$ and the second power line 624 is a power supply return. In some implementations, the first supply voltage $V_{Sup1}$ is a DC voltage having a value in the range of approximately 5 Volts (V) to 42 V, and in one example application, a value of 24 V (although higher voltages may be desirable and are possible in other implementations). In some other implementations, the first supply voltage $V_{Sup1}$ can be a pulsed voltage power signal. As described above, the second one of the power lines 624 can be a power supply return, also referred to as a signal ground (or "common ground"). In other words, the voltage $V_{Sup2}$ on the second one of the power lines can be a reference voltage, for example, a ground. In such implementations, it is the voltage difference between the first supply voltage $V_{Sup1}$ and the second supply voltage $V_{Sup2}$ that is the voltage of interest, as opposed to the actual values of the individual voltages $V_{Sup1}$ and $V_{Sup2}$ relative to the system ground. For example, the value of the difference between $V_{Sup1}$ and $V_{Sup2}$ can be in the range of approximately 5 V to 42 V, and in one example application, 24 V. In implementations that include a system ground line, the system ground line can be implemented as a single cable or configured with the two power distribution lines described above as a 3-wire cable.

The two communication lines in the upstream set of cables 616 also can be implemented as two separate cables or configured together as a twisted pair cable. In some other implementations, the two communication lines can be bundled with the two power distribution lines just described as a 4-wire cable, or bundled with the two power distribution lines and the system ground line as a 5-wire cable. As described above, pins or other interconnects within the upstream interface 614 electrically connect the first and the second communication lines in the upstream set of cables 616 with the first and the second communication lines 626 and 628, respectively, in the WC 600. The first and the second communication lines 626 and 628, also referred to herein collectively as a communication bus 632, can carry first and second data signals Data$_1$ and Data$_2$, respectively.

At different times or stages throughout an optical transition cycle or at other times, the data signals Data$_1$ and Data$_2$ can be communicating information to the WC 600 from an upstream network controller (such as the NC 306 or NC 400) or communicating information to the network controller from the WC 600. As an example of a downstream communication, the data signals Data$_1$ and Data$_2$ can include a tint command or other instructions (for example, such as the secondary tint command described above) sent from a network controller to the WC 600. As an example of an upstream communication, the data signals Data$_1$ and Data$_2$ can include status information (such as a current tint status) or sensor data to be sent to the network controller. In some implementations, the signals Data$_1$ and Data$_2$ are complementary signals, for example, forming a differential pair of signals (also referred to herein collectively as a differential signal).

In some implementations, the communication bus 632 is designed, deployed and otherwise configured in accordance with the Controller Area Network (CAN) vehicle bus standard. In terms of the Open Systems Interconnection (OSI) model, the physical (PHY) layer can be implemented according to the ISO 11898-2 CAN standard, and the data link layer can be implemented according to the ISO 11898-1 CAN standard. In some such implementations, the first data signal Data$_1$ can refer to the high CAN signal (the "CANH signal" as it is typically referred to in the CAN protocol), while the second data signal Data$_2$ can refer to the low CAN signal (the "CANL signal"). In some implementations, the WC 600 communicates with the upstream network controller over the communication bus 632 (and the coupled communication lines in the upstream set of cables 616) according to the CANopen communication protocol. In terms of the OSI model, the CANopen communication protocol implements the network layer and other layers above the network layer (for example, the transport layer, the session layer, the presentation layer and the application layer). According to the CAN protocol, it is the difference between the CANH and CANL signal values that determines the value of the bit being communicated by the differential pair.

In some implementations, the upstream set of cables 616 is directly connected with the upstream network controller. In some other implementations, the upstream set of cables 616 includes a set of droplines connected to (for example, tapped off of) a trunk line that contains corresponding power distribution and communication lines. In some such latter implementations, each of a plurality of WCs 600 can be connected to the same trunk line via a corresponding set of droplines. In some such implementations, each of the plurality of WCs 600 coupled to the same trunk line can be in communication with the same network controller via the communication lines within the trunk line. In some implementations, the power distribution lines that power the WCs 600 also can be coupled to the same network controller to power the network controller. In some other implementations, a different set of power distribution lines can power the network controller. In either case, the power distribution lines that power the WCs 600 can terminate at a power control panel or other power insertion point.

The WC 600 also includes a second downstream interface (or set of interfaces) 618 for coupling to a downstream set of cables 620. For example, the downstream set of cables 620 can implement the link 312 described above with reference to the network system 300 FIG. 3. In some implementations, the downstream set of cables 620 also includes at least four lines: two power distribution lines and two communication lines. The downstream interface 618 also can include a corresponding number of pins (not shown)—one pin to couple each of the lines in the downstream set of cables 620 into the WC 600. For example, a first one of the pins can couple a first one of the power distribution lines 633 from the downstream set of cables 620 to a first power drive line 634 within the WC 600. A second one of the pins can couple a second one of the power distribution lines 635 from the downstream set of cables 620 to a second power drive line 636 within the WC 600. A third one of the pins can couple a first one of the communication lines 637 from the downstream set of cables 620 to a first communication line 638 within the WC 600. A fourth one of the pins can couple a second one of the communication lines 639 from the downstream set of cables 620 to a second communication line 640 within the WC 600. In implementations that include a fifth line, a fifth one of the pins can couple the fifth line 641 from the downstream set of cables 620 to a fifth line 642 within the WC 600.

The two power distribution lines 633 and 635 in the downstream set of cables 620 can be implemented as two separate cables or configured together as, for example, a twisted pair cable. In some implementations, the first power distribution line 633 carries a first applied voltage $V_{App1}$ and the second power distribution line 635 carries a second applied voltage $V_{App2}$. In some implementations, the first and the second applied voltages $V_{App1}$ and $V_{App2}$ are, for all intents and purposes, DC voltage signals. In some other implementations, the first and the second applied voltages $V_{App1}$ and $V_{App2}$ can be pulsed voltage signals (for example, pulse-width modulated (PWM) signals). In some implementations, the first applied voltage $V_{App1}$ can have a value in the range of approximately 0 V to 10 V, and in some specific applications, in the range of approximately 0 V to 5 V. In some implementations, the second applied voltage $V_{App2}$ can have a value in the range of approximately 0 V to −10 V, and in some specific applications, in the range of approximately 0 V to −5 V. In some other implementations, the second power distribution line 635 in the downstream set of cables 620 can be a power supply return, also referred to as a signal ground or common ground. In other words, the voltage $V_{App2}$ on the second power distribution line can be a reference voltage, for example, a floating ground.

The first and the second power distribution lines 633 and 635 in the downstream set of cables 620 are provided to each of the one or more IGUs 602 controlled by the WC 600. More specifically, the first and the second power distribution lines 633 and 635 are electrically connected to (or coupled with) the busbars and conductive layers that power the electrochromic states and state transitions of the respective ECDs (such as, for example, the first and second busbars 126 and 128 and the first and second TCO layers 114 and 116 in the IGU 100 of FIG. 1). In some implementations, it is the voltage difference between the first applied voltage $V_{App1}$ and the second applied voltage $V_{App2}$ that is the voltage of interest, as opposed to the actual values of the individual voltages $V_{App1}$ and $V_{App2}$ relative to a system ground. For example, the value of the difference between $V_{App1}$ and $V_{App2}$—referred to herein as the "effective applied voltage" $V_{Eff}$ or simply as the applied voltage $V_{Eff}$—can be in the range of approximately −10 V to 10 V in some applications, and in some specific applications in the range of approximately −5 V to 5 V, depending on various device parameters and drive parameters.

The two communication lines 637 and 639 in the downstream set of cables 620 also can be implemented as two separate cables or configured together as a twisted pair cable. In some other implementations, the two communication lines 637 and 639 can be bundled with the two power distribution lines 633 and 635 just described as a 4-wire cable, or bundled with the two power distribution lines and the fifth line as a 5-wire cable. As described above, pins or other interconnects within the downstream interface 618 electrically connect the first and the second communication lines 637 and 639 in the downstream set of cables 620 with the first and the second communication lines 638 and 640 within the WC 600. The first and the second communication lines 638 and 640, also referred to herein collectively as a communication bus 644, can carry data signals $Data_3$ and $Data_4$, respectively.

At different times or stages throughout a transition cycle or at other times, the data signals $Data_3$ and $Data_4$ can be communicating information to one or more connected IGUs 602 from the WC 600 or communicating information to the WC 600 from one or more of the IGUs 602. As an example of a downstream communication, the data signals $Data_3$ and $Data_4$ can include a status request command or other instructions to be sent to one or more of the IGUs 602. As an example of an upstream communication, the data signals $Data_3$ and $Data_4$ can include status information (such as a current tint status) or sensor data sent from one or more of the IGUs 602 to the WC 600. In some implementations, the communication bus 644 is designed, deployed and otherwise configured in accordance with the 1-Wire device communications bus system protocol. In such 1-Wire implementations, the communication line 638 is a data line and the data signal $Data_3$ conveys the data to be communicated, while the communication line 640 is a signal ground line and the data signal $Data_4$ provides a reference voltage, such as a signal ground, relative to which the data signal $Data_3$ is measured or compared to recover the data of interest.

Example Connection Architecture

Figure 7:
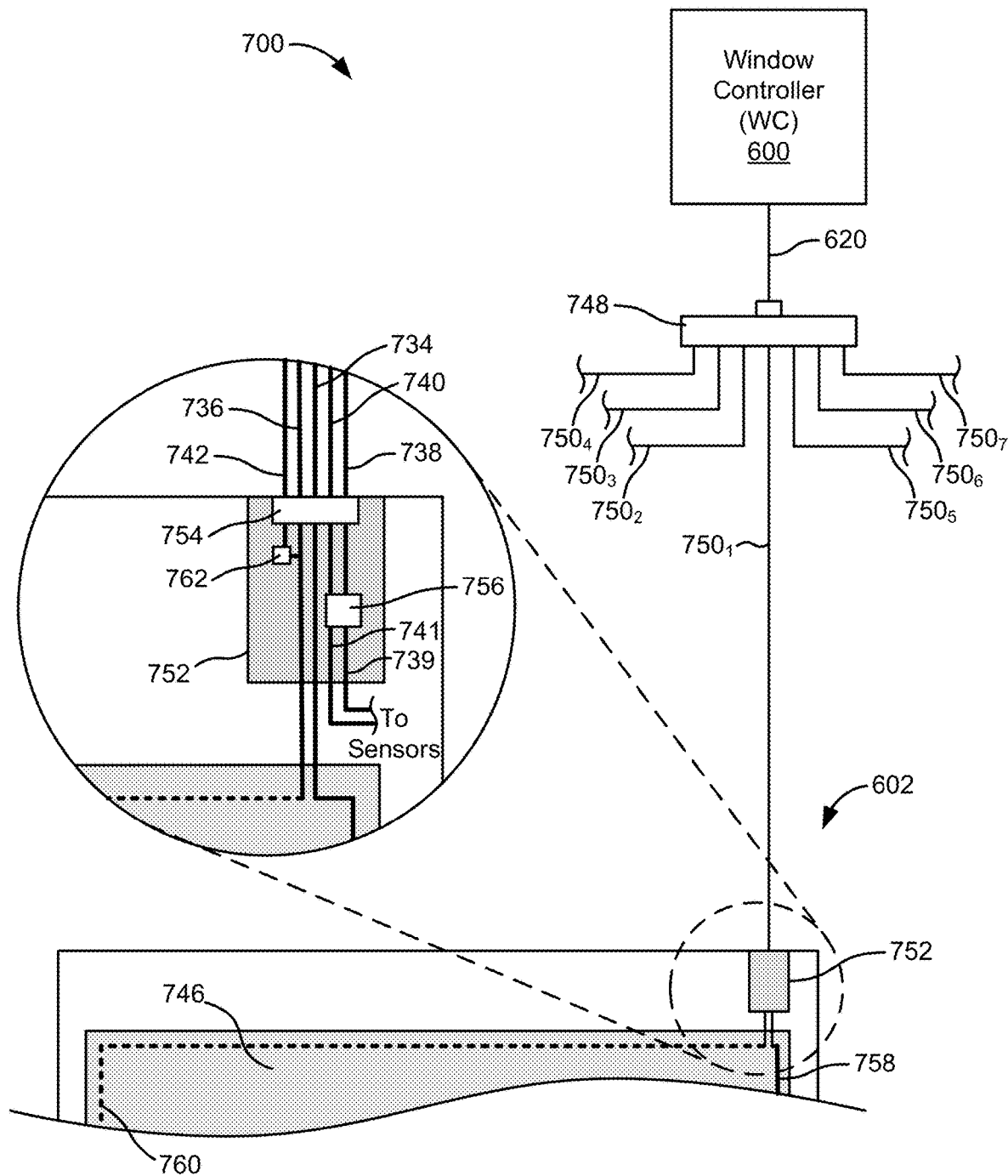
FIG. 7 shows a diagram of an example connection architecture for coupling a window controller to an IGU in accordance with some implementations.

In some implementations, the downstream set of cables 620 is directly connected with a single IGU 602. In some other implementations, the downstream set of cables 620 includes a junction that connects the downstream set of cables 620 to two or more IGUs 602 via corresponding sets of cables. FIG. 7 shows a diagram of an example connection architecture 700 for coupling a window controller to an IGU in accordance with some implementations. In the illustrated implementation, the connection architecture 700 couples the WC 600 to an IGU 602 that includes an ECD 746 (only an end portion of the IGU 602 and ECD 746 are shown). While only one IGU 602 is shown, as described above, the connection architecture 700 can couple the WC 600 to multiple IGUs 602. To facilitate such multi-IGU implementations, the downstream set of cables 620 can connect the WC 600 with a junction 748. In some implementations, the junction 748 electrically couples each of the lines 633, 635, 637, 639 and 641 within the downstream set of cables 620 to corresponding lines 734, 736, 738, 740 and 742 in each of multiple secondary sets of cables 7501-750N. In this way, a single WC 600 can provide power to multiple IGUs 602.

In the illustrated diagrammatic implementation, the IGU 602 includes a plug-in component 752 that facilitates the connection of the downstream set of cables 620, or more particularly the secondary set of cables 7501, with the IGU 602 and the ECD 746 within it. In some implementations, the plug-in component 752 is readily insertable and removable from the IGU 602 (for example, for ease of manufacture, maintenance, or replacement). As shown, the plug-in component 752 includes an interface 754 (which can be similar to the interface 618 of the WC 600) for receiving the power distribution lines 734 and 736, the communication lines 738 and 740 and the fifth line 742 (in implementations that include a fifth line). In some implementations, the ends of the lines 734, 736, 738, 740 and 742 can include connectors that are adapted to be inserted within corresponding connection receivers within the interface 754. The plug-in component 752 serves to electrically couple power distribution lines 734 and 736 with bus bars 758 and 760, respectively. Bus bars 758 and 760 are, in turn, electrically connected to respective conducting layers on either side of the EC stack of the ECD 746.

The plug-in component 752 includes a communication module 756 that is connected to transmit and receive data to and from the WC 600 over the communication lines 738 and 740. In some implementations, the communication module 756 can be implemented as a single chip. In some such implementations, the communication module 756 can be implemented as a 1-Wire chip that includes a non-volatile memory such as, for example, EEPROM (EPROM), Flash or other suitable solid state memory. Each communication module 756 also can include various processing, controller and logic functionalities, authentication capabilities, or other functionalities or capabilities. When implemented as a 1-Wire chip, each communication module 756 can be identified with a unique 1-Wire ID (for example, a 48-bit serial number). One example of such a 1-Wire chip suitable for use in some implementations is the DS28EC20, 20 Kb 1-wire EPROM chip provided by Maxim Integrated Products, Inc. of San Jose, CA. In some other implementations, the communication module 756 can include a memory chip (including non-volatile memory and memory controller functionality) and a separate ID chip storing the unique ID (for example, the 1-Wire ID). Some examples of functions and hardware that can be associated with such a 1-Wire chip are described in U.S. patent application Ser. No. 13/049,756 filed Mar. 16, 2011 and titled MULTIPURPOSE CONTROLLER FOR MULTISTATE WINDOWS, which is hereby incorporated by reference in its entirety and for all purposes.

In some implementations, various device or drive parameters for the particular ECD 746 are programmed into and stored within the memory component within the communication module 756 (for example, during or at the end of manufacturing or fabrication of the ECD or IGU or at a later time during or after installation). For example, such pre-programmed device parameters for the ECD 746 can include a length, width, thickness, cross-sectional area, shape, age, model number, version number, or number of previous optical transitions of or associated with the respective ECD 746 (or of a pane on which the ECD is formed or otherwise arranged). Pre-programmed drive parameters can include, for example, a ramp-to-drive rate, a drive voltage, a drive voltage duration, a ramp-to-hold rate and a holding voltage for each possible combination of current tint state and target tint state. In some implementations, the processing unit 604 reads the device parameters and drive parameters prior to the start of each tint state transition. Additionally or alternatively, in some implementations, the processing unit 604 reads the device and drive parameters when the respective IGU 602 is powered on and commissioned. The processing unit 604 can additionally or alternatively read the device and drive parameters periodically, such as daily.

In some other implementations, a surface of the communication module 756 can additionally or alternatively have an identifier (ID) scribed or etched on it. For example, the ID can be scribed or etched on the communication module 756 during or after production of the ECD. In some implementations, the ID is a lite ID of the lite (pane) on which the ECD is formed. Additionally or alternatively, the ID can include an IGU ID of the associated IGU 302. In some implementations, the WC 304 will then read this information optically or electronically after it is connected to the ECD. In some such implementations, the WC 304 can retrieve parameters such as the length, width, thickness, cross-sectional area, shape, age, model number, version number etc. from the MC 308. For example, the MC 400 can previously be programmed to store such parameters. In some other implementations, the MC 400 can retrieve such parameters from the producer of the ECD/IGU through an external communication interface (for example, the interface 410) either in advance or in response to a request for such parameters or related information by the WC 304 or NC 306.

The number and size of the IGUs 602 that each WC 600 can drive is generally limited by the load on the WC 600. The load is typically defined by the voltage, current, or power requirements necessary to cause the desired optical transitions in the IGUs 602 driven by the WC 600 within a desired timeframe. Because the maximum load that a given WC 600 can drive is generally limited by the capabilities and safe operating ranges of the electrical components within the WC 600, or by the power carrying limitations of the power drive lines 634 and 636 or the power distribution lines 633 and 635, there can be a tradeoff between acceptable transition time and the number and size of the ECDs driven by each WC 600.

The power requirements necessary to cause the desired optical transitions in the IGUs 602 driven by a given WC 600 within a desired timeframe are, in turn, a function of the surface area of the connected IGUs 602, and more particularly, the surface area of the ECDs within the IGUs 602. This relationship can be nonlinear; that is, the power requirements can increase nonlinearly with the surface area of the ECDs. The nonlinear relationship can exist, at least in part, because the sheet resistances of the conductive layers (such as the first and second TCO layers 114 and 116 of the IGU 100) used to deliver the applied voltages to the electrochromic stack of the ECD increase nonlinearly with distance across the length and width of the respective conductive layers. For example, it can take more power to drive a single 50 ft$^2$ ECD than to drive two 25 ft$^2$ ECDs. System- or building-wide power considerations also may require that the power available to each WC 600 be limited to less than that which the WC 600 is capable of handling and providing to the connected IGUs 602.

In some implementations, such as that described with reference to the connection architecture 700 of FIG. 7, each of the IGUs 602 connected with the WC 600 can include its own respective plug-in component 752 and communication module 756. Each communication module 756 can include a respective 1-Wire chip storing device parameters for the respective ECD. In some implementations, each of the parallel-connected IGUs 602 receives the same voltages $V_{App1}$ and $V_{App2}$. In some such implementations, it can generally be desirable or preferable for each of the IGUs 602 connected with a single WC 600 to have the same or similar device parameters (such as surface area) so that each of the respective ECDs behaves the same or similarly responsive to the voltages $V_{App1}$ and $V_{App2}$. For example, it is generally desirable that each of the IGUs 602 connected with a given WC 600 have the same tint whether during a transition or during a holding period between transitions. However, in implementations in which the IGUs 602 have different device parameters, the processing unit 604 can compare or otherwise integrate the device parameters from each of the connected IGUs 602 to generate a command signal $V_{Drive}$ that results in a best or least harmful effective applied voltage $V_{Eff}$, for example, a voltage that is maintained within a safe but effective range for all of the connected IGUs 602.

In some other implementations, there can be a one-to-one relationship between the number of WCs 600 and IGUs 602; that is, each IGU 602 can be driven and otherwise controlled by a respective dedicated WC 600. In some such integrated implementations, the WC 600 can be located within the IGU 602, for example, within a housing having a thin form factor within the interior volume of the IGU. In some other implementations, the WC 600 can be located adjacent the IGU 602, for example, hidden by a frame or mullion that supports the IGU 602. In some other implementations, the WC 600 can be located at an interior lower boundary or at an interior corner of the IGU 602 where it is less visible or noticeable but still accessible to an installer or technician. For example, such latter implementations can be useful for applications in which easier access to the WC 600 is desirable (for example, to replace, repair or map the WC 600).

Additionally, such implementations also can be desirable where the WC 600 can include an energy storage device (for example, a rechargeable battery, battery pack or supercapacitor), that is also readily replaceable by a technician. For example, the IGU can include a docking module that the battery can plug into. In such case, the docking module can be electrically connected to the WC 600 rather than the battery directly. In implementations in which the WC 600 is integrated with the IGU 602, the WC 600 itself can include a docking module that the battery can plug into. In implementations in which the WC 600 is integrated with the IGU 602, the IGU 602 can still include a plug-in component 752 that connects with the WC 600. In some other integrated implementations, the WC 600 can be directly connected to the busbars of the associated ECD. In such latter integrated implementations, the communication module storing the device parameters of the ECD can be located within the WC 600, for example, in a non-volatile memory within the WC 600. More examples of the use of integrated window controllers and energy storage devices are described in U.S. patent application Ser. No. 14/951,410 filed Nov. 24, 2015 and titled SELF-CONTAINED EC IGU, and PCT Patent Application No. PCT/US16/41176 filed Jul. 6, 2016 and titled POWER MANAGEMENT FOR ELECTROCHROMIC WINDOW NETWORKS, both of which are hereby incorporated by reference in their entireties and for all purposes.

Processing Unit 604

At a high level, the processing unit 604 functions to communicate with the upstream network controller and to control the tint states of the IGUs 602 connected with the WC 600. One primary function of the processing unit 604 is to generate a command signal $V_{DCmnd}$. As will be described in more detail below, the command signal $V_{DCmnd}$ is provided to the drive circuit 608 for generating the applied voltage signals $V_{App1}$ and $V_{App2}$, which are output from the WC 600 for driving one or more IGUs 602 controlled by the WC 600. In various implementations the processing unit 604 can generate the command signal $V_{DCmnd}$ based on a number of different device parameters, drive parameters, input values, algorithms or instructions. For example, the processing unit 604 can generate the command signal $V_{DCmnd}$ based on a tint command received from the upstream network controller. As described above, the tint command can include a tint value corresponding to a target tint state for the IGUs 602 controlled by the WC 600.

In some implementations, responsive to receiving a tint command, the processing unit 604 initiates a tinting transition in one or more of the IGUs 602 controlled by the WC 600. In some implementations, the processing unit 604 calculates, selects, determines or otherwise generates the command signal $V_{DCmnd}$ based on drive parameters including the current tint state of an IGU 602 to be transitioned and the target tint state of the IGU 602 (based on the tint value in the tint command). The processing unit 604 also can generate the command signal $V_{DCmnd}$ based on other drive parameters, for example, a ramp-to-drive rate, a drive voltage, a drive voltage duration, a ramp-to-hold rate and a holding voltage for each possible combination of current tint state and target tint state. Other drive parameters can include parameters based on current or recent sensor data, for example, an indoor temperature, an outdoor temperature, a temperature within the interior volume of the IGU 602 (or of one or more of the panes), a light intensity in a room adjacent the IGU 602 and a light intensity outside of the IGU 602, among other suitable or desirable parameters. In some implementations, such sensor data can be provided to the WC 600 via the upstream network controller over communication lines 626 and 628. Additionally or alternatively, the sensor data can be received from sensors located within or on various portions of the IGU 602. In some such implementations, the sensors can be within or otherwise coupled with a communication module within the IGU 602 (such as the communication module 756). For example, multiple sensors including photosensors, temperature sensors or transmissivity sensors can be coupled via the same communication lines 739 and 741 shown in FIG. 7 according to the 1-Wire communication protocol.

In some implementations, the processing unit 604 also can generate the command signal $V_{DCmnd}$ based on the device parameters associated with the ECD within the IGU 602. As described above, the device parameters for the ECD can include a length, width, thickness, cross-sectional area, shape, age, model number, version number, or number of previous optical transitions of or associated with the respective ECD (or of a pane on which the ECD is formed or otherwise arranged). In some implementations, the processing unit 604 is configured to track the number of tinting transitions for each of the connected IGUs 602.

In some implementations, the processing unit 604 generates the command signal $V_{DCmnd}$ based on a voltage control profile, for example, such as that described above with reference to FIG. 2. For example, the processing unit 604 can use the drive parameters and device parameters to select a voltage control profile from a predefined set of voltage control profiles stored in a memory within or accessible by the processing unit 604. In some implementations, each set of voltage control profiles is defined for a particular set of device parameters. In some implementations, each voltage control profile in a given set of voltage control profiles is defined for a particular combination of drive parameters. The processing unit 604 generates the command signal $V_{DCmnd}$ such that the drive circuit 608 implements the selected voltage control profile. For example, the processing unit 604 adjusts the command signal $V_{DCmnd}$ to cause the drive circuit 608 to, in turn, adjust the applied voltage signals $V_{App1}$ and $V_{App2}$. More specifically, the drive circuit 608 adjusts the applied voltage signals $V_{App1}$ and $V_{App2}$ such that the effective voltage $V_{Eff}$ applied across the ECD tracks the voltage levels indicated by the voltage control profile throughout the progression through the profile.

In some implementations, the processing unit 604 also can modify the command signal $V_{DCmnd}$ dynamically (whether during a transition or during a holding period after a transition) based on sensor data. As described above, such sensor data can be received from various sensors within or otherwise integrated with the connected IGUs 602 or from other external sensors. In some such implementations, the processing unit 604 can include intelligence (for example, in the form of programming instructions including rules or algorithms), that enable the processing unit 604 to determine how to modify the command signal $V_{DCmnd}$ based on the sensor data. In some other implementations, the sensor data received by the WC 600 from such sensors can be communicated to the network controller, and in some instances from the network controller to the master controller. In such implementations, the network controller or the master controller can revise the tint value for the IGUs 602 based on the sensor data and transmit a revised tint command to the WC 600. Additionally or alternatively, the network controller or the master controller can receive sensor data from one or more other sensors external to the building, for example, one or more light sensors positioned on a roof top or a facade of the building. In some such implementations, the master controller or the network controller can generate or revise the tint value based on such sensor data.

In some implementations, the processing unit 604 also can generate or modify the drive signal $V_{Drive}$ dynamically based on one or more feedback signals $V_{Feed}$ received from the feedback circuit 610. For example, and as will be described in more detail below, the feedback circuit 610 can provide one or more voltage feedback signals $V_{OC}$ based on actual voltage levels detected across the ECDs (for example, as measured during periodic open circuit instances), one or more current feedback signals $V_{Cur}$ based on actual current levels detected through the ECDs, or based on one or more voltage compensation signals $V_{Comp}$ associated with voltage drops detected or determined along the power transmission lines that provide the applied voltage signals $V_{App1}$ and $V_{App2}$ to the IGUs 602.

Generally, the processing unit 604 can be implemented with any suitable processor or logic device, including combinations of such devices, capable of performing the functions or processes described herein. In some implementations, the processing unit 604 is a microcontroller (also referred to as a microcontroller unit (MCU)). In some more specific applications, the processing unit 604 can be a microcontroller particularly designed for embedded applications. In some implementations, the processing unit 604 includes a processor core (for example, a 200 MHz processor core or other suitable processor core) as well as a program memory (for example, a 2018 KB or other suitable non-volatile memory), a random-access memory (RAM) (for example, a 512 KB or other suitable RAM), and various I/O interfaces. The program memory can include, for example, code executable by the processor core to implement the functions, operations or processes of the processing unit 604.

In some implementations, the RAM can store status information for the IGUs 602 controlled by the WC 600. The RAM also can store the device parameters for the ECDs within the IGUs 602. In some other implementations, the processing unit 604 can store such status information or device parameters in another memory device (for example, a Flash memory device) external to the processing unit 604 but also within the WC 600. In some specific implementations, the I/O interfaces of the processing unit 604 include one or more CAN interfaces, one or more synchronous serial interfaces (for example, 4-wire Serial Peripheral Interface (SPI) interfaces), and one or more Inter-Integrated Circuit ($I^2C$) interfaces. One example of such a controller suitable for use in some implementations is the PIC32MZ2048ECH064 controller provided by Microchip Technology Inc. of Chandler, AZ.

In the implementation illustrated in FIG. 6, the WC 600 additionally includes a data bus transceiver 664. The data bus transceiver 664 is coupled with the upstream interface 614 via the communication bus 632. The data bus transceiver 664 also is coupled with the processing unit 604 via a communication bus 666. As described above, in some implementations, the communication bus 632 is designed, deployed and otherwise configured in accordance with the CAN bus standard, which is a differential bus standard. In some implementations, the communication bus 666 also conforms to the CAN bus standard and includes a differential pair of lines for transferring a differential pair of signals. As such, the data bus transceiver 664 can include two sets of differential ports; a first set for coupling with the communication bus 632 and a second set for coupling with the communication bus 666, which in turn is coupled with a CAN interface of the processing unit 604.

In various implementations, the data bus transceiver 664 is configured to receive data from a network controller (such as the NC 500) via the communication bus 632, process the data, and transmit the processed data to the processing unit 604 via the communication bus 666. Similarly, the data bus transceiver 664 is configured to receive data from the processing unit 604 via the communication bus 666, process the data, and transmit the processed data over the communication bus 632 to the interface 614 and ultimately over the upstream set of cables 616 to the network controller. In some such implementations, processing the data includes converting or translating the data from a first protocol to a second protocol (for example, from a CAN protocol (such as CANopen) to a protocol readable by the processing unit 604 and vice versa). One example of such a data bus transceiver suitable for use in some implementations is the SN65HVD1050 data bus transceiver provided by Texas Instruments Inc. of Dallas, TX. In some other implementations, the processing unit 604 can include an integrated data bus transceiver or otherwise include functionalities of the data bus transceiver 664 rendering the inclusion of the external data bus transceiver 664 unnecessary.

Power Circuit

At a high level, the power circuit 606 is operable to receive power from the power supply lines 622 and 624 and to provide power to various components of the WC 600 including the processing unit 604, the drive circuit 608, the feedback circuit 610 and the communications circuit 612. As described above, the first power supply line 622 receives a supply voltage $V_{Sup1}$, for example, a DC voltage having a value in the range of approximately 5 V to 42 V (relative to the supply voltage $V_{Sup2}$), and in one example application, a value of 24 V (although higher voltages may be desirable and are possible in other implementations). As is also described above, the second power supply line 624 can be a power supply return. For example, the voltage $V_{Sup2}$ on the second power supply line 624 can be a reference voltage, for example, a floating ground.

The power circuit 606 includes at least one down converter (also referred to herein as a "buck converter") for stepping down the supply voltage $V_{Sup1}$. In the illustrated implementation, the power circuit 606 includes two down converters: a first relatively low power (LP) down converter 668 and a second relatively high power (HP) down converter 670. The LP down converter 668 functions to step down the supply voltage $V_{Sup1}$ to a first down-converted voltage $V_{Dwn1}$. In some implementations, the down-converted voltage $V_{Dwn1}$ can have a value in the range of approximately 0 to 5 V, and in one example application, a value of approximately 3.3 V. The down-converted voltage $V_{Dwn1}$ is provided to the processing unit 604 for powering the processing unit 604. One example of an LP down converter suitable for use in some implementations is the TPS54240 2.5 Ampere (Amp) DC-DC step-down converter provided by Texas Instruments Inc. of Dallas, TX.

The HP down converter 670 functions to step down the supply voltage $V_{Sup1}$ to a second down-converted voltage $V_{Dwn2}$. One example of an HP down converter suitable for use in some implementations is the TPS54561 5 Amp DC-DC step-down converter provided by Texas Instruments Inc. of Dallas, TX. In some implementations, the down-converted voltage $V_{Dwn2}$ can have a value in the range of approximately 6V to 24V, and in one example application, a value of approximately 6 V. The down-converted voltage $V_{Dwn2}$ is provided to the voltage regulator 680, described below with reference to the drive circuit 608. In some implementations, the down-converted voltage $V_{Dwn2}$ also is provided to the rest of the components within the WC 600 that require power to perform their respective functions (although these connections are not shown in order to avoid over complicating the illustration and to avoid obscuring the other components and connections).

In some implementations, the HP down converter 670 provides the down-converted voltage $V_{Dwn2}$ only when enabled (or instructed) to do so, for example, when or while the processing unit 604 asserts an enable signal En. In some implementations, the enable signal En is provided to the HP down converter 670 via a Serial Peripheral Interface (SPI) interface bus 686. Although the SPI interface bus 686 may be described herein in the singular form, the SPI bus 686 may collectively refer to two or more SPI buses, each of which can be used to communicate with a respective component of the WC 600. In some implementations, the processing unit asserts the enable signal En only when the WC 600 is in an "active mode," as opposed to a "sleep mode."

In some implementations, the power circuit 606 further includes or is coupled with an energy storage device (or "energy well") 672 such as, for example, a capacitive storage device such as a rechargeable battery (or set of batteries) or a supercapacitor. For example, one example of a supercapacitor suitable for use in some implementations can have a capacitance $C_S$ of at least 400 Farads at 0.4 watt hours (Wh). In some implementations, the energy storage device 672 can be charged by a charger 674. In some such implementations, the charger 674 can be powered by the supply voltage $V_{Sup1}$. One example of such a charger suitable for use in some implementations is the LT3741 constant-current, constant-voltage, step-down controller provided by Linear Technology Corp. of Milpitas, CA. In some implementations, the charger 674 also is configured to provide power stored in the energy storage device 672 to the power supply line 622.

In some implementations, the charger 674 can alternatively or additionally be powered by one or more photovoltaic (or "solar") cells. For example, such photovoltaic (PV) cells can be integrated onto or into the IGUs 602, such as on one or more panes of the IGUs, controlled by the WC 600. In some such implementations, the power received via the PV cell can be regulated by a voltage regulator 676 prior to being provided to the charger 674 and ultimately the energy storage device 672. For example, the voltage regulator 676 can serve to step up or step down the voltage of the power received from the PV cells. The voltage regulator 676 also can generally be used to regulate the power provided by the PV cells as such power fluctuates throughout a day, for example, to maintain the voltage of the power at a fixed level. In some implementations, when the power stored in the energy storage device 672 is desired or needed, it gets released via the charger 674. In some implementations, to prevent back drive (that is, to ensure that power from the energy storage device 672 or the PV cells does not flow upstream over the upstream set of cables 616), the power circuit 606 can additionally include an asymmetric conductor 678, for example, a low loss semiconductor diode such as a Schottky junction diode or a p-n junction diode. The use of such a diode 678 can be especially advantageous in implementations in which one or more of the supply voltages $V_{Sup1}$ and $V_{Sup2}$ are pulsed. More examples of the use of integrated PV cells are described in U.S. patent application Ser. No. 14/951,410 filed Nov. 24, 2015 and titled SELF-CONTAINED EC IGU, which is hereby incorporated by reference in its entirety and for all purposes.

The integration of energy storage devices can be advantageous for a number of reasons, whether such devices are included within respective WCs 600 (like the energy storage device 672) or are otherwise distributed throughout a network system (such as the network system 300). For example, the power circuit 606 within each WC 600 can supplement or augment the power provided by the respective power supply lines 622 and 624 with power drawn from the energy storage device 672. Additionally or alternatively, energy storage devices external to the WCs 600 can provide power directly to the power distribution lines that distribute power throughout the network system to supply the WCs 600. Such implementations can be especially advantageous in high demand instances in which many IGUs 602 are to be transitioned concurrently. In times of lower demand, the normal power supply (for example, the power supply provided by a building source) can recharge the energy storage devices. More examples of the use of energy storage devices are described in U.S. patent application Ser. No. 14/951,410 filed Nov. 24, 2015 and titled SELF-CONTAINED EC IGU, and PCT Patent Application No. PCT/US16/41176 filed Jul. 6, 2016 and titled POWER MANAGEMENT FOR ELECTROCHROMIC WINDOW NETWORKS, both of which are hereby incorporated by reference in their entireties and for all purposes.

Additionally or alternatively, in some implementations, the transitions of the IGUs 602 can be staggered. For example, the MC 400 or the NC 500 can issue tint commands for subsets of the WCs 600 at different times so as to keep the total power consumed by the network system (or a portion of the network system) at any given time under a desirable, safe, permitted or maximum limit. In some other implementations, the WCs 304 can be programmed via various parameters received from the MC 400 or NC 500 to delay their transitions. For example, the secondary tint command issued by the NC 500 also can include a delay value that informs the WC 400 to begin a tint change after the time associated with the delay value has lapsed. As another example, the secondary tint command issued by the NC 500 also can include a time value that informs the WC 400 to begin a tint change when a time associated with the time value has been reached. In these latter two examples, the NC 500 can issue tint commands to the WCs 304 approximately simultaneously or contemporaneously while ensuring that staggering of the transitions is still achieved.

Drive Circuit

At a high level, the drive circuit 608 is generally operable to receive the command signal $V_{DCmnd}$ from the processing unit 604 and to provide the applied voltage signals $V_{App1}$ and $V_{App2}$ for driving the connected IGUs 602 based on the command signal $V_{DCmnd}$. The drive circuit 608 includes a voltage regulator 680 that receives the down-converted voltage $V_{Dwn2}$ from the HP down converter 670 in the power circuit 606. The voltage regulator 680 regulates, adjusts or otherwise transforms the voltage $V_{Dwn2}$ to provide (or "generate") first and second regulated voltage signals $V_{P1}$ and $V_{P2}$ based on the command signal $V_{DCmnd}$. In some implementations, the voltage regulator 680 is a buck-boost converter; that is, the voltage regulator 680 can be capable of functioning as a down converter to step down the voltage $V_{Dwn2}$ as well as an up converter to step up the input voltage $V_{Dwn2}$. Whether the voltage regulator 680 behaves as a down converter or as an up converter is dependent on the command signal $V_{DCmnd}$, as is the magnitude of the down conversion or up conversion, respectively. In some more specific implementations, the voltage regulator 680 is a synchronous buck-boost DC-DC converter. In some such implementations, the regulated voltage signals $V_{P1}$ and $V_{P2}$ are effectively fixed-amplitude DC signals from the perspective of the IGUs 602, and in particular, the ECDs within the IGUs 602.

As described in more detail above, the processing unit 604 can generate the command signal $V_{DCmnd}$ based on a number of different parameters, input values, algorithms or instructions. In some implementations, the processing unit 604 generates the command signal $V_{DCmnd}$ in the form of a digital voltage signal. In some such implementations, the drive circuit 608 can additionally include a digital-to-analog converter (DAC) 682 for converting the digital command signal $V_{DCmnd}$ to an analog command voltage signal $V_{ACmnd}$. In some implementations, the DAC 682 can be external to the processing unit 604, while in some other implementations, the DAC 682 is internal to the processing unit 604. In such implementations, the voltage regulator 680 more specifically generates the regulated voltage signals $V_{P1}$ and $V_{P2}$ based on the command voltage signal $V_{ACmnd}$. One example of a DAC suitable for use in some implementations is the AD5683R DAC by Analog Devices Inc. of Norwood, MA.

In some specific implementations, the regulated voltage signals $V_{P1}$ and $V_{P2}$ are rectangular wave (or "pulsed") DC signals, for example, pulse-width modulated (PWM) voltage signals. In some such implementations, the voltage regulator 680 includes an H-bridge circuit to generate the regulated voltage signals $V_{P1}$ and $V_{P2}$. In some such implementations, each of the regulated voltage signals $V_{P1}$ and $V_{P2}$ has the same frequency. In other words, the period from the start of a current pulse to the start of the next pulse in each of the regulated voltage signals $V_{P1}$ and $V_{P2}$ has the same time duration. In some implementations, the voltage regulator 680 is operable to modify the duty cycles of the respective voltage signals $V_{P1}$ and $V_{P2}$ such that the respective duty cycles are not equal. In this way, while the amplitude (or "magnitude") of the pulses (or "on" durations) of the first regulated voltage signal $V_{P1}$ can be equal to the magnitude of the pulses of the second regulated voltage signal $V_{P2}$, each of the first and the second regulated voltage signals $V_{P1}$ and $V_{P2}$ can have a different effective DC voltage magnitude from the perspective of the corresponding busbars and conducting layers of the ECDs in the IGUs 602. However, in some other implementations, the voltage regulator 680 can additionally or alternatively modify the respective magnitudes of the pulses of the voltage signals $V_{P1}$ and $V_{P2}$.

For example, consider an application in which each of the pulses of each of the regulated voltage signals $V_{P1}$ and $V_{P2}$ has an amplitude of 5 V, but in which the first voltage signal $V_{P1}$ has a 60% duty cycle while the second voltage signal $V_{P2}$ has a 40% duty cycle. In such an application, the effective DC voltage provided by each of the regulated voltage signals $V_{P1}$ and $V_{P2}$ can be approximated as the product of the respective pulse amplitude and the fraction of the duty cycle occupied the respective pulses. For example, the effective DC voltage provided by the first voltage signal $V_{P1}$ can be approximated as 3 V (the product of 5 V and 0.6) while the effective voltage provided by the second voltage signal $V_{P2}$ can be approximated as 2 V (the product of 5 V and 0.4). In some implementations, the duty cycle of first voltage signal $V_{P1}$ is complementary to the duty cycle of the second voltage signal $V_{P2}$. For example, as in the case of the example just provided, if the first voltage signal $V_{P1}$ has a duty cycle of X %, the duty cycle of the second voltage signal $V_{P2}$ can be Y %, where Y %=100%–X %. In some such implementations, the "on" durations of the first voltage signal $V_{P1}$ can coincide with the "off" durations of the second voltage signal $V_{P2}$, and similarly, the "off" durations of the first voltage signal $V_{P1}$ can coincide with the "on" durations of the second voltage signal $V_{P2}$. In some other implementations, the duty cycles do not necessarily have to be complementary; for example, the first voltage signal $V_{P1}$ can have a duty cycle of 50% while the second voltage signal $V_{P2}$ can have a duty cycle of 15%.

As described above, in some implementations, the regulated voltage signals $V_{P1}$ and $V_{P2}$ are effectively fixed-amplitude DC signals from the perspective of the IGUs 602, and in particular, the ECDs within the IGUs 602. To further such implementations, the voltage regulator 680 also can include one or more electronic filters, and in particular, one or more passive filter components such as one or more inductors. Such filters or filter components can smooth out the regulated voltage signals $V_{P1}$ and $V_{P2}$ prior to their provision to ensure that the regulated voltage signals $V_{P1}$ and $V_{P2}$ are effectively fixed-amplitude DC signals. To further facilitate the smoothing of the regulated voltage signals $V_{P1}$ and $V_{P2}$, the frequency of the pulses in the voltage signals $V_{P1}$ and $V_{P2}$ can be greater than or equal to 1 kilohertz (kHz) in some implementations. For example, as one of ordinary skill in the art will appreciate, the greater the frequency of the voltage oscillations applied to a conductor, the less able the electric charge in the conductor is able to react to the voltage oscillations. Additionally, the greater the inductance of an inductor, the more smoothing out of the voltage oscillations that are provided through the inductor.

In some implementations, the voltage regulator 680 can advantageously be capable of operating in a burst mode to reduce the power consumption of the WC 600 over time. In the burst mode of operation, the voltage regulator 680 automatically enters and exits the burst mode to minimize the power consumption of the voltage regulator 680. One example of such a voltage regulator suitable for use in some implementations is the LTC3112 15 V, 2.5 Amp Synchronous Buck-Boost DC/DC Converter provided by Linear Technology Corp. of Milpitas, CA.

In some implementations, the regulated voltage signals $V_{P1}$ and $V_{P2}$ are the applied voltage signals $V_{App1}$ and $V_{App2}$, respectively. In some such implementations, the difference between the regulated voltage signals $V_{P1}$ and $V_{P2}$ is the effective voltage $V_{Eff}$. In some implementations, to effect a lightening tinting transition, the processing unit 604 generates the command signal $V_{DCmnd}$ such that the voltage regulator 680 provides a positive effective voltage $V_{Eff}$, while to effect a darkening tinting transition, the processing unit 604 generates the command signal $V_{DCmnd}$ such that the voltage regulator 680 provides a negative effective voltage $V_{Eff}$. Conversely, in some other implementations involving different electrochromic layers or counter electrode layers, a darkening tinting transition is achieved by providing a positive effective voltage $V_{Eff}$ while a lightening tinting transition is achieved by providing a negative effective voltage $V_{Eff}$.

Either way, the voltage regulator 680 can provide a positive effective voltage $V_{Eff}$ by increasing the duty cycle of the first voltage signal $V_{P1}$ or by decreasing the duty cycle of the second voltage signal $V_{P2}$ such that the duty cycle of the first voltage signal $V_{P1}$ is greater than the duty cycle of the second voltage signal $V_{P2}$, and consequently, the effective DC voltage of the first applied voltage signal $V_{App1}$ is greater than the effective DC voltage of the second applied voltage signal $V_{App2}$. Similarly, the voltage regulator 680 can provide a negative effective voltage $V_{Eff}$ by decreasing the duty cycle of the first voltage signal $V_{P1}$ or by increasing the duty cycle of the second voltage signal $V_{P2}$ such that the duty cycle of the first voltage signal $V_{P1}$ is less than the duty cycle of the second voltage signal $V_{P2}$, and consequently, the effective DC voltage of the first applied voltage signal $V_{App1}$ is less than the effective DC voltage of the second applied voltage signal $V_{App2}$.

In some other implementations, including that illustrated in FIG. 6, the drive circuit 608 additionally includes a polarity switch 682. The polarity switch 682 receives the two regulated voltage signals $V_{P1}$ and $V_{P2}$ from the voltage regulator 680 and outputs the applied voltage signals $V_{App1}$ and $V_{App2}$ that are provided to the power lines 634 and 636, respectively. The polarity switch 482 can be used to switch the polarity of the effective voltage $V_{Eff}$ from positive to negative, and vice versa. Again, in some implementations, the voltage regulator 680 can increase the magnitude of $V_{P1}$ relative to $V_{P2}$, and thus increase the magnitude of $V_{Eff}$, by increasing the duty cycle of the first voltage signal $V_{P1}$ or by decreasing the duty cycle of the second voltage signal $V_{P2}$. Similarly, the voltage regulator 680 can decrease the magnitude of $V_{P1}$ relative to $V_{P2}$, and thus decrease the magnitude of $V_{Eff}$, by decreasing the duty cycle of the first voltage signal $V_{P1}$ or by increasing the duty cycle of the second voltage signal $V_{P2}$.

In some other implementations, the second voltage $V_{P2}$ can be a signal ground. In such implementations, the second voltage $V_{P2}$ can remain fixed or floating during transitions as well as during times between transitions. In such implementations, the voltage regulator 680 can increase or decrease the magnitude of $V_{P1}$, and thus the magnitude of $V_{Eff}$, by increasing or decreasing the duty cycle of the first voltage signal $V_{P1}$. In some other such implementations, the voltage regulator 680 can increase or decrease the magnitude of $V_{P1}$, and thus the magnitude of $V_{Eff}$, by directly increasing or decreasing the amplitude of the first voltage signal $V_{P1}$ with or without also adjusting the duty cycle of the first voltage signal $V_{P1}$. Indeed, in such latter implementations, the first voltage signal $V_{P1}$ can be an actual fixed DC signal rather than a pulsed signal.

In implementations that include a polarity switch 682, the second voltage signal $V_{P2}$ can be a signal ground and the first voltage signal $V_{P1}$ can always be a positive voltage relative to the second voltage signal $V_{P2}$. In such implementations, the polarity switch 682 can include two configurations (for example, two electrical configurations or two mechanical configurations). The processing unit 604 can control which of the configurations the polarity switch 682 is in via a control signal $V_{Polar}$ provided, for example, over the SPI bus 686. For example, the processing unit 604 can select the first configuration when implementing a lightening transition and the second configuration when implementing a darkening transition. For example, while the polarity switch 682 is in the first configuration, the polarity switch can output a positive first applied voltage signal $V_{App1}$ relative to the second applied voltage signal $V_{App2}$. Conversely, while the polarity switch 682 is in the second configuration, the polarity switch can output a negative first applied voltage signal $V_{App1}$ relative to the second applied voltage signal $V_{App2}$.

In some implementations, while in the first configuration, the polarity switch 682 passes the first voltage signal $V_{P1}$ (or a buffered version thereof) as the first applied voltage signal $V_{App1}$ and passes the second voltage signal $V_{P2}$ (or a grounded version thereof) as the second applied voltage signal $V_{App2}$, resulting in a positive effective voltage $V_{Eff}$. In some implementations, while in the second configuration, the polarity switch 682 passes the first voltage signal $V_{P1}$ (or a buffered version thereof) as the second applied voltage signal $V_{App2}$ and passes the second voltage signal $V_{P2}$ (or a grounded version thereof) as the first applied voltage signal $V_{App2}$, resulting in a negative effective voltage $V_{Eff}$. In some implementations, the polarity switch 682 can include an H-bridge circuit. Depending on the value of $V_{Polar}$, the H-bridge circuit can function in the first configuration or the second configuration. One example of a polarity switch suitable for use in some implementations is the IRF7301 HEXFET Power MOSFET provided by International Rectifier Corp. of San Jose, CA.

In some implementations, when switching from a positive voltage $V_{Eff}$ to a negative voltage $V_{Eff}$, or vice versa, the polarity switch 682 can be configured to switch from a first conducting mode, to a high impedance mode and then to a second conducting mode, or vice versa. For didactic purposes, consider an example in which the first regulated voltage $V_{P1}$ is at a positive hold value and in which the polarity switch 682 is in the first configuration. As described above, in some implementations the polarity switch 682 passes $V_{P1}$ (or a buffered version thereof) as the first applied voltage $V_{App1}$ resulting in a first applied voltage $V_{App1}$ that also is at the positive hold value. To simplify the illustration, also assume that $V_{P2}$ and $V_{App2}$ are both signal grounds. The result would be an effective applied voltage $V_{Eff}$ at the positive hold value. Now consider that the processing unit 604 is initiating a tinting transition that will result in an end state in which the effective applied voltage $V_{Eff}$ is at a negative hold value. In some implementations, to effect the tinting transition, the processing unit 604 adjusts the command signal $V_{DCmnd}$ to cause the voltage regulator 680 to lower the magnitude of the voltage $V_{P1}$ based on a negative ramp-to-drive profile. In some implementations, as the magnitude of the voltage $V_{P1}$ reaches a threshold value close to zero (for example, 10 millivolts (mV)), the processing unit 604 changes the polarity switching signal $V_{Polar}$ from a first value to a second value to cause the polarity switch 682 to switch from a positive conducting mode (the first configuration described above) to a high impedance mode.

While in the high impedance mode the polarity switch 682 does not pass $V_{P1}$. Instead, the polarity switch 682 can output values of $V_{App1}$ (or $V_{App2}$) based on predefined calculations or estimations. Meanwhile, the voltage regulator 680 continues to decrease the magnitude of $V_{P1}$ to zero. When the magnitude of $V_{P1}$ reaches zero, the voltage regulator 680 begins increasing the magnitude of $V_{P1}$ up to the magnitude of the negative drive value. When the magnitude of $V_{P1}$ reaches a threshold value (for example, 10 mV), the processing unit 604 then changes the polarity switching signal $V_{Polar}$ from the second value to a third value to cause the polarity switch 682 to switch from the high impedance mode to a negative conducting mode (the second configuration described above). As described above, in some such implementations, the polarity switch 682 passes $V_{P1}$ as the second applied voltage $V_{App2}$, while the first applied voltage $V_{App1}$ is a signal ground. To summarize, while the magnitude of $V_{P1}$ is greater than or equal to a threshold voltage (for example, 10 mV) the polarity switch 682 passes the regulated voltage $V_{P1}$ as either the first applied voltage $V_{App1}$ or the second applied voltage $V_{App2}$, depending on whether the polarity switch 682 is in the positive conducting mode (first configuration) or the negative conducting mode (second configuration), respectively. As such, the effective applied voltage $V_{Eff}$ is dictated by the magnitude of $V_{P1}$ and the polarity configuration of the polarity switch 682 while the value of $V_{Eff}$ is less than or equal to $-10$ mV or greater than or equal to $+10$ mV. But while the polarity switch 682 is in the high impedance mode, in the range when $-10\ \text{mV} < V_{Eff} < 10\ \text{mV}$, the value of $V_{Eff}$, and more generally the values of $V_{App1}$ and $V_{App2}$, are determined based on predefined calculations or estimations.

Feedback Circuit

As described above, in some implementations the processing unit 604 can modify the command signal $V_{DCmnd}$ during operation (for example, during a tinting transition or during times between tinting transitions) based on one or more feedback signals $V_{Feed}$. In some implementations, a feedback signal $V_{Feed}$ is based on one or more voltage feedback signals $V_{OC}$, which are in turn based on actual voltage levels detected across the ECDs of the connected IGUs. Such voltage feedback signals $V_{OC}$ can be measured during periodic open circuit conditions (during or in between transitions) while the applied voltages $V_{App1}$ and $V_{App2}$ are turned off for brief durations of time. For example, an open-circuit voltage feedback signal $V_{OC}$ can be measured using a differential amplifier 688 having a first input connected with power line 634, a second input connected with power line 636, and an output connected with an analog-to-digital converter (ADC) 692. The ADC 692 can be internal or external with respect to the processing unit 604. One example of a differential amplifier suitable for use in some implementations is the low power, adjustable gain, precision LT1991 provided by Linear Technology Corp. of Milpitas, CA.

Additionally or alternatively, a second feedback signal $V_{Feed}$ can be based on one or more current feedback signals $V_{Cur}$, which are in turn based on actual current levels detected through the ECDs. Such current feedback signals $V_{Cur}$ can be measured using an operational amplifier 690 having a first input connected with a first input terminal of a resistor 691, which is also connected to an output of the polarity switch 682. A second input of the operational amplifier 690 can be connected with a second terminal of the resistor 691, which is also connected to a node at the second supply voltage $V_{Sup2}$. The output of the operational amplifier 690 can be connected with the ADC 692. One example of an operational amplifier suitable for use in some implementations is the low noise, CMOS, precision AD8605 provided by Analog Devices Inc. of Norwood, MA. Because the resistance RF of the resistor 691 is known, the actual current flowing out of the polarity switch 682 can be determined by processing unit 604 based on the voltage difference signal $V_{Cur}$.

In some implementations, the processing unit 604 also is configured to compensate for transmission losses resulting from the passage of the voltage signals $V_{App1}$ and $V_{App2}$ through the conducting power distribution lines 633 and 635. More specifically, the actual voltages provided to the busbars of a given IGU 602 can be less than the voltages $V_{App1}$ and $V_{App2}$ at the output of the WC 600. As such, the actual voltage $V_{Act}$ applied across the ECD within the IGU 402 can be less than the difference between the voltages $V_{App1}$ and $V_{App2}$ at the output of the WC 600. For example, the resistances of the power distribution lines 634 and 636—diagrammatically represented as resistors each having resistance $R_T$—can result in significant voltage drops along the power distribution lines 634 and 636. The resistance of each power distribution line is, of course, directly proportional to the length of the power distribution line and inversely proportional to the cross-sectional area of the power distribution line. An expected voltage drop can thus be calculated based on knowledge of the length of the power distribution lines. However, this length information is not necessarily available. For example, installers may not record such length information during installation of the IGUs or may not record such information accurately, precisely or correctly. Additionally, in some legacy installations where existing wires are utilized, such length information may not be available.

If information about the lengths of the power distribution lines is available, this information can be used to create a lookup table, for example, that is stored in the memory chip within the plug-in component. This length information can then be read by the WC 600 upon power-up of the WC 600. In such implementations, the voltages $V_{App1}$ and $V_{App2}$ can be increased (for example, using firmware or software) to compensate for the estimated voltage drops along the respective power distribution lines 634 and 636. While such compensation schemes and algorithms can be to some extent effective, such schemes and algorithms cannot precisely account for the dynamic changes in the resistances of the power distribution lines resulting from changes in the temperatures of the power distribution lines, which can change greatly in a given day based on use of the power distribution lines, based on the position of the sun as the Earth spins, based on the weather, and based on the season.

Additionally or alternatively, a third feedback signal $V_{Feed}$ can be based on one or more voltage compensation signals $V_{Comp}$, which are in turn based on an actual voltage drop detected along at least one of the power distribution lines. For example, such voltage compensation signals $V_{Comp}$ can be measured using a differential amplifier 694 having a first input connected with a one of the power distribution lines 634 or 634 in the WC 600, a second input connected with the fifth line 642 in the WC 600, and an output connected with the ADC 692. In some such implementations, such as that shown and described with reference to FIG. 7, the plug-in component 752 includes a voltage compensation circuit 762. In one example implementation, the voltage compensation circuit 762 includes a conductor that provides a short between the fifth line 742 and the first or the second power distribution line 734 or 736, respectively, within the plug-in component 752. In such an implementation, the differential amplifier 694 detects the offset voltage $V_{Comp}$, which is proportional to the current I through the power distribution line between the WC 600 and the IGU 602, as well as the length of, and the cross-sectional area of, the power distribution line between the WC 600 and the IGU 602. The current I is determined by the processing unit 604 based on the signal $V_{Cur}$ output from operational amplifier 690. In this way, the processing unit can increase or decrease the command voltage signal $V_{DCmnd}$ to compensate for the static and dynamic voltage drops along the power distribution lines without having direct knowledge of the length or the cross-sectional area of the power distribution lines.

In one implementation, the resistance, $R_T$, of each power distribution line between the WC 600 and the IGU 602 is calculated by dividing $V_{Comp}$ by I. This resistance information is then stored in a parameter table within the WC 600. $V_{Comp}$ is then dynamically calculated as $2*R_T*V_{Cur}$. The voltage signals $V_{App1}$ and $V_{App2}$ can subsequently dynamically adjusted automatically using the calculated $V_{Comp}$ amount to compensate for voltage drop in the lines 633 and 635. In another scenario, the voltage signals $V_{App1}$ and $V_{App2}$ are adjusted dynamically by $2*V_{Comp}$ to account for voltage drop in lines 633 and 635.

Voltage compensation also is described in more detail in U.S. patent application Ser. No. 13/449,248 filed Apr. 17, 2012 and titled CONTROLLER FOR OPTICALLY SWITCHABLE WINDOWS, and U.S. patent application Ser. No. 13/449,251 filed Apr. 17, 2012 and titled CONTROLLER FOR OPTICALLY SWITCHABLE WINDOWS, both of which are hereby incorporated by reference in their entireties and for all purposes. In some other implementations, a voltage compensation circuit 762 can be connected to communication lines 739 and 741, which connect to the chip 756. In some other implementations, the voltage compensation circuit 762 can be directly coupled with the communication lines 637 and 639 via the interface 754 and the communication lines 738 and 740.

Each of the open-circuit voltage feedback signal $V_{OC}$, the current feedback signal $V_{Cur}$ and the voltage compensation feedback signal $V_{Comp}$ can be digitized by the ADC 692 and provided to the processing unit 604 as a feedback signal $V_{Feed}$. One example of an ADC suitable for use in some implementations is the low power AD7902 by Analog Devices Inc. of Norwood, MA. In some instances above, while the feedback signal $V_{Feed}$ is referenced in the singular form, the feedback signal $V_{Feed}$ can collectively refer to three (or more or less) individual feedback signals: a first one for the digitized open-circuit voltage signal $V_{OC}$, a second one for the digitized current signal $V_{Cur}$ and a third one for the digitized voltage compensation signal $V_{Comp}$. The feedback signal $V_{Feed}$ can be provided to the processing unit 604 via the SPI bus 686. The processing unit 604 can then use the feedback signal $V_{Feed}$ to dynamically modify the command signal $V_{DCmnd}$ such that the actual value $V_{Act}$ of the voltage applied across the ECD stack of the IGU 602 is approximately equal to the desired effective voltage $V_{Eff}$, and thus, such that the target tint state is reached.

For example, as the outside environment becomes brighter, the WC 600 can receive a tint command from the NC 500 to darken an IGU 602. However, in some implementations or instances, as the respective ECD becomes increasingly more tinted, the temperature of the ECD can rise significantly as a result of the increased photon absorption. Because the tinting of the ECD can be dependent on the temperature of the ECD, the tint state can change if the command signal $V_{DCmnd}$ is not adjusted to compensate for the temperature change. In some implementations, rather than detecting the temperature fluctuation directly, the processing unit 604 can adjust the command signal $V_{DCmnd}$ based on the actual voltage detected across the ECD or the actual current detected through the ECD, as determined via the feedback signals $V_{OC}$ and $V_{Cur}$.

Additionally, as described above, each WC 600 can be connected to and power a plurality of IGUs 602. While the cross-sectional areas of the set of power distribution lines that connect a given WC 600 to each respective one of the plurality of connected IGUs 602 are generally the same, the lengths of each set of power distribution lines can be different based on the location of the respective IGU 602 relative to the WC 600. Thus, while the WC 600 provides the voltages $V_{App1}$ and $V_{App2}$ to the plurality of connected IGUs 602 via a common node (such as through the coupling connecter 748 described above with reference to FIG. 7), the values of the voltages $V_{App1}$ and $V_{App2}$ actually received by each of the plurality of IGUs 602 can be different based on the locations of the respective ones of the IGUs 402 relative to the WC 600. In some implementations, it can be desirable that the power distribution lines connecting each of the IGUs 602 to a given WC 600 have the same or similar length to reduce the disparities between the actual applied voltages received by the IGUs 602.

Communications Circuit

The communications circuit 612 is generally configured to enable communication between the processing unit 604 and various other components within or outside of the WC 600. For example, the communications circuit 612 can include a bridge device 696. In some implementations, the bridge device 696 enables the processing unit 696 to communicate and receive data signals $Data_3$ and $Data_4$ over communication lines 638 and 640 (collectively referred to as data bus 644), and corresponding communication lines 637 and 639. In some implementations, the bridge device 696 can be a 1-Wire bridge device configured to communicate according to the 1-Wire communications protocol. In some such implementations, the communication lines 639 and 640 can be signal grounds, while the communication lines 637 and 639, which carry the data signal $Data_3$, can provide both data and power to the chip 756 as well as to any number of 1-Wire-compatible sensors within the IGU 602. In some implementations, the chip 756 within the IGU 602 can be an intermediary for communications of data between the processing unit 604 and the sensors within the IGU 602. For example, the sensors can be connected to communication lines 739 and 741, which connect to the chip 756. In some other implementations, the sensors can be directly coupled with the communication lines 637 and 639 via the interface 754 and the communication lines 738 and 740. At other times, the data signal $Data_3$ can communicate sensor data back to the processing unit 604.

The bridge device 696 is configured to manage the communications to, from and among the 1-Wire devices. The processing unit 604 can communicate instructions to the bridge device 696, or receive data from the bridge device, via an I²C bus 697. Although the I²C bus 697 may be described herein in the singular form, the I²C bus 697 may collectively refer to two or more I²C buses, each of which can be used to communicate with a respective component of the WC 600. Thus, in some implementations, the bridge device 696 functions as an I²C to 1-Wire bridge that interfaces directly to an I²C host port of the I²C master (the processing unit 604) to perform bidirectional protocol conversion between the processing unit 604 and the downstream 1-Wire slave devices including the chip 756 and any sensors on or within the IGU 602. One such bridge device suitable for use in some implementations is the DS2482 1-Wire Master device provided by Maxim Integrated Products, Inc. of San Jose, CA. In some other implementations, the functions of the bridge device 696 can be integrated into the processing unit 604.

In some implementations, responsive to powering on or otherwise activating the processing unit 604, the processing unit 604 instructs, via the bridge device 696, the communication module 756 within the plug-in component 752 to transfer the device and drive parameters to the RAM or other memory device within the processing unit 604. Additionally or alternatively, the processing unit 604 can periodically poll for the communication module 756 via the bridge device 696. The communication module 756 can then respond to the poll by transferring the drive parameters to the RAM or other memory device within the WC 600 via the bridge device 696.

In some implementations, the communications circuit 612 also includes a radio transceiver 698. For example, the radio transceiver 698 can communicate with the processing unit 604 via the I²C bus 697. The radio transceiver 698 can enable wireless communication between the processing unit 604 and other devices having such radio transceivers including, for example, other WCs 600, the NC 500, the IGUs 602 as well as mobile devices or other computing devices. While referred to herein in the singular form, the radio transceiver 698 can collectively refer to one or more radio transceivers each configured for wireless communication according to a different respective protocol. For example, some wireless network protocols suitable for use in some implementations can be based on the IEEE 802.11 standard, such as Wi-Fi (or "WiFi"). Additionally or alternatively, the radio transceiver 698 can be configured to communicate based on the IEEE 802.15.4 standard, which defines the physical layer and media access control for low-rate wireless personal area networks (LR-WPANs). For example, higher level protocols compatible with the IEEE 802.15.4 standard can be based on the ZigBee, 6LoWPAN, ISA100.11a, WirelessHART or MiWi specifications and standards. Additionally or alternatively, the radio transceiver 698 can be configured to communicate based on the Bluetooth standard (including the Classic Bluetooth, Bluetooth high speed and Bluetooth low energy protocols and including the Bluetooth v 4.0, v 4.1 and v 4.2 versions). Additionally or alternatively, the radio transceiver 698 can be configured to communicate based on the EnOcean standard (ISO/IEC 14543-3-10).

As described above, wireless communication can take the place of communication over physical cables between the WC 600 and the NC 500. In some other implementations, both wired and wireless communications can be established between the WC 600 and the NC 500. In other words, at least two communication links of different types can be simultaneously maintained to send data between the WC and the MC. For instance, the WC can be in wired communication with the NC using CANbus for some less data intensive messaging such as WC voltage data, current data and sensor data. At the same time, the WC can be in wireless communication with the NC via WiFi or other any wireless communication technique disclosed herein for more data intensive communications such as a video camera feed and/or an audio feed. When two or more communication links are maintained, one communication link can serve as a backup for the other in case of a disruption or other error condition. In some implementations, sensors and other devices can be in communication with the WC using a wireless link, a wired link or both. In some implementations, the distributed WCs 600 can form a mesh network for communicating various information to one another or to the MC 400, the NC 500 or to other devices, rendering physical communication lines between the various controllers of a network system such as network system 300 unnecessary. As also noted above, the WC 600 can communicate wirelessly with the IGUs 602 it controls. For example, the communication module 756 within each IGU 602 also can include a radio transceiver for communicating with the radio transceiver 698 and the processing unit 604 of the WC 600. In some implementations, wireless communication can take the place of communication over physical cables between the WC 600 and the IGU 602. For example, wireless communication can take the place of the 1-Wire communication bus 644, the communication lines 637 and 639, and the communication lines 738 and 740. Such wireless implementations can facilitate the manufacture and installation of self-contained IGUs, for example, IGUs that don't require the attachment of physical cables. In some such self-contained implementations, each IGU can include an energy storage device and an integrated photovoltaic cell for charging the energy storage device. The energy storage device, in turn, can power the tint states and tint state transitions of the ECD within the IGU.

In some implementations, the communications circuit 612 can additionally or alternatively include a power line communications module 699. The power line communications module 699 can be used in implementations or instances in which data is communicated via the power supply voltage signal $V_{Sup1}$ (and in some cases, also $V_{Sup2}$) rather than, or in addition to, over communications lines 622 and 624 or wirelessly. As shown, the power line communications module 699 also can communicate with the processing unit 604 via the I²C bus 697.

Auto-/Semiauto-Commissioning/Self-Discovery

In some implementations, after installation and after the WCs have been turned on, the WCs can request or poll for the 1-Wire IDs within the IGUs 602. These 1-Wire IDs are then sent from the WC to the NC, and ultimately to the MC so that the MC can associate the CANbus ID of the WC to the 1-Wire IDs of the IGUs it controls. In some other implementations, the IGUs also can include wireless transceivers. For example, a Bluetooth transceiver within each IGU can broadcast a beacon containing the ID of the IGU, which the WC can then pick up. Once the IDs of the IGUs connected with the WC are known, a person can then proceed through the building with a mobile device (phone, IPad, or proprietary device) to associate each of the IGUs with a physical location.

Sleep Modes

In some implementations, the WC 600 is configured to enter and exit one or more sleep modes in addition to the normal (or "active") operating mode. For example, after a target tint state has been reached and a holding voltage has been applied for a duration of time, the processing unit 604 can stop asserting (or "deassert") the enable signal EN, and thus disable the HP downconverter 670. Because the HP down converter 670 supplies power to most of the components within the WC 600, when the enable signal EN is deasserted, the WC 600 enters a first sleep mode. Alternatively, instead of turning off or disabling the HP down converter 670, the processing unit can disable each of the components within the WC 600 individually or selectively in groups by deasserting other enable signals (not shown) to such individual components or groups. In some implementations, prior to disabling the HP down converter 670 or otherwise disabling the desired components within the WC 600, the processing unit 604 asserts a control signal Cntrl that causes the voltage regulator 680 to enter a high impedance mode, for example, so that when the other components are turned off, charge stored within the EC stacks of the connected IGUs 602 doesn't flow backwards from the IGUs into the WC 600. In some implementations, the LP down converter 668 remains on during the first sleep mode to provide full power to the processing unit 604. In some implementations, the processing unit 604 can enable the differential amplifier 688 and the ADC 692 periodically to determine whether $V_{OC}$ has fallen (or risen) below a threshold level, for example, to determine whether the tint state of the IGU has changed beyond an acceptable level. When $V_{OC}$ has fallen below (or risen above) the threshold, the processing unit 604 can "awaken" the WC 600 (for example, exit the sleep mode and return to the normal active operating mode) by turning on the HP down converter 670 or otherwise turning on the components necessary to drive the EC stack of the IGU to an acceptable level. In some implementations, upon exiting the sleep mode, the processing unit 604 can cause a voltage ramp to be applied to the EC stack followed by a holding voltage.

In some implementations, the processing unit 604 can be configured to cause the WC 600 to enter a second (or "deep") sleep mode different than the first (or "light") sleep mode. For example, after the WC 600 has been in the first sleep mode for a duration of time, the processing unit 604 can disable some of its functionality to further save power. In effect, the processing unit 604 itself enters a sleep mode. The processing unit 604 still gets the 3.3V from the LP down converter, but it configured in a reduced-functionality, low-power mode in which it consumes significantly less power than in the normal fully functional mode. While in such a second sleep mode, the processing unit 604 can be awakened in one or more of a number of ways. For example, the processing unit 604 can awaken itself periodically (such as every minute, every few minutes, every 10 minutes). As described above, the processing unit 604 can then enable the differential amplifier 688 and the ADC 692 to determine whether $V_{OC}$ has fallen below (or risen above) a threshold level, for example, to determine whether the tint state of the IGU has changed beyond an acceptable level. When $V_{OC}$ has fallen below (or risen above) the threshold, the processing unit 604 can awaken the WC 600 by turning on the HP down converter 670 or otherwise turning on the components necessary to drive the EC stack of the IGU to an acceptable level. In some implementations, upon exiting the sleep mode, the processing unit 604 can cause a voltage ramp to be applied to the EC stack followed by a holding voltage.

Additionally or alternatively, the processing unit 604 can be awakened from such a deep sleep mode based on an interrupt such as a command from NC 500 or based on a signal from an occupancy sensor communicatively coupled with the processing unit 604. When such an occupancy sensor detects an occupant, the occupancy sensor can provide a signal to the processing unit 604 that causes the processing unit to awaken and return the WC 600 to the active mode (in some other implementations, the occupancy sensor can be coupled with the NC 500 which then sends an awaken command to the WC 500 based on a signal from the occupancy sensor). In some implementations, for example in scenarios in which users carry devices that include Bluetooth or other suitable types of transceivers that periodically poll or send beacons for pairing, the processing unit 604 can periodically awaken to enable the radio transceiver 698 to determine whether any such devices are in proximity.

Additionally, to further save power during such sleep modes, the processing unit 604 can enable the voltage regulator 680 via the control signal Cntrl to draw the power needed to power the processing unit 604 and the radio transceiver 698 from the charge stored within the EC stack of the IGU 602. More examples of the use of power conservation and intelligent and efficient power distribution are described in PCT Patent Application No. PCT/US16/41176 filed Jul. 6, 2016 and titled POWER MANAGEMENT FOR ELECTROCHROMIC WINDOW NETWORKS, which is hereby incorporated by reference in its entirety and for all purposes. Additionally, subject matter related to obtaining $V_{OC}$ is further described in U.S. patent application Ser. No. 13/931,459 filed Jun. 28, 2013 and titled CONTROLLING TRANSITIONS IN OPTICALLY SWITCHABLE DEVICES, which is hereby incorporated by reference in its entirety and for all purposes.

Smart Network Controller

Figure 8:
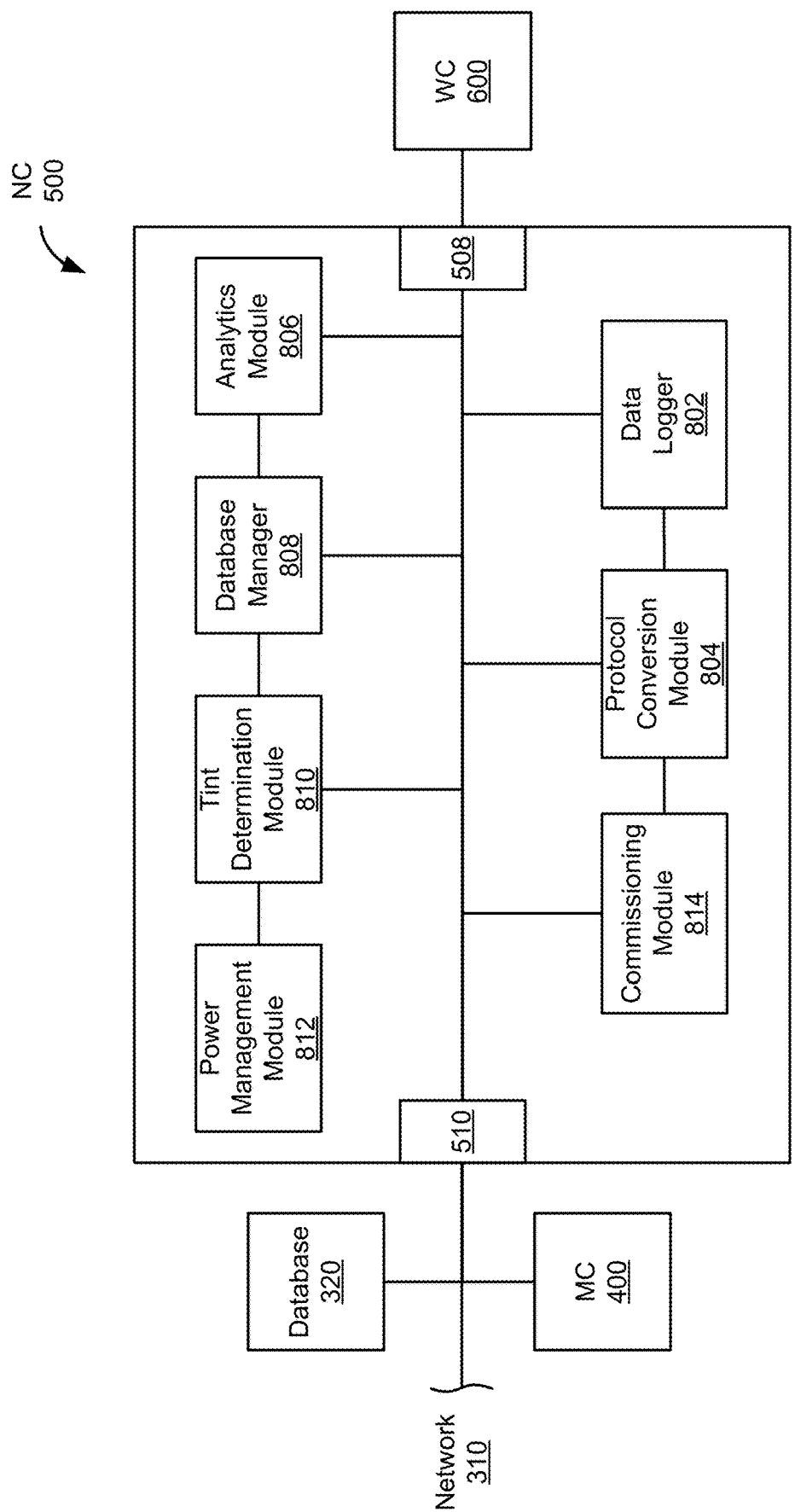
FIG. 8 shows a block diagram of example modules of a network controller in accordance with some implementations.

In some implementations, the NC 500 described with reference to FIG. 5 can take over some of the functions, processes or operations that are described above as being responsibilities of the MC 400 of FIG. 4. Additionally or alternatively, the NC 500 can include additional functionalities or capabilities not described with reference to the MC 400. FIG. 8 shows a block diagram of example modules of a network controller in accordance with some implementations. For example, the modules of FIG. 8 can be implemented in the NC 500 in any suitable combination of hardware, firmware and software. In some implementations in which the NC 500 is implemented as a network controller application executing within a computer, each of the modules of FIG. 9 also can be implemented as an application, task or subtask executing within the network controller application.

In some implementations, the NC 500 periodically requests status information from the WCs 600 it controls. For example, the NC 500 can communicate a status request to each of the WCs 600 it controls every few seconds, every few tens of seconds, every minute, every few minutes or after any desirable period of time. In some implementations, each status request is directed to a respective one of the WCs 600 using the CAN ID or other identifier of the respective WC 600. In some implementations, the NC 500 proceeds sequentially through all of the WCs 600 it controls during each round of status acquisition. In other words, the NC 500 loops through all of the WCs 600 it controls such that a status request is sent to each of the WCs 600 sequentially in each round of status acquisition. After a status request has been sent to a given WC 600, the NC 500 then waits to receive the status information from the respective WC 600 before sending a status request to the next one of the WCs in the round of status acquisition.

In some implementations, after status information has been received from all of the WCs 600 that the NC 500 controls, the NC 500 then performs a round of tint command distribution. For example, in some implementations, each round of status acquisition is followed by a round of tint command distribution, which is then followed by a next round of status acquisition and a next round of tint command distribution, and so on. In some implementations, during each round of tint command distribution, the NC 500 proceeds to send a tint command to each of the WCs 600 that the NC 500 controls. In some such implementations, the NC 500 also proceeds sequentially through all of the WCs 600 it controls during the round of tint command distribution. In other words, the NC 500 loops through all of the WCs 600 it controls such that a tint command is sent to each of the WCs 600 sequentially in each round of tint command distribution.

In some implementations, each status request includes instructions indicating what status information is being requested from the respective WC 600. In some implementations, responsive to the receipt of such a request, the respective WC 600 responds by transmitting the requested status information to the NC 500 (for example, via the communication lines in the upstream set of cables 616). In some other implementations, each status request by default causes the WC 600 to transmit a predefined set of information for the set of IGUs 602 it controls. Either way, the status information that the WC 600 communicates to the NC 500 responsive to each status request can include a tint status value (S) for the IGUs 602, for example, indicating whether the IGUs 602 is undergoing a tinting transition or has finished a tinting transition. Additionally or alternatively, the tint status value S or another value can indicate a particular stage in a tinting transition (for example, a particular stage of a voltage control profile). In some implementations, the status value S or another value also can indicate whether the WC 600 is in a sleep mode. The status information communicated in response to the status request also can include the tint value (C) for the IGUs 602, for example, as set by the MC 400 or the NC 500. The response also can include a set point voltage set by the WC 600 based on the tint value (for example, the value of the effective applied $V_{Eff}$). In some implementations, the response also can include a near real-time actual voltage level $V_{Act}$ measured, detected or otherwise determined across the ECDs within the IGUs 602 (for example, via the amplifier 688 and the feedback circuit 610). In some implementations, the response also can include a near real-time actual current level $I_{Act}$ measured, detected or otherwise determined through the ECDs within the IGUs 602 (for example, via the amplifier 690 and the feedback circuit 610). The response also can include various near real-time sensor data, for example, collected from photosensors or temperature sensors integrated on or within the IGUs 602.

Some protocols such as CANOpen limit the size of each frame of data sent from the WC 600 to the NC 500 and vice versa. In some instances, the sending of each status request and the receiving of status information responsive to such a request actually includes multiple two-way communications, and thus, multiple frames. For example, each status request described above can include a separate sub-request for each of the status values described above. As a more specific example, each status request from the NC 500 to a particular WC 600 can include a first sub-request requesting the status value S. In response to the first sub-request, the WC 600 can transmit to the NC 500 an acknowledgement and a frame including the status value S. The NC 500 can then transmit a second sub-request to the WC 600 requesting the tint value C. In response to the second sub-request, the WC 600 can transmit to the NC 500 an acknowledgement and a frame including the tint value C. The values of $V_{Eff}$, $V_{Act}$ and $I_{Act}$ as well as sensor data can similarly be obtained with separate respective sub-requests and responses.

In some other implementations, rather than polling or sending a status request to each of the WCs 600 on a sequential basis, the NC 500 can asynchronously send status requests to particular WCs 600. For example, it may not be useful to receive status information (including C, S, $V_{Eff}$, $V_{Act}$ and $I_{Act}$) from all of the WCs 600 periodically. For example, it may be desirable to asynchronously request such information from only particular ones of the WCs 600 that have recently received or implemented a tint command, that are currently undergoing a tinting transition, that have recently finished a tinting transition, or from which status information has not been collected for a relatively long duration of time.

In some other implementations, rather than polling or sending status requests to each of the WCs 600 individually, whether on a sequential basis or asynchronously, each of the WCs 600 can periodically broadcast its status information (including C, S, $V_{Eff}$, $V_{Act}$ and $I_{Act}$). In some such implementations, each of the WCs 600 can broadcast the status information wirelessly. For example, each WC 600 can broadcast the status information every few seconds, tens of seconds, minutes or tens of minutes. In some implementations, the WCs 600 can be synchronized to broadcast their respective status information at certain times to avoid occupying a large amount of collective bandwidth. Additionally, the broadcast period can be different for different sets (such as the zones described above) of WCs 600 and at different times, for example, based on the positions of the respective IGUs in the building and relative to the sun, or based on whether the rooms adjoining the IGUs are occupied.

In some other implementations, each of the WCs 600 can broadcast its status information in response to certain conditions, for example, when starting a tinting transition, when finishing a tinting transition, when $V_{Act}$ changes by a threshold, when $I_{Act}$ changes by a threshold, when sensor data (for example, light intensity or temperature) changes by a threshold, when an occupancy sensor indicates the adjoining room is occupied, or when entering or exiting a sleep mode. The NC 500 can listen for such broadcasted status information, and when it hears it, record the status information. Advantageously, in broadcasting implementations, the time required to receive status information from a set of WCs 600 is approximately cut in half because there is no need to request the status information from the WCs 600, and thus, no roundtrip delay associated with each WC 600. Instead, there is only a one-way latency associated with the time required to transmit the status information from each WC 600 to the NC 500.

In some other implementations, at power on or thereafter, each of the WCs 600 can be configured to read device parameters, drive parameters and lite IDs or other ECD IDs for connected IGUs. The WCs then broadcast their CAN IDs as well as the lite IDs and the associated device and drive parameters. That is, in some implementations, such broadcasting is initiated by one or more processors in a WC without or irrespective of any requests for such data by the NCs or other controllers. When the IDs and parameters are broadcast, the NC 500 can receive and process the IDs and parameters. In some implementations, lite IDs and parameters from messages broadcasted by the WC are then communicated from the NC to the MC, which stores them, for example, in a table including a list of known CAN IDs. For example, each row of the table can include a CAN ID, a WC location ID associated with the CAN ID, the connected lite IDs, the locations of the respective windows associated with the lite IDs, and the device and drive parameters for the respective ECDs. In some implementations, the MC can store the table in a cloud-based database system so that even if the MC fails, another MC can be instantiated and access the table in the cloud.

In some instances, during commissioning, a field service technician may intervene and attempt to perform ad hoc lite-to-lite matching based on perceived differences in the tints of two or more neighboring windows. In such cases, the technician may determine that the drive parameters for one or more ECDs should be modified, and these modifications are then implemented. In some implementations, the WC is configured to broadcast the modified parameters to the corresponding NC, from which the parameters can be communicated to the MC. In situations where the WC then fails or experiences an error, the NC or MC can determine that the WC has failed, for instance, because the WC is no longer broadcasting in situations where the WC has been configured to periodically broadcast data such as the WC's CAN ID and/or WC location ID. When the failed WC is replaced with a new WC, which is then powered-on, the new WC will read the corresponding lite IDs and, as described above, broadcast the new WC's CAN ID and the connected lite IDs. When the NC or MC receives this information, the NC or MC can be configured to retrieve the modified drive parameters for the failed WC from a database table by performing a table look-up using the lite IDs. In such instances, the NC or MC is also configured to automatically update the table by assigning the new CAN ID to the WC location ID and associated lite IDs. The NC or MC will then automatically communicate the modified drive parameters to the new WC. In this way, the ECD which had its drive parameters modified during commissioning can still be driven by the modified drive parameters even when the respective WC has been replaced. Other techniques for automatically modifying, updating, and applying drive parameters can be performed in some implementations, as further described in U.S. Provisional Patent Application No. 62/305,892, titled METHOD OF COMMISSIONING ELECTROCHROMIC WINDOWS, by Shrivastava et al., filed Mar. 9, 2016, which is hereby incorporated by reference in its entirety and for all purposes, In some such implementations, rather than sending a tint command to each of the WCs 600 on a sequential basis, the NC 500 can asynchronously send a tint command to a particular WC 600 whether through a wired or wireless connection. For example, it may not be useful to send tint commands to all of the WCs 600 periodically. For example, it may be desirable to asynchronously sent tint commands to only particular ones of the WCs 600 that are to be transitioned to a different tint state, for which status information has just been (or has recently been) received, or to which a tint command has not been sent for a relatively long duration of time.

Data Logger

In some implementations, the NC 500 also includes a data logging module (or "data logger") 802 for recording data associated with the IGUs controlled by the NC 500. In some implementations, the data logger 802 records the status information included in each of some or all of the responses to the status requests. As described above, the status information that the WC 600 communicates to the NC 500 responsive to each status request can include a tint status value (S) for the IGUs 602, a value indicating a particular stage in a tinting transition (for example, a particular stage of a voltage control profile), a value indicating whether the WC 600 is in a sleep mode, a tint value (C), a set point voltage set by the WC 600 based on the tint value (for example, the value of the effective applied $V_{Eff}$), an actual voltage level $V_{Act}$ measured, detected or otherwise determined across the ECDs within the IGUs 602, an actual current level $I_{Act}$ measured, detected or otherwise determined through the ECDs within the IGUs 602, and various sensor data, for example, collected from photosensors or temperature sensors integrated on or within the IGUs 602. In some other implementations, the NC 500 can collect and queue status information in a messaging queue like RabbitMC, ActiveMQ or Kafka and stream the status information to the MC for subsequent processing such as data reduction/compression, event detection, etc., as further described herein.

In some implementations, the data logger 802 within the NC 500 collects and stores the various information received from the WCs 600 in the form of a log file such as a comma-separated values (CSV) file or via another table-structured file format. For example, each row of the CSV file can be associated with a respective status request, and can include the values of C, S, $V_{Eff}$, $V_{Act}$ and $I_{Act}$ as well as sensor data (or other data) received in response to the status request. In some implementations, each row is identified by a timestamp corresponding to the respective status request (for example, when the status request was sent by the NC 500, when the data was collected by the WC 600, when the response including the data was transmitted by the WC 600, or when the response was received by the NC 500). In some implementations, each row also includes the CAN ID or other ID associated with the respective WC 600.

In some other implementations, each row of the CSV file can include the requested data for all of the WCs 600 controlled by the NC 500. As described above, the NC 500 can sequentially loop through all of the WCs 600 it controls during each round of status requests. In some such implementations, each row of the CSV file is still identified by a timestamp (for example, in a first column), but the timestamp can be associated with a start of each round of status requests, rather than each individual request. In one specific example, columns 2-6 can respectively include the values C, S, $V_{Eff}$, $V_{Act}$ and $I_{Act}$ for a first one of the WCs 600 controlled by the NC 500, columns 7-11 can respectively include the values C, S, $V_{Eff}$, $V_{Act}$ and $I_{Act}$ for a second one of the WCs 600, columns 12-16 can respectively include the values C, S, $V_{Eff}$, $V_{Act}$ and $I_{Act}$ for a third one of the WCs 600, and so on and so forth through all of the WCs 600 controlled by the NC 500. The subsequent row in the CSV file can include the respective values for the next round of status requests. In some implementations, each row also can include sensor data obtained from photosensors, temperature sensors or other sensors integrated with the respective IGUs controlled by each WC 600. For example, such sensor data values can be entered into respective columns between the values of C, S, $V_{Eff}$, $V_{Act}$ and $I_{Act}$ for a first one of the WCs 600 but before the values of C, S, $V_{Eff}$, $V_{Act}$ and $I_{Act}$ for the next one of the WCs 600 in the row. Additionally or alternatively, each row can include sensor data values from one or more external sensors, for example, positioned on one or more facades or on a rooftop of the building. In some such implementations, the NC 500 can send a status request to the external sensors at the end of each round of status requests.

Compact Status

As described above, some protocols such as CANopen limit the size of each frame sent from the WC 600 to the NC 500 and vice versa. In some instances, the sending of each status request and the receiving of status information responsive to such a request actually includes multiple two-way communications and frames. For example, each status request described above can include a separate sub-request for each of the status values described above. In some implementations, each of two or more of the requested values C, S, $V_{Eff}$, $V_{Act}$ and $I_{Act}$ can be transmitted together within a single response—a compact status response. For example, in some implementations, the values of two or more of C, S, $V_{Eff}$, $V_{Act}$ and $I_{Act}$ are formatted so as to fit in one frame. For example, the CANopen protocol limits the size of the data payload that can be sent in each frame to 8 bytes (where each byte includes 8 bits). And in implementations in which the Service Data Object (SDO) sub-protocol of CAN open is used, the maximum size of the data payload portion of the CANopen frame is 4 bytes (32 bits). In some implementations, the size of each of the values $V_{Eff}$, $V_{Act}$ and $I_{Act}$ is 10 bits. Thus, each of the values of $V_{Eff}$, $V_{Act}$ and $I_{Act}$ can be packaged within a single SDO frame. This leaves 2 bits left over. In some implementations, each of the values of C and S can be specified with one respective bit. In such case, all of the values of C, S, $V_{Eff}$, $V_{Act}$ and $I_{Act}$ can be specified using only 32 bits, and thus, be packaged within one SDO CANopen frame.

In some implementations, additional time savings can be achieved using a broadcast status request. For example, rather than sending a status request to each of the WCs 600 on an individual (or "unicast" basis), the NC 500 can broadcast a single status request to all of the WCs 600 it controls. As described above, responsive to receiving the status request, each WC 600 can be programmed to respond by communicating status information such as the values C, S, $V_{Eff}$, $V_{Act}$ and $I_{Act}$ in one or more compact status responses.

Protocol Conversion Module

As described above, one function of the NC 500 can be in translating between various upstream and downstream protocols, for example, to enable the distribution of information between WCs 600 and the MC 400 or between the WCs and the outward-facing network 310. In some implementations, a protocol conversion module 804 is responsible for such translation or conversion services. In various implementations, the protocol conversion module 904 can be programmed to perform translation between any of a number of upstream protocols and any of a number of downstream protocols. As described above, such upstream protocols can include UDP protocols such as BACnet, TCP protocols such as oBix, other protocols built over these protocols as well as various wireless protocols. Downstream protocols can include, for example, CANopen, other CAN-compatible protocol, and various wireless protocols including, for example, protocols based on the IEEE 802.11 standard (for example, WiFi), protocols based on the IEEE 802.15.4 standard (for example, ZigBee, 6LoWPAN, ISA100.11a, WirelessHART or MiWi), protocols based on the Bluetooth standard (including the Classic Bluetooth, Bluetooth high speed and Bluetooth low energy protocols and including the Bluetooth v 4.0, v 4.1 and v 4.2 versions), or protocols based on the EnOcean standard (ISO/IEC 14543-3-10).

Integrated Analytics

In some implementations, the NC 500 uploads the information logged by the data logger 802 (for example, as a CSV file) to the MC 400 on a periodic basis, for example, every 24 hours. For example, the NC 500 can transmit a CSV file to the MC 400 via the File Transfer Protocol (FTP) or another suitable protocol over an Ethernet data link 316. In some such implementations, the status information can then be stored in the database 320 or made accessible to applications over the outward-facing network 310.

In some implementations, the NC 500 also can include functionality to analyze the information logged by the data logger 802. For example, an analytics module 906 can receive and analyze the raw information logged by the data logger 802 in real time. In various implementations, the analytics module 806 can be programmed to make decisions based on the raw information from the data logger 802. In some other implementations, the analytics module 806 can communicate with the database 320 to analyze the status information logged by the data logger 802 after it is stored in the database 320. For example, the analytics module 806 can compare raw values of electrical characteristics such as $V_{Eff}$, $V_{Act}$ and $I_{Act}$ with expected values or expected ranges of values and flag special conditions based on the comparison. For example, such flagged conditions can include power spikes indicating a failure such as a short, an error, or damage to an ECD. In some implementations, the analytics module 806 communicates such data to the tint determination module 810 or to the power management module 812.

In some implementations, the analytics module 806 also can filter the raw data received from the data logger 802 to more intelligently or efficiently store information in the database 320. For example, the analytics module 806 can be programmed to pass only "interesting" information to a database manager 808 for storage in the database 320. For example, interesting information can include anomalous values, values that otherwise deviate from expected values (such as based on empirical or historical values), or for specific periods when transitions are happening. More detailed examples of how raw data can be filtered, parsed, temporarily stored, and efficiently stored long term in a database are described in PCT Patent Application No. PCT/US2015/029675 filed May 7, 2015 and titled CONTROL METHOD FOR TINTABLE WINDOWS, which is hereby incorporated by reference in its entirety and for all purposes.

Database Manager

In some implementations, the NC 500 includes a database manager module (or "database manager") 808 configured to store information logged by the data logger 804 to a database on a periodic basis, for example, every hour, every few hours or every 24 hours. In some implementations, the database can be an external database such as the database 320 described above. In some other implementations, the database can be internal to the NC 500. For example, the database can be implemented as a time-series database such as a Graphite database within the secondary memory 506 of the NC 500 or within another long term memory within the NC 500. In some example implementations, the database manager 808 can be implemented as a Graphite Daemon executing as a background process, task, sub-task or application within a multi-tasking operating system of the NC 500. A time-series database can be advantageous over a relational database such as SQL because a time-series database is more efficient for data analyzed over time In some implementations, the database 320 can collectively refer to two or more databases, each of which can store some or all of the information obtained by some or all of the NCs 500 in the network system 300. For example, it can be desirable to store copies of the information in multiple databases for redundancy purposes. In some implementations, the database 320 can collectively refer to a multitude of databases, each of which is internal to a respective NC 500 (such as a Graphite or other times-series database). It also can be desirable to store copies of the information in multiple databases such that requests for information from applications including third party applications can be distributed among the databases and handled more efficiently. In some such implementations, the databases can be periodically or otherwise synchronized to maintain consistency.

In some implementations, the database manager 808 also can filter data received from the analytics module 806 to more intelligently or efficiently store information in an internal or external database. For example, the database manager 808 can additionally or alternatively be programmed to store only "interesting" information to a database. Again, interesting information can include anomalous values, values that otherwise deviate from expected values (such as based on empirical or historical values), or for specific periods when transitions are happening. More detailed examples of how raw data can be filtered, parsed, temporarily stored, and efficiently stored long term in a database are described in PCT Patent Application No. PCT/US2015/029675 filed May 7, 2015 and titled CONTROL METHOD FOR TINTABLE WINDOWS, which is hereby incorporated by reference in its entirety and for all purposes.

Tint Determination

In some implementations, the NC 500 or the MC 400 includes intelligence for calculating, determining, selecting or otherwise generating tint values for the IGUs 602. For example, as similarly described above with reference to the MC 400 of FIG. 4, a tint determination module 810 can execute various algorithms, tasks or subtasks to generate tint values based on a combination of parameters. The combination of parameters can include, for example, the status information collected and stored by the data logger 802. The combination of parameters also can include time or calendar information such as the time of day, day of year or time of season. Additionally or alternatively, the combination of parameters can include solar calendar information such as, for example, the direction of the sun relative to the IGUs 602. The combination of parameters also can include the outside temperature (external to the building), the inside temperature (within a room adjoining the target IGUs 602), or the temperature within the interior volume of the IGUs 602. The combination of parameters also can include information about the weather (for example, whether it is clear, sunny, overcast, cloudy, raining or snowing). Parameters such as the time of day, day of year, or direction of the sun can be programmed into and tracked by the NC 500. Parameters such as the outside temperature, inside temperature or IGU temperature can be obtained from sensors in, on or around the building or sensors integrated on or within the IGUs 602. In some implementations, various parameters can be provided by, or determined based on information provided by, various applications including third party applications that can communicate with the NC 500 via an API. For example, the network controller application, or the operating system in which it runs, can be programmed to provide the API.

In some implementations, the tint determination module 810 also can determine tint values based on user overrides received via various mobile device applications, wall devices or other devices. In some implementations, the tint determination module 810 also can determine tint values based on commands or instructions received various applications, including third party applications and cloud-based applications. For example, such third party applications can include various monitoring services including thermostat services, alert services (for example, fire detection), security services or other appliance automation services. Additional examples of monitoring services and systems can be found in PCT/US2015/019031 filed 5 Mar. 2015 and titled MONITORING SITES CONTAINING SWITCHABLE OPTICAL DEVICES AND CONTROLLERS. Such applications can communicate with the tint determination module 810 and other modules within the NC 500 via one or more APIs. Some examples of APIs that the NC 500 can enable are described in U.S. Provisional Patent Application Ser. No. 62/088,943 filed 8 Dec. 2014 and titled MULTIPLE INTERFACING SYSTEMS AT A SITE.

Power Management

As described above, the analytics module 806 can compare values of $V_{Eff}$, $V_{Act}$ and $I_{Act}$ as well as sensor data either obtained in real time or previously stored within the database 320 with expected values or expected ranges of values and flag special conditions based on the comparison. The analytics module 806 can pass such flagged data, flagged conditions or related information to the power management 812. For example, such flagged conditions can include power spikes indicating a short, an error, or damage to an ECD. The power management module 812 can then modify operations based on the flagged data or conditions. For example, the power management module 812 can delay tint commands until power demand has dropped, stop commands to troubled WCs (and put them in idle state), start staggering commands to WCs, manage peak power, or signal for help.

CONCLUSION

In one or more aspects, one or more of the functions described may be implemented in hardware, digital electronic circuitry, analog electronic circuitry, computer software, firmware, including the structures disclosed in this specification and their structural equivalents thereof, or in any combination thereof. Certain implementations of the subject matter described in this document also can be implemented as one or more controllers, computer programs, or physical structures, for example, one or more modules of computer program instructions, encoded on a computer storage media for execution by, or to control the operation of window controllers, network controllers, and/or antenna controllers. Any disclosed implementations presented as or for electrochromic windows can be more generally implemented as or for switchable optical devices (including windows, mirrors, etc.).

Various modifications to the embodiments described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the devices as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this does not necessarily mean that the operations are required to be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for controlling a facility, the apparatus comprising:
    an interface for communicating with window controllers that are communicatively coupled to a control network configured to control the facility; and
    a network controller operatively coupled to the window controllers and to the interface, which network controller is included in the control network, which network controller is configured to cause:
        (i) sending a status request from the network controller to one or more of the window controllers, the status request requesting a current tint status of one or more optically switchable devices that are disposed in the facility and that are controlled by one or more of the window controllers,
        (ii) processing status information received at the network controller from the one or more of the window controllers responsive to the status request, the status information indicating at least the current tint status of the one or more optically switchable devices controlled by the one or more of the window controllers, and
(iii) sending, responsive to processing the status information, one or more tint commands via the interface to the one or more of the window controllers.

2. The apparatus of claim 1, wherein the network controller is configured to send status requests to the one or more of the window controllers on a sequential basis or on an asynchronous basis.

3. The apparatus of claim 2, wherein the status requests are sent on the asynchronous basis based at least in part on a time duration that has elapsed since the one or more window controllers received one or more previously transmitted tint commands.

4. The apparatus of claim 1, wherein the network controller is configured to send the one or more tint commands on a sequential basis to the one or more of the window controllers.

5. The apparatus of claim 1, wherein the status information further indicates voltage information associated with the one or more of the optically switchable devices.

6. The apparatus of claim 1, wherein the network controller is further configured to cause the status information to be stored in a log file in connection with sensor data received responsive to the status request.

7. The apparatus of claim 1, wherein the status information received is utilized to detect at least one error condition of at least one of the one or more optically switchable devices.

8. The apparatus of claim 1, wherein the control network is configured to control at least one system of the facility comprising: a heating, ventilation, and air conditioning (HVAC) system; a lighting system; a security system; an elevator system; a fire system; and/or a power system.

9. The apparatus of claim 8, wherein the control network is configured to control two or more systems of the facility, and wherein the control network is configured to optimize usage of the two or more systems based on energy consumption of the facility.

10. A method for controlling a facility, the method comprising:
sending, by a network controller to one or more window controllers, a status request requesting a current tint status of one or more optically switchable devices that are disposed in the facility and that are controlled by one or more of the window controllers;
processing status information received from the one or more of the window controllers responsive to the status request, the status information indicating at least the current tint status of the one or more optically switchable devices controlled by the one or more of the window controllers; and
sending, responsive to processing the status information, one or more tint commands via a interface to the one or more of the window controllers.

11. The method of claim 10, wherein the status requests are sent to the one or more of the window controllers on a sequential basis or on an asynchronous basis.

12. The method of claim 11, wherein the status requests are sent on the asynchronous basis based at least in part on a time duration that has elapsed since the one or more window controllers received one or more previously transmitted tint commands.

13. The method of claim 10, one or more tint commands are sent on a sequential basis to the one or more of the window controllers.

14. The method of claim 10, wherein the status information further indicates voltage information associated with the one or more of the optically switchable devices.

15. The method of claim 10, further comprising causing the status information to be stored in a log file in connection with sensor data received responsive to the status request.

16. The method of claim 10, further comprising utilizing the status information received to detect at least one error condition of at least one of the one or more optically switchable devices.

* * * * *